US007173938B1

(12) United States Patent
Davidow

(10) Patent No.: US 7,173,938 B1
(45) Date of Patent: Feb. 6, 2007

(54) METHOD AND APPARATUS FOR PROCESSING OUTBOUND DATA WITHIN A POWERLINE BASED COMMUNICATION SYSTEM

(75) Inventor: Clifford A. Davidow, Reno, NV (US)

(73) Assignee: Current Grid, LLC, Germantown, MD (US)

( * ) Notice: Subject to any disclaimer, the term of this patent is extended or adjusted under 35 U.S.C. 154(b) by 751 days.

(21) Appl. No.: 09/860,262

(22) Filed: May 18, 2001

(51) Int. Cl.
H04L 12/28 (2006.01)

(52) U.S. Cl. ...................................... 370/401; 370/463

(58) Field of Classification Search ................ 370/400, 370/401, 465, 466; 340/310.01, 310.02
See application file for complete search history.

(56) References Cited

U.S. PATENT DOCUMENTS

| 2,577,731 | A | 12/1951 | Berger |
| 3,656,112 | A | 4/1972 | Paull |
| 3,702,460 | A | 11/1972 | Blose |
| 3,810,096 | A | 5/1974 | Kabat et al. |
| 3,846,638 | A | 11/1974 | Wetherell |
| 3,942,168 | A | 3/1976 | Whyte |
| 3,942,170 | A | 3/1976 | Whyte |
| 3,944,723 | A | 3/1976 | Fong |
| 3,967,264 | A | 6/1976 | Whyte et al. |
| 4,012,733 | A | 3/1977 | Whyte |
| 4,016,429 | A | 4/1977 | Vercellotti et al. |
| 4,357,598 | A | 11/1982 | Melvin, Jr. |
| 4,400,688 | A | 8/1983 | Johnston et al. |
| 4,408,186 | A | 10/1983 | Howell |
| 4,475,209 | A | 10/1984 | Udren |
| 4,569,045 | A | 2/1986 | Schieble et al. |
| 4,675,648 | A | 6/1987 | Roth et al. |

(Continued)

FOREIGN PATENT DOCUMENTS

EP           0 470 185 B1       11/1995

(Continued)

OTHER PUBLICATIONS

"IEEE Guide for Power-Line Carrier Applications, ANSI/IEEE Std 643-1980", *The Institute of Electrical and Electronics Engineers, Inc.*, (1980), 1-80.

(Continued)

*Primary Examiner*—Chau Nguyen
*Assistant Examiner*—Rhonda Murphy
(74) *Attorney, Agent, or Firm*—Mel Barnes; Capital Legal Group, LLC

(57) ABSTRACT

A powerline based communication system includes a powerline termination module, a plurality of powerline gateways, and a plurality of powerline nodes. The powerline termination module manages data for local area networks within the powerline based communication system. The plurality of powerline gateways is arranged in sets of powerline gateways, wherein each set of powerline gateways constitutes a local area network. Each of the plurality of powerline nodes is operably coupled to the powerline termination module via a high-speed communication path. In addition, each powerline node is operably coupled to set of powerline gateways, i.e., to a local area network, via powerlines of a local transformer. Each of the powerline nodes receives data from the powerline gateways of its LAN via the powerlines of the local transformer and provides the data to the powerline termination module via the high-speed communication path.

47 Claims, 31 Drawing Sheets

U.S. PATENT DOCUMENTS

| | | | |
|---|---|---|---|
| 4,912,553 A | 3/1990 | Pal et al. | |
| 5,272,462 A | 12/1993 | Teyssandier et al. | |
| 5,404,127 A | 4/1995 | Lee et al. | |
| 5,504,454 A * | 4/1996 | Daggett et al. | 329/304 |
| 5,559,377 A | 9/1996 | Abraham | |
| 5,625,863 A | 4/1997 | Abraham | |
| 5,684,450 A | 11/1997 | Brown | |
| 5,717,685 A | 2/1998 | Abraham | |
| 5,742,686 A | 4/1998 | Finley | |
| 5,777,769 A * | 7/1998 | Coutinho | 398/171 |
| 5,818,821 A | 10/1998 | Schurig | |
| 5,856,776 A | 1/1999 | Armstrong et al. | |
| 5,929,750 A | 7/1999 | Brown | |
| 5,933,071 A | 8/1999 | Brown | |
| 5,937,342 A | 8/1999 | Kline | |
| 5,949,327 A | 9/1999 | Brown | |
| 5,952,914 A | 9/1999 | Wynn | |
| 5,977,650 A | 11/1999 | Rickard et al. | |
| 5,982,276 A | 11/1999 | Stewart | |
| 5,994,998 A | 11/1999 | Fisher et al. | |
| 6,014,386 A | 1/2000 | Abraham | |
| 6,037,678 A | 3/2000 | Rickard | |
| 6,040,759 A | 3/2000 | Sanderson | |
| 6,144,292 A | 11/2000 | Brown | |
| 6,157,292 A | 12/2000 | Piercy et al. | |
| 6,172,597 B1 | 1/2001 | Brown | |
| 6,249,213 B1 | 6/2001 | Horne | |
| 6,275,144 B1 | 8/2001 | Rumbaugh | |
| 6,278,357 B1 | 8/2001 | Croushore et al. | |
| 6,282,405 B1 | 8/2001 | Brown | |
| 6,300,881 B1 | 10/2001 | Yee et al. | |
| 6,313,738 B1 | 11/2001 | Wynn | |
| 6,317,031 B1 | 11/2001 | Rickard | |
| 6,331,814 B1 | 12/2001 | Albano | |
| 6,346,875 B1 * | 2/2002 | Puckette et al. | 340/310.01 |
| 6,396,392 B1 * | 5/2002 | Abraham | 340/310.01 |
| 6,407,987 B1 | 6/2002 | Abraham | |
| 6,452,482 B1 | 9/2002 | Cern | |
| 6,496,104 B2 | 12/2002 | Kline | |
| 6,515,485 B1 | 2/2003 | Bullock et al. | |
| 6,522,626 B1 | 2/2003 | Greenwood | |
| 6,549,120 B1 * | 4/2003 | de Buda | 340/310.01 |
| 6,624,532 B1 | 9/2003 | Davidow | |
| 6,646,447 B2 | 11/2003 | Cern et al. | |
| 6,654,384 B1 * | 11/2003 | Reza et al. | 370/469 |
| 6,668,058 B2 | 12/2003 | Grimes | |
| 6,684,245 B1 | 1/2004 | Shuey et al. | |
| 6,744,824 B1 * | 6/2004 | Duvaut et al. | 375/296 |
| 6,922,135 B2 | 7/2005 | Abraham | |
| 6,958,680 B2 | 10/2005 | Kline | |
| 6,998,962 B2 | 2/2006 | Cope et al. | |
| 7,042,351 B2 | 5/2006 | Kline | |
| 7,046,882 B2 | 5/2006 | Kline | |
| 2001/0054953 A1 * | 12/2001 | Kline | 340/310.01 |
| 2002/0002040 A1 | 1/2002 | Kline et al. | |
| 2002/0027496 A1 | 3/2002 | Cern et al. | |
| 2002/0031226 A1 * | 3/2002 | Simonsen et al. | 380/255 |
| 2002/0039388 A1 * | 4/2002 | Smart et al. | 375/260 |
| 2002/0097953 A1 | 7/2002 | Kline | |
| 2002/0105413 A1 | 8/2002 | Cern et al. | |
| 2002/0110310 A1 | 8/2002 | Kline | |
| 2002/0110311 A1 | 8/2002 | Kline | |
| 2002/0118101 A1 | 8/2002 | Kline | |
| 2002/0121963 A1 | 9/2002 | Kline | |
| 2002/0154000 A1 | 10/2002 | Kline | |
| 2003/0046377 A1 | 3/2003 | Daum et al. | |
| 2003/0103307 A1 | 6/2003 | Dostert | |
| 2003/0160684 A1 | 8/2003 | Cern | |
| 2003/0169155 A1 | 9/2003 | Mollenkopf et al. | |
| 2003/0227373 A1 | 12/2003 | Lou et al. | |
| 2004/0227621 A1 | 11/2004 | Cope et al. | |
| 2005/0128057 A1 | 6/2005 | Mansfield et al. | |

FOREIGN PATENT DOCUMENTS

| | | |
|---|---|---|
| EP | 0 913 955 A2 | 5/1999 |
| EP | 0 933 883 A2 | 8/1999 |
| EP | 0 933 883 A3 | 8/1999 |
| EP | 1011235 A2 | 6/2000 |
| EP | 1014640 A2 | 6/2000 |
| EP | 1 075 091 A1 | 2/2001 |
| GB | 2 293 950 A | 4/1996 |
| GB | 2 342 264 A | 4/2000 |
| WO | WO-92/16920 A1 | 10/1992 |
| WO | WO-98/33258 | 7/1998 |

OTHER PUBLICATIONS

"Signalling on Low-Voltage Electrical Installations in the Frequency Band 3kHz to 148.5kHz-Part 4: Filters at the Interface of the Indoor and Outdoor Electricity Network", *CLC SC 105A (Secretariat)*, (May 1992), 1-11.

"Summary of an IEEE Guide for Power-Line Carrier Applications", *IEEE Transactions on Power Apparatus and Systems*, (Nov./Dec. 1980), 2334-2337.

Barstow, J M., "A Carrier Telephone System for Rural Service", *AIEE Transactions*, (1947), 301-307.

Dostert, K , "EMC Aspects of High Speed Powerline Communications", *Proceedings of the 15th International Wroclaw Symposium and Exhibition on Electromagnetic Capability*, (Jun. 27-30, 2000), 98-102.

Dostert, K , "Powerline Communications, Ch. 5", *Powerline Communications*, (2001), 286, 288-292.

Feduschak, N A., "Waiting in the Wings: Is Powerline Technology Ready to Compete with Cable?", www.cabletoday.com/ic2/archives/0301/0301powerline.htm, (Mar. 2001), 1-5.

Hasler, E F., et al., "Communication Sysyems Using Bundle Conductor Overhead Power Lines", *IEEE Transactions on Power Apparatus and Systems*, (Mar./Apr. 1975), 344-349.

Naredo, J L., et al., "Design of Power Line Carrier Systems on Multitransposed Delta Transmission Lines", *IEEE Transactions on Power Delivery*, (1991), 952-958.

U.S. Appl. No. 09/860,261, filed May 18, 2001.

U.S. Appl. No. 11/467,591, filed Aug. 28, 2006.

* cited by examiner

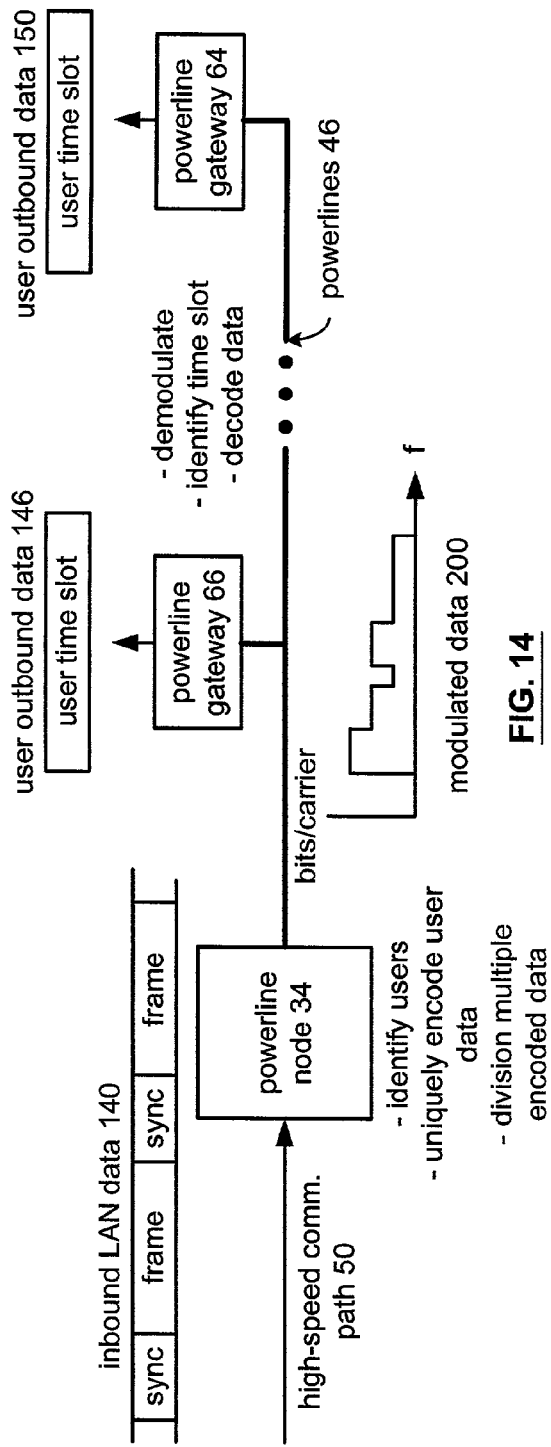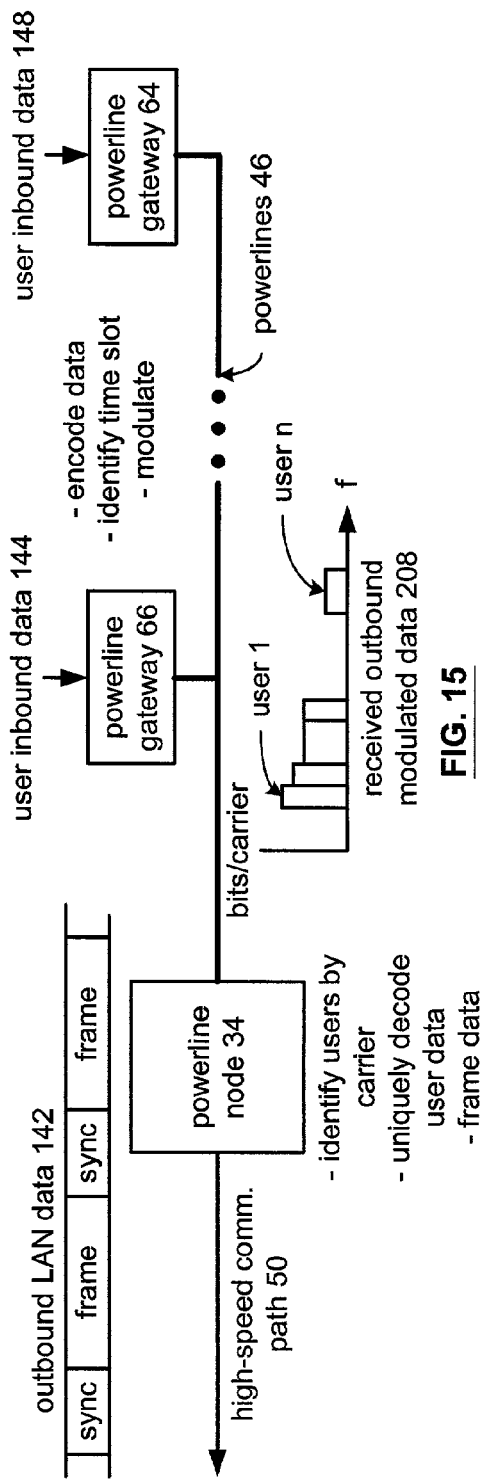

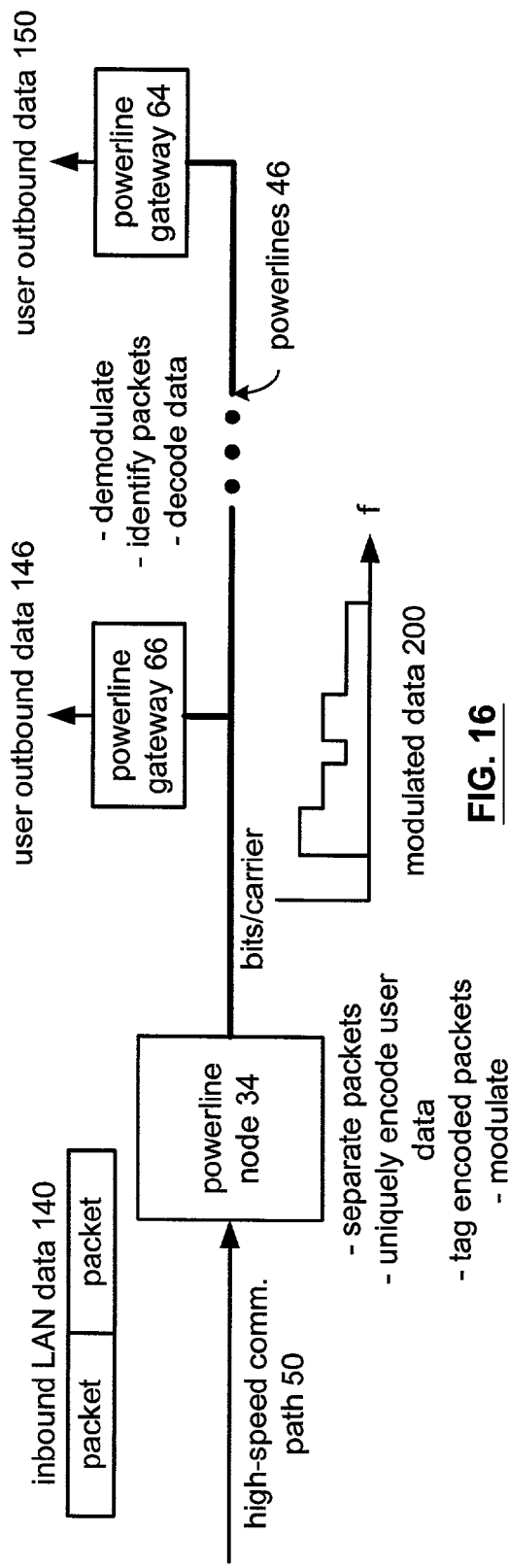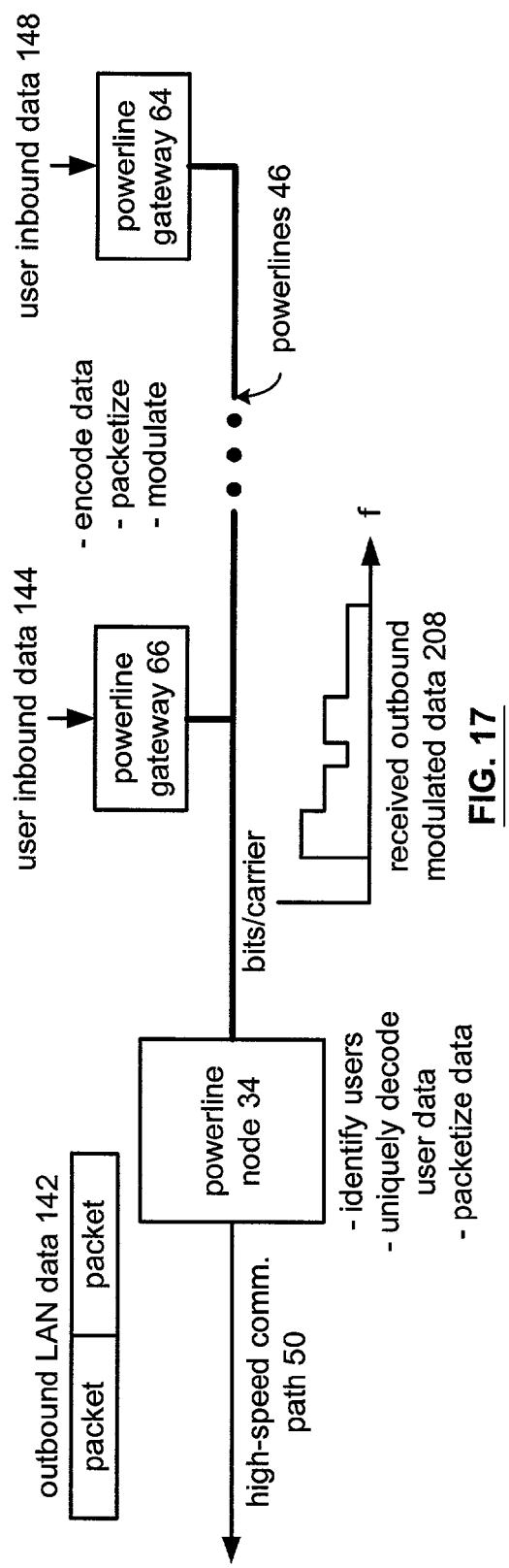

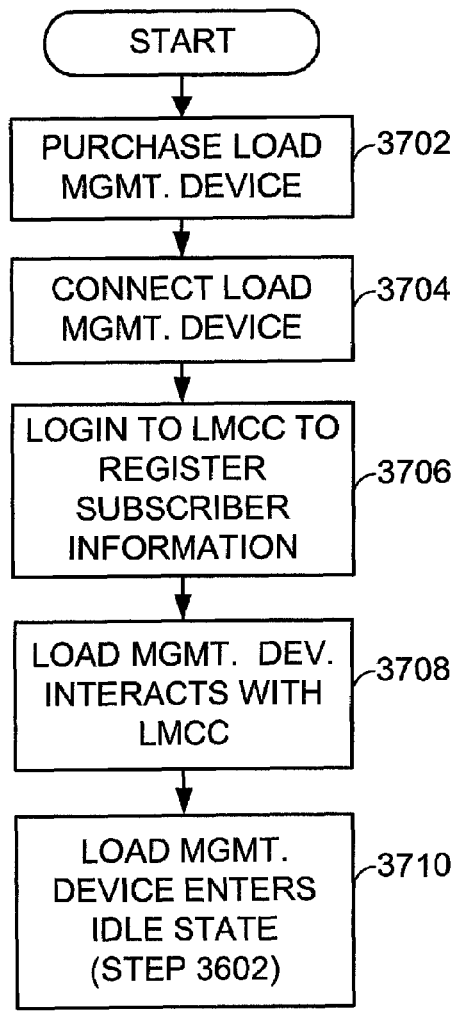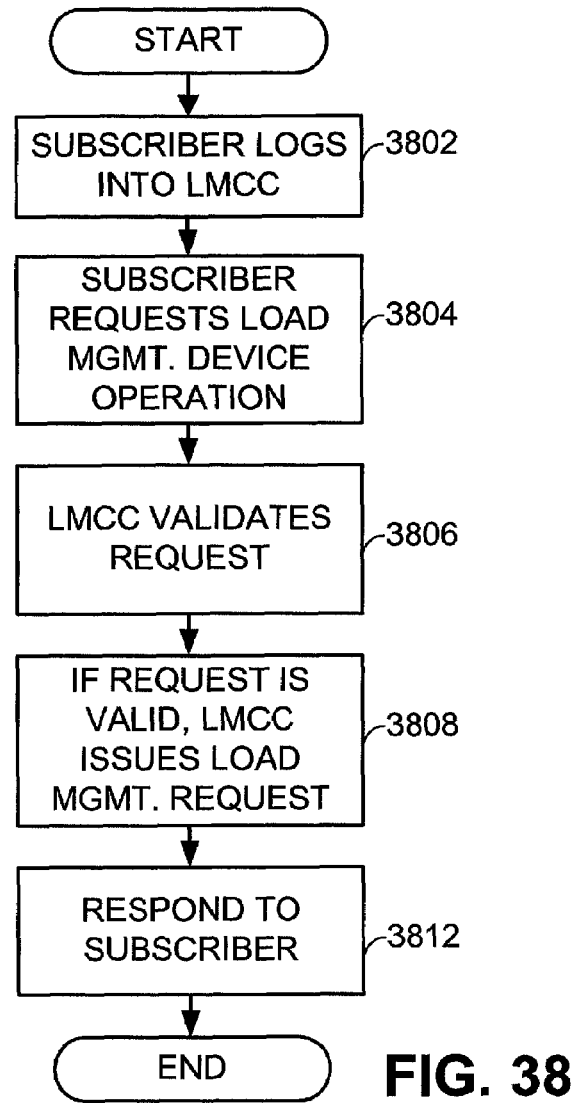
FIG. 37
FIG. 38

METHOD AND APPARATUS FOR PROCESSING OUTBOUND DATA WITHIN A POWERLINE BASED COMMUNICATION SYSTEM

REFERENCES TO RELATED APPLICATIONS

The present application is being filed concurrently with three related applications having the following titles and serial numbers:
1. METHOD AND APPARATUS FOR PROCESSING INBOUND DATA WITHIN A POWERLINE BASED COMMUNICATION SYSTEM, U.S. Ser. No. 09/860,261 filed on even date herewith.
2. SYSTEM AND METHOD FOR UTILITY NETWORK LOAD CONTROL, U.S. Ser. No. 09/860,263 filed on even date herewith.
3. LOAD MANAGEMENT DEVICE AND METHOD OF OPERATION, U.S. Ser. No. 09/860,260 filed on even date herewith.

BACKGROUND OF THE INVENTION

1. Technical Field

This invention relates generally to communication systems and more particularly to utilizing powerlines for conveying broadband communications.

2. Related Art

As is known, data may be communicated from one entity (e.g., end user's computer, server, facsimile machine, web browser, et cetera) to another entity via a communication infrastructure. The communication infrastructure may include a public switched telephone network (PSTN), the Internet, wireless communication networks, Local Area Networks (LAN), Wide Area Networks (WAN) and/or any combination thereof. Such communication networks are constantly evolving to provide end users with greater bandwidth such that the user may receive and/or transmit greater amounts of data in shorter times with greater reliability.

In conventional communication systems, an end user is coupled to a communication system, or network, via a wire line or wireless communication path. Wireless communication paths include radio frequency paths and infrared paths, while wire line communication paths include telephone lines, Ethernet connections, fiber optic connections, and/or in-home networks using power outlets. Such in-home networks utilize a home's existing power wiring, which typically carries a 120 VAC or 240 VAC, 60 Hz signal, to carry high frequency signals that represent data. For example, HomePlug Alliance and other home networking committees are attempting to standardize in-home networking over powerlines such that any end user device (e.g., personal computer, laptop, facsimile machine, printer, audio/video receiver, audio equipment, video equipment, et cetera) within the home, when plugged into an electrical outlet, is coupled to the home's powerline network. As is known, the in-home networking is utilized once the data reaches the home, which may be done using a 56K modem, DSL modem, cable modem, etc.

As is also known, the last hundred feet of a communication system, i.e., the connection to each individual user, is the most costly and most difficult to install. To make individual user connections, the telephone company, cable company, etc., incurs a truck roll for in-person installation of the wiring, optics, coaxial cable, splitters, specialized modems, etc. In addition, many homes are very difficult to physically access, making the installation of the local connection even more difficult and more costly.

Power, or utility, companies are currently installing, in ground, fiber optic lines in parallel with the installation and/or repair of, powerlines into neighborhoods. Such fiber optics may be used for transceiving high-speed data for users within the neighborhoods. The power companies have similar physical constraints in installing fiber optics to each home as the telephone companies and cable companies, in that many homes are physically difficult to access and/or costly to access.

Therefore, a need exists for a method and apparatus that enables broadband communications in local area networks of a plurality of homes via powerlines.

SUMMARY OF THE INVENTION

These needs and others are substantially met by the present invention that, in general, discloses a method and apparatus for powerline based communication systems. Such a powerline based communication system utilizes the powerlines of at least one local distribution transformer, and/or substation transformer, to carry broadband data for a plurality of users that receive power from the at least one local distribution transformer, and/or substation transformer. The powerline based communication system includes a powerline termination module, a plurality of powerline gateways, and a plurality of powerline nodes. A local area network (LAN) of the powerline based communication system includes a set of powerline gates, wherein each of the powerline gateways in a set is associated with a home. The homes of a LAN each receive power from a local distribution transformer. In addition, each LAN includes one of the powerline nodes that is physically co-located with the local distribution transformer, at one of the homes in the LAN, or at any convenient location therebetween.

Each powerline node of each local area network is operably coupled to the powerline termination module via a high-speed communication path. In general, the powerline termination module manages the broadband data for associated local area networks. Accordingly, the powerline termination module includes routing, networking, and switching functions to facilitate the conveyance of data between users of the local area networks and between users of the local area networks and other entities via a communication network or a plurality of communication networks.

The powerline node in a local area network is operably coupled to the powerline gateways within the local area network via the powerlines. In addition, the powerline node is operably coupled to the powerline termination module, or switching hub, via a high-speed communication path, such as a fiber optic cable, coaxial cable, telephone line, Ethernet connection, Internet connection, wireless connection, et cetera. As coupled, the powerline node of a local area network generally acts as the conduit to the more global communication system for the local area network. Thus, the powerline node receives local area network data from the global communication system via the powerline termination module, or the like, and provides it to the powerline gateways of the local area network. In addition, the powerline node receives data from the powerline gateways of the local area network and provides the data to the global communication system via the powerline termination module, or the like. The communication of data within the local area network may be done using IP packets with multi-protocol label switching (MPLS) support, label-switching support, and/or asynchronous transfer mode (ATM) support. VLAN and/or Quality of Service (QoS) support may also be included with both inbound and outbound operations when IP packet switching is supported, e.g., IEEE 802.1, 802.1Q, etc. Alternatively, the data may be transceived using time division multiplexing, frequency division multiplexing, or some other frame-based data transceiving protocol.

In another embodiment, a local area powerline based communication system includes a plurality of powerline gateways and a single powerline node. The powerline node is operably coupled to a high-speed communication path and to the plurality of powerline gateways. The coupling between the powerline node and the powerline gateways is via powerlines of a local transformer. The powerline node transceives data via the high-speed communication path and provides the data, in the format of the LAN, to the plurality of powerline gateways associated with the local transformer. In addition, the powerline node receives data from the plurality of powerline gateways via the powerlines of the local transformer and provides the data, in an appropriate format, on the high-speed communication path.

To facilitate the transceiving of data on the powerlines in a neighborhood, or local area network, each of the powerline nodes and powerline gateways includes an AC coupling module, a demodulation module, a data processing module, a transmitting module, a modulation module, and a receiving module. In addition, each of the powerline nodes and powerline gateways include a splitter to split the transmit data from the receive data. Accordingly, a broadband communication system may now readily be supported via powerlines within neighborhoods where only a single fiber optic or other high-speed communication path, or few such connections, are provided to a neighborhood via a powerline node, which transceives data via the powerlines to other homes within the local are network.

BRIEF DESCRIPTION OF THE DRAWINGS

FIG. 14 illustrates a graphical representation of processing inbound local area network data in accordance with the present invention;

FIG. 15 illustrates a graphical representation of processing outbound local area network data in accordance with the present invention;

FIG. 16 illustrates a graphical representation of processing inbound local area network data in accordance with the present invention;

FIG. 17 illustrates an alternate graphical representation of processing outbound local area network data in accordance with the present invention;

FIG. 37 illustrates operations performed by a subscriber in placing in service a load management device; and FIG. 38 is a logic diagram illustrating operation in which a subscriber initiates load management of load via a load management device.

DETAILED DESCRIPTION OF THE FIGURES

FIGS. 1 through 20 relate to the manner in which high speed communications may be serviced by one or more power line carrier local area networks. The description of FIGS. 1 through 20 describes the manner in which communication signals are coupled to power lines and the manner in which the communication signals are decoupled from the power lines. Generally speaking, the system and methods of FIGS. 1 through 20 include power line termination modules and power line nodes that couple high speed communication paths to utility power lines. Further, the description of these Figures also describes a plurality of power line gateways that service particular end-point devices and that also couple to the power lines of the utility company. The power line termination module, the power line nodes, and the power line gateways use the power lines of the utility company to provide the last portion of a high speed communication network.

FIGS. 21 through 38 describe the manner in which load management may be accomplished using such power line carrier local area networks. Similar devices and methods are employed to use the power lines of the utility network to carry communication signals. These communication signals are employed to control the operation of load management devices that are deployed in homes and businesses. The control of these load management devices allows the utility company, another service provider, or corresponding subscribers to control electrical loads serviced by the load management devices. While some of the structure and operations described with reference to FIGS. 1 through 20 may be employed in power load management, FIGS. 21 through 38 will typically separately describe power load management functions from the high speed communication functions that may be concurrently provided.

Figure 1:
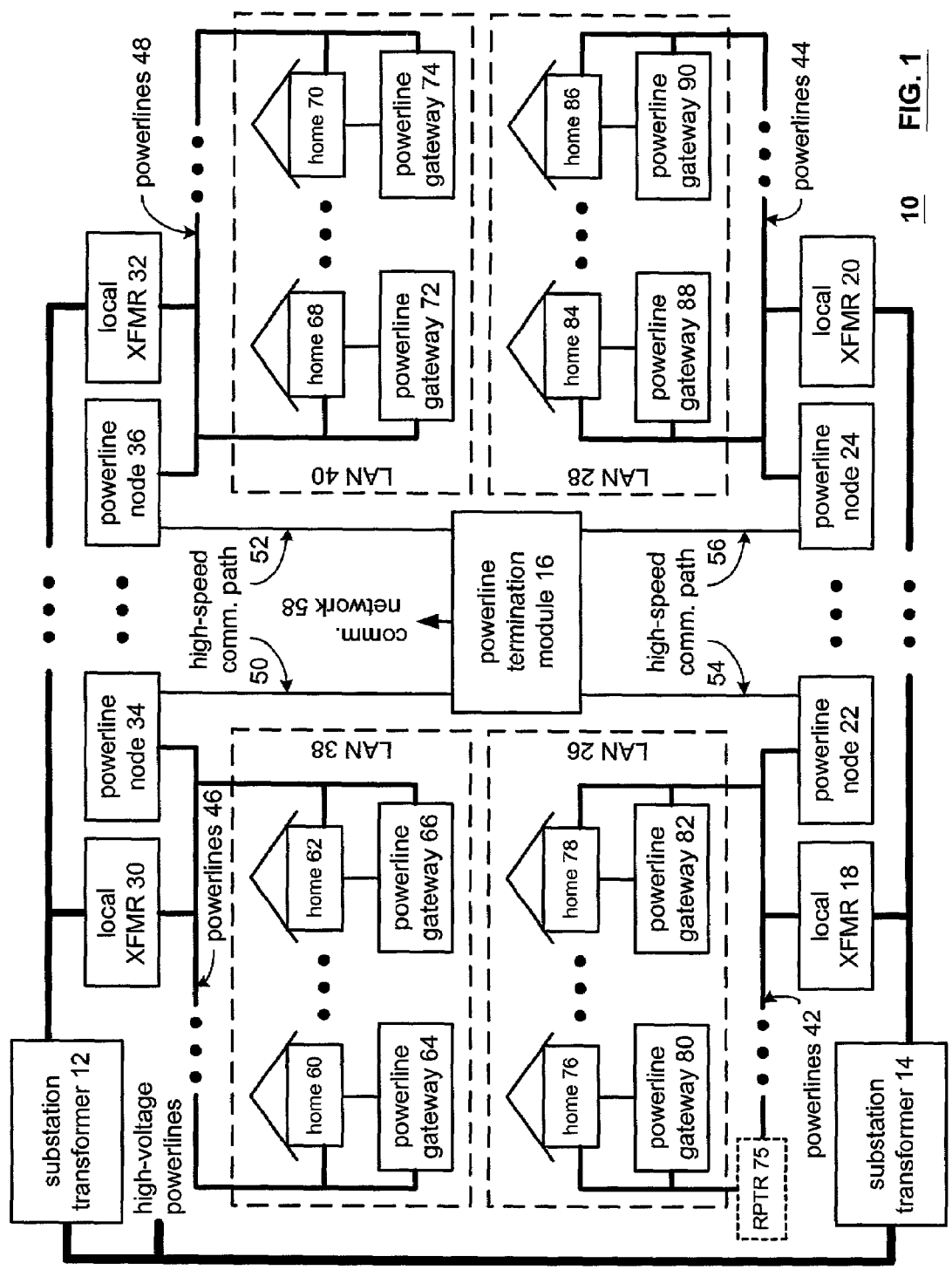
FIG. 1 illustrates a schematic block diagram of a powerline based communication system in accordance with the present invention.

FIG. 1 illustrates a schematic block diagram of a powerline based communication system 10. The system 10 includes a plurality of substation transformers 12 and 14, a plurality of local transformers 30, 32, 18, and 20, a plurality of powerline nodes 34, 36, 22, and 24, a plurality of local area networks 26, 28, 38, and 40, and a powerline termination module 16. As one of average skill in the art will appreciate, more or less substation transformers, local transformers, powerline nodes, powerline termination modules, and local area networks may be included in a communication system that provides similar communication services as that of the powerline base communication system 10. Accordingly, the elements illustrated, and the quantities thereof, are in no way to be construed as to limit the number of elements that may be included in the communication system 10 but are shown to illustrate the concepts of the present invention. The same applies to each figure of the present patent application.

As shown, the substation transformers 12 and 14 are coupled to high voltage powerlines. The high voltage powerlines provide a 3-phase high voltage signal to each of the substation transformers. The voltage of the high voltage signal may be 69 kilovolts AC (KVAC), 138 KVAC, 345 KVAC, etc. The substation transformers 12 and 14 convert the 3-phase high voltage signal into a lower voltage 3-phase signal. The output voltage of each substation transformer 12 and 14 may be 12.5 KVAC, 13.8 KVAC, or 25 KVAC.

Each of the local distribution transformers 18, 20, 30 and 32 receives the 3 phase 12.5, 13.8 KVAC, or 25 KVAC signal from the respective substation transformer 12 or 14 and produces a single-phase 120 volt AC (VAC) or 240 VAC output. Accordingly, the single-phase 120 VAC or 240 VAC output is provided to a plurality of homes 60–62, 68–70, 76–78, and 84–86 within each local area network 26, 28, 38 and 40 via powerlines 46, 48, 42, and 44. Accordingly, each home within a local area network is coupled to each other home in the LAN via powerlines of its local transformer. As such, the powerlines 42, 44, 46 or 48, carry the single phase 120 VAC or 240 VAC signal to each of the homes to supply the home with its requisite energy needs.

Each local area network 26, 28, 38 and 40 has a powerline node 22, 24, 34 and 36 operably coupled to it. As shown, each powerline node 22, 24, 34 and 36 is operably coupled to the local area network 26, 28, 38 and 40 via powerlines 42, 44, 46 and 48 and also to a powerline termination module 16 via a high-speed communication path 50, 52, 54 and 56. As configured, the powerline nodes 22, 24, 34 and 36 provide the last 100 feet, or so, of broadband coupling for the local area networks 26, 28, 38 and 40. As is known, the last 100 feet, or so, of a communication path is one of the most financially significant portion of the communication network. As such, the powerline nodes 22, 24, 34 and 36 in combination with the powerline gateways 64, 66, 72, 74, 80, 82, 88 and 90 provide an economical and reliable communication network for the last 100 feet, or so, of a communication system.

In general, the powerline nodes 22, 24, 34 and 36 transceive data via the high-speed communication paths 50, 52, 54 and 56 with the powerline termination module 16 for their respective local area networks. The powerline termination module 16 is operably coupled to a communication network 58, which may be the Internet, public switched telephone network (PSTN), wireless network, Ethernet network, public wide area network, private wide area network, and/or any other network that routes data amongst a plurality of users as electrical signals and/or as light waves. As such, the powerline termination module 16 acts as a local switch for the powerline nodes 22, 24, 34 and 36 and their respective local area networks.

Each of the powerline nodes 22, 24, 34 and 36 transceives data via the high-speed communication path 50, 52, 54 and 56. The inbound data received by the powerline node 22, 24, 34 or 36 is destined for one or more of the users (i.e., homes, within the respective local area network). The inbound local area network data is processed then and modulated onto the powerlines 42, 44, 46 or 48. Each of the powerline gateways 64, 66, 72, 74, 80, 82, 88 and 90 include AC coupling to receive the modulated signal from the powerlines. The powerline gateways 64, 66, 72, 74, 80, 82, 88 and 90 demodulate the data, process the data and retrieve the local area data for its respective home, (i.e., user). A user may be a personal computer, printer, facsimile machine, audio equipment, video equipment, in-home network, and/or any device that can receive and/or transmit digital information. Such devices may be utilized within a home 60–62 and coupled to the powerline gateway 64 via an in-home networking system, in-home powerline network, a telephone connection, an Ethernet connection, a fiber optic connection, a coaxial cable connection, DSL modem, ISDN modem, 56K modem, and/or any means for coupling one device to another for transmission or reception of electrical and/or light signals.

In addition, each of the powerline gateways 64, 66, 72, 74, 80, 82, 88 and 90 receives data from a user within the respective home, processes the data and modulates it onto the respective powerlines. The respective powerline node receives the modulated data, demodulates it, processes it, and places it on the high-speed communication path for transmission to the powerline termination module 16. The powerline termination module 16 then processes the data and routes it either to another user within one of the other local area networks or to the communication network 58.

Figure 2:
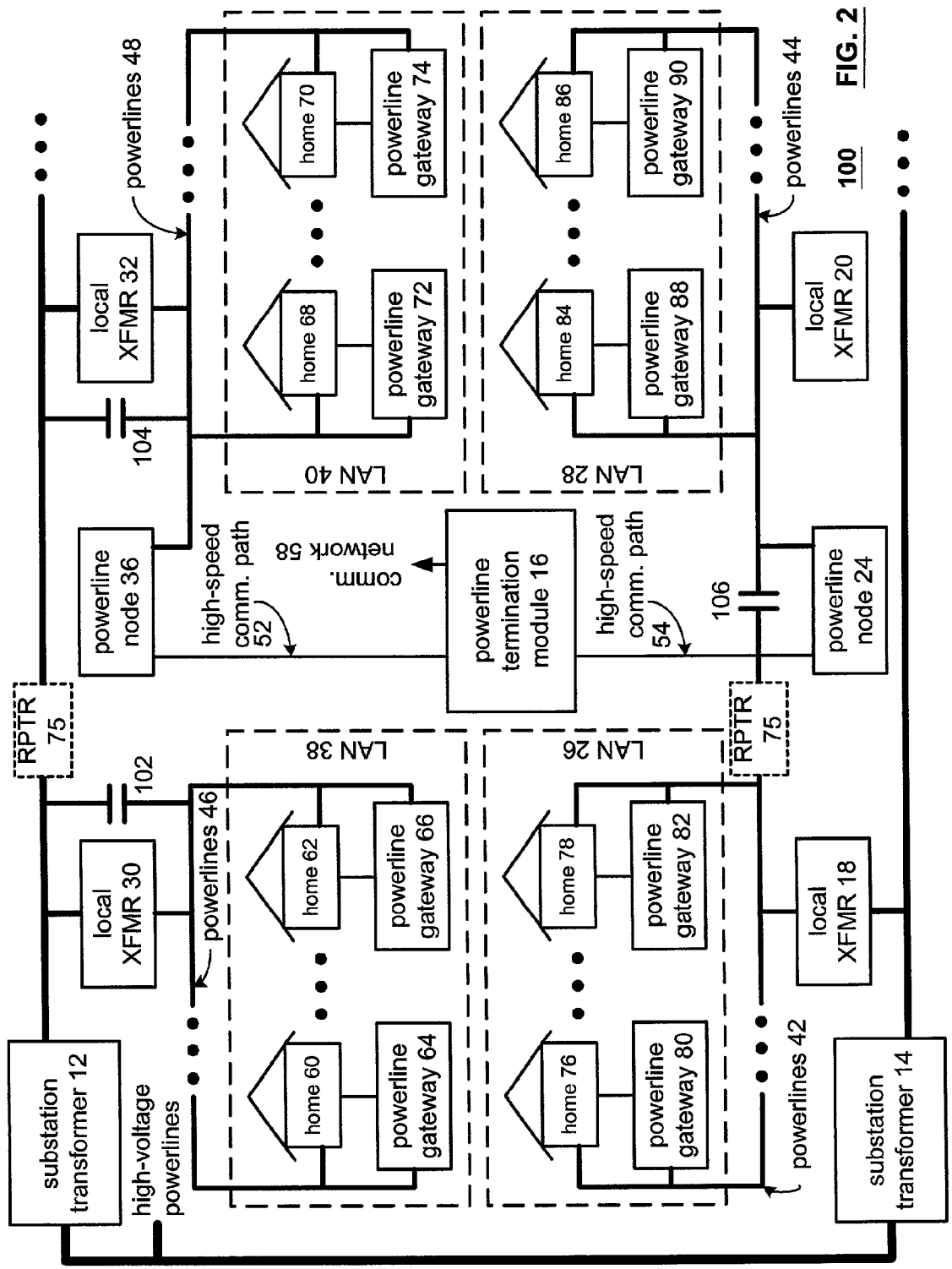
FIG. 2 illustrates a schematic block diagram of an alternate powerline based communication system in accordance with the present invention.

FIG. 2 illustrates a schematic block diagram of another powerline base communication system 100. In this example of a powerline base communication system, the system 100 includes four local area networks 26, 28, 38 and 40, a pair of substation transformers 12 and 14, a plurality of local distribution transformers 18, 20, 30 and 32 and a pair of powerline nodes 24 and 36. Each of the local area networks 26, 28, 38 and 40 include a plurality of homes 76–78, 84–86, 60–62, and 68–70, respectively. Associated with each home in each local area network is a powerline gateway. For instance, powerline gateway 64 is associated with home 60; powerline gateway 66 is associated with home 62, et cetera.

Local distribution transformer 30 is shown to include a high voltage capacitor 102 coupled in parallel with its primary and secondary windings. In addition, local distribution transformer 32 also includes a high voltage capacitor 104 coupled in parallel with its primary and secondary windings. As coupled, the high voltage capacitors 102 and 104 provide a low impedance path for the modulated data produced by the powerline gateways 64, 66, 72 and 74 to the powerline node 36. As such, in this configuration, powerline node 36 may act as the conduit with the powerline termination module 16 for both LAN 39 and LAN 40. As one of average skill in the art will appreciate, the high voltage capacitors 102 and 104 may be a single high voltage capacitor having a capacitance of 100 pF to 10 µF and have a voltage rating in excess of 240 VAC. As one of average skill in the art will also appreciate, the high voltage capacitors 102 and 104 may include multiple capacitors coupled in series and/or in parallel to achieve a desired capacitance and voltage rating. As one of average skill in the art will further appreciate, multiple capacitors may be used to coupled multiple taps, or nodes, of the primary winding to multiple taps, or nodes, of the secondary winding, and are coupled to the same phases of the primary and secondary winding for multiple phase transformers.

Local distribution transformers 18 and 20 have their secondary windings operably coupled together via high voltage capacitor 106. As coupled, the modulated data produced by the powerline gateways within local area networks 26 and 28 are readily coupled to the powerline node 24. As such, powerline node 24 supports both local area networks 26 and 28. In this embodiment, powerline node 24 acts as the conduit to the powerline termination module 16, and hence the communication network, for all users within local area network 26 and 28.

In some installations, the local transformers 32 and 30 will have sufficiently low series impedance in a frequency of interest so that the modulated data will pass through the transformers 30 and 32 substantially or fully unattenuated. In this case, coupling capacitors 102 and 104 are not required.

Modulated data propagating along the power lines over a distance will attenuate and the signal to noise ratio of the modulated data will decrease. Further, Electromagnetic Interference (EMI) will also reduce the signal to noise ratio as the modulated data propagates. Thus, repeaters 75 may be required to boost the signal strength of the modulated data. Whether repeaters 75 will be required, placement of the repeaters 75, and the gain required for the repeaters 75 will typically be unique to each installation. A repeater 75 was shown in FIG. 1 and other repeaters 75 are shown in the subsequent Figures.

As in the embodiment of FIG. 1, the system 100 of FIG. 2 provides the last 100 feet, or so, of a communication network (i.e., the individual coupling to each home within each LAN, or neighborhood) is provided via the powerline nodes 24 and 36, the powerline gateways 64, 66, 72, 74, 80, 82, 88 and 90 and the existing powerlines associated with the local distribution transformers.

For the systems shown in FIGS. 1 and 2, the powerline nodes 22, 24, 34 and 36 may be mounted near the local distribution transformers (i.e., on the same pole), incorporated into the local distribution transformer box, mounted at one of the homes within the local area network, or any convenient location between the transformer and the homes of the LAN. As previously mentioned, a local area network may generally be viewed as the homes within a neighborhood wherein each home within the neighborhood is powered by the same local distribution transformer. As such, each LAN network may include 1–500 homes, small businesses, or other structures.

To provide filtering with the local distribution transformers 18, 20, 30, and 32 and/or to prevent unwanted feedback to the substation transformers, each of the local distribution transformers may include a modified fuse to have a desired frequency response. For example, the modified fuse may have a predetermined inductance that provides high-frequency isolation to upstream data and filtering for downstream data. As a further example, the fuse may include a desired resistance and/or a desired capacitance to provide a more complex frequency response.

Figure 3:
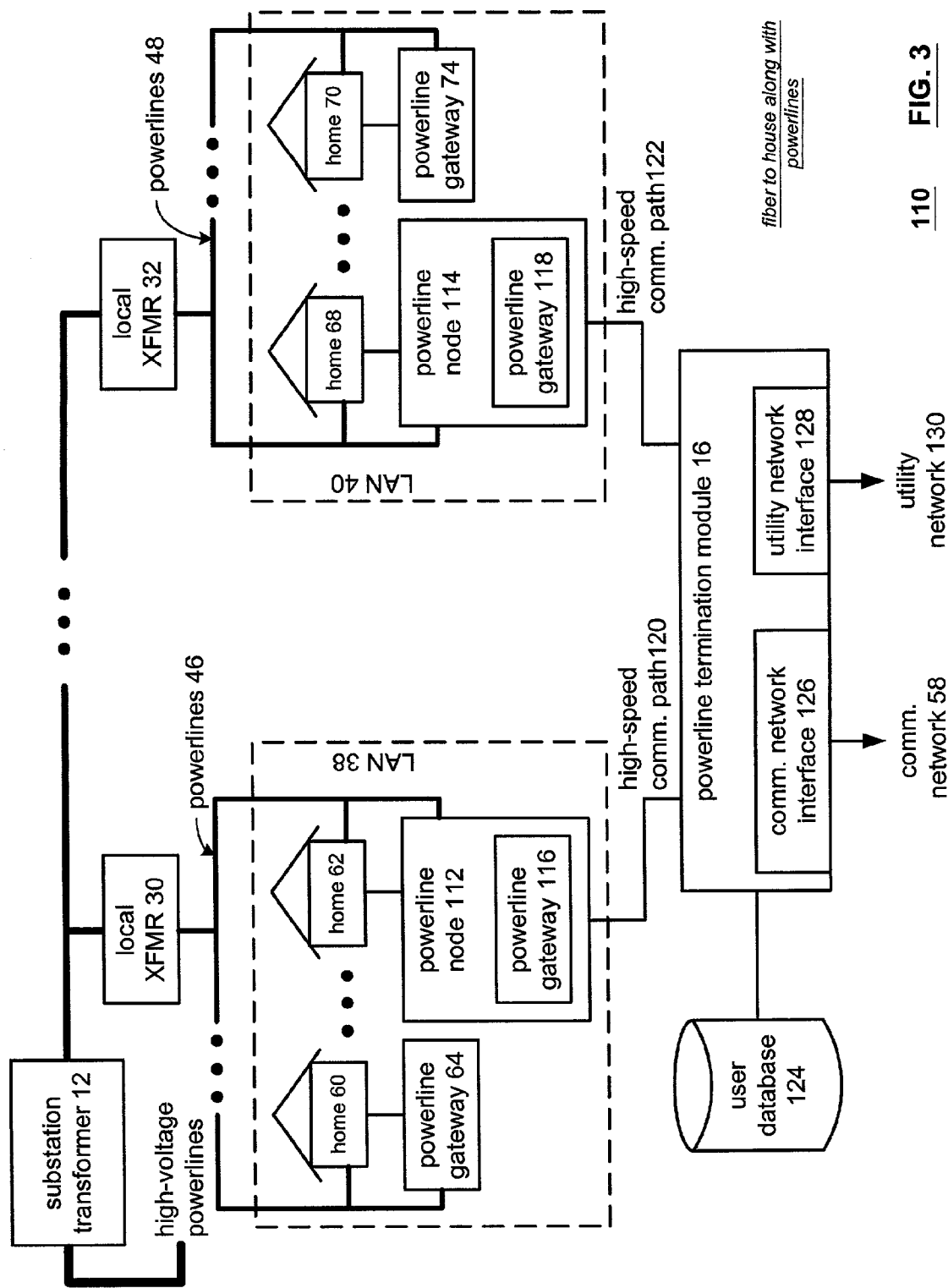
FIG. 3 illustrates a schematic block diagram of another powerline based communication system in accordance with the present invention.

FIG. 3 illustrates a schematic block diagram of another powerline base communication system 110. The system 110 includes a plurality of substation transformers (only one shown), a plurality of local distribution transformers 30 and 32, and a plurality of local area networks 38 and 40. In this example system, powerline nodes 112 and 114 are associated with an individual home 62 and 68, respectively, within the LAN they support. In addition, each of the powerline nodes 112 and 114 include a powerline gateway 116 and 118 to facilitate transceiving data for the individual home 62 or 68. Each of the powerline nodes 112 are operably coupled to the powerline termination module 116 via a high-speed communication path 120 or 122, which may be a fiber optic cable, coaxial cable, telephone line, wireless communication path, and/or any communication medium that allows 2 devices to transmit analog and/or digital information there between.

The powerline termination module 16 includes a communication network interface 126 and a utility network interface 128. The communication network interface 126 allows the powerline termination module 16 to be operably coupled to a communication network 58. The communication network interface 126 includes the multiplexing and de-multiplexing, switching, routing and/or other interconnections required to interface a plurality of local users with the communication network 58.

The utility network interface 128 provides a similar function but with respect to a utility network 130. Most power companies have their own network to allow communication with substations, local distribution transformers, etc. As such, the utility network 130 may be utilized as at least a portion of the switching fabric to couple multiple local area networks associated with various substations together. This may be done alternatively to or in addition with the coupling to the communication network 58.

The powerline termination module 16 also includes a user database 124, which includes a listing of each user associated with each of the local area networks serviced by the powerline termination module 16. Such information includes, but is not limited to, user identification code, user access code, type of use, type of service, access information, access privileges, et cetera. In general, the powerline termination module 16 provides the platform for system management and controls the high-speed data paths. In one embodiment, the powerline termination module includes a fully redundant architecture that provides fault protection for the control of the system and for the connection to the communication network 58. In addition, the power termination module 16 provides platform interfaces for element management to support up to 2,000 customers, or users. Typically, the powerline termination module 16 will use optical interfaces from 2.4 to 10 gigabits per second to interface with the powerline nodes. Such optical interfacing will utilize a gigabit Ethernet physical layer.

The powerline nodes of FIGS. 1, 2 and 3 generally provide the platform for a conversion of the high-speed electrical of light signals, which may be carried via wires, radio frequencies, and/or fiber optics, from the network into electrical signals that are transmitted over the powerline infrastructure to the users of the LANs. The powerline nodes may physically reside at a location that provides the best intersection of the signal to the power network. Such possible locations include at the customer side of the substation transformer, at the customer side of the local distribution transformer, or at a home within the neighborhood serviced by the local distribution transformer. In addition, each of the powerline nodes should be weather proof such that no additional environment protection is needed.

As previously mentioned, each of the substation transformers produces a 3-phase high voltage signal. In accordance with the present invention, each phase produced by the substation transformer may carry separate modulated data for a local area network or a plurality of local area networks. For example, when the services for a particular local area network are relatively low speed, a powerline node may be located at the substation transformer on a one per phase basis (i.e., line to ground) to provide services such as meter reading, turn on-off electrical equipment within the home, burglar alarm activation/deactivation, et cetera. In addition, low speed signaling may be used to test particular power networks to verify bandwidth capabilities. For broadband services, such as Internet access, telephony, et cetera, the powerline node would be located at the low voltage side of a local distribution transformer.

In one embodiment, a powerline node would typically serve in the range of 1–15 homes. In an area where more than 15 homes are supported by a local distribution transformer, a plurality of powerline nodes may be utilized. To provide isolation on the powerlines from powerline node to powerline node, and from local area network to local area network, different modulation frequencies may be utilized, the powerlines may be frequency division multiplex, time division multiplex, and/or any other mechanism for isolating multiple signals on a single transmission path.

As one of average skill in the art will appreciate, the powerline nodes and powerline gateways may include a battery backup, generator, and/or a fuel cell to power respective portions of the local area network as well as provide in home power when local services have been disrupted.

As one of average skill in the art will further appreciate, a powerline base communication system may be configured in accordance with FIGS. 1, 2 and/or 3. For example, one local area network may include a powerline node that is affiliated with a particular home, one local area network may be supported by a powerline node that is physically co-located with the local distribution transformer, while multiple local area networks may be supported by a single powerline node wherein AC coupling provides connectivity between local area networks. In addition, the substation transformer may include the powerline node that provides communication to the entire network affiliated with that particular substation.

Figure 4:
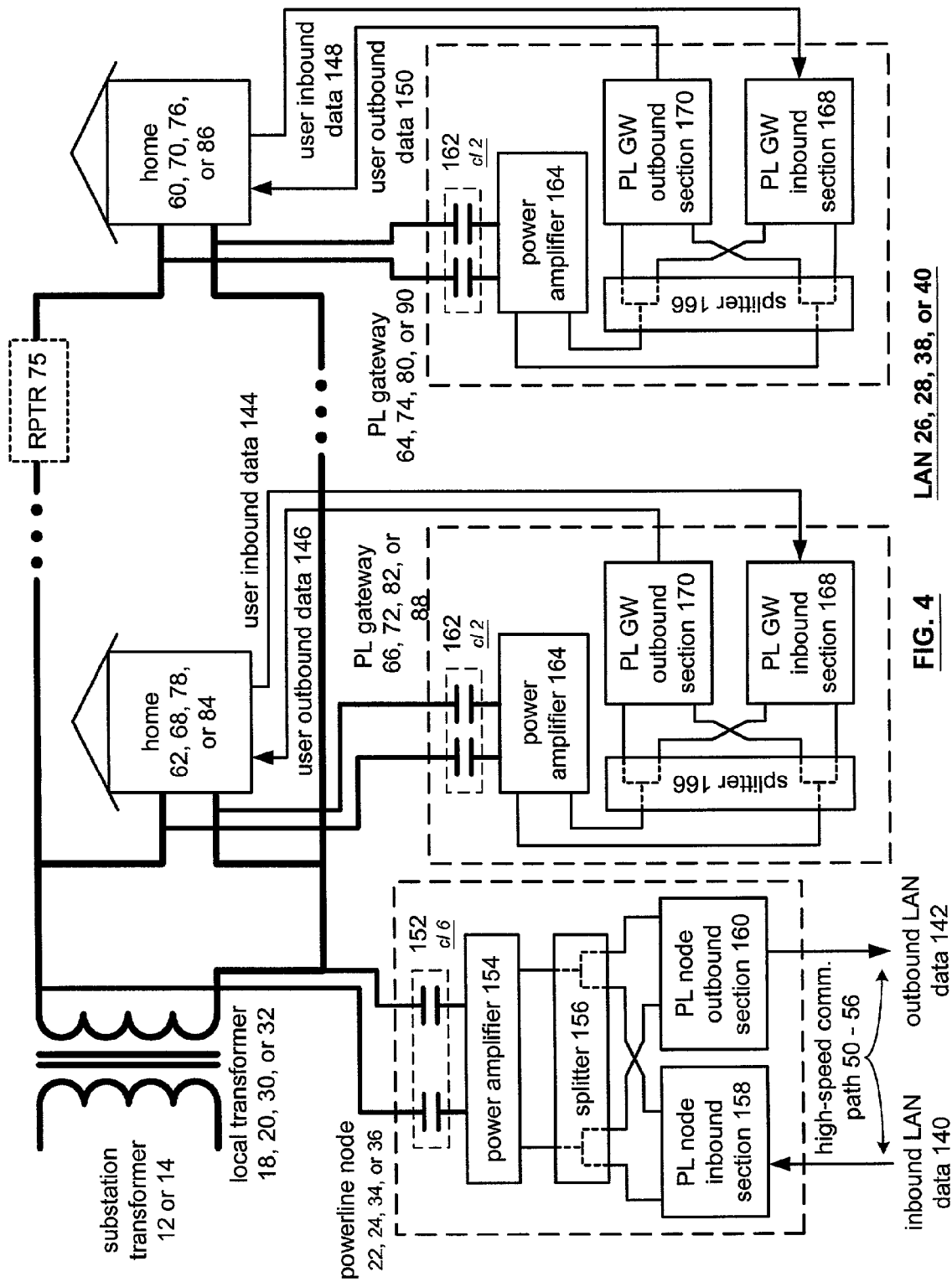
FIG. 4 illustrates a schematic block diagram of a powerline node and powerline gateway in accordance with the present invention.

FIG. 4 illustrates a schematic block diagram of a representative local area network wherein the powerline nodes 22, 24, 34 and 36 are shown in greater detail as well as the powerline gateways 64, 66, 72, 74, 80, 82, 88 and 90. As shown, the powerline node, 22, 24, 34 or 36 includes an AC coupling module 152, a power amplifier 154, a splitter 156, a powerline node inbound section 158 and a powerline node outbound section 160. The inbound and outbound sections 158 and 160 are operably coupled to the high-speed communication path 50 through 56. As coupled, the powerline node 22, 24, 34 or 36 process inbound local area network data 140 and outbound local area network data 142.

In general, inbound section 158 of the powerline node 22, 24, 34 or 36 processes the inbound local area network data 140 based on a desired communication convention. The desired communication convention may be time division multiplexing, frequency division multiplexing, carrier sense multi-access (CSMA), CSMA with collision avoidance, CSMA with collision detection, encryption, buffering, frame relay packetizing, ATM packetizing, internet protocol (IP), and/or any convention for packetizing, framing, and/or encoding data for transmission via a communication network. As such, the inbound local area network data 140 is received via the high-speed communication path 50 through 56 in accordance with a particular communication convention.

Upon receipt, the inbound section 158 deciphers the local area network data 140 to identify the individual addressees, i.e., the individual users within the local area network it supports. The deciphered LAN data 140 is then processed in accordance with the communication convention of the LAN, which may be time division multiplexing, frequency division multiplexing, carrier sense multi-access (CSMA), CSMA with collision avoidance, CSMA with collision detection, encryption, buffering, frame relay packetizing, ATM packetizing, internet protocol (IP), and/or any convention for packetizing, framing, and/or encoding data for transmission via a communication network. The processed data is then modulated in accordance with a modulation protocol of the LAN and provided to splitter 156.

The splitter 156 may be of conventional construct, such as a transformer having a primary and two secondary windings, or a direct access arrangement (DAA), or any device that provides an equivalent function. The power amplifier 154 receives the modulated data via the splitter 156. The power amplifier 154, which may be of a conventional construct as found in DSL modems, ISDN modems, 56K modems, and/or any other type of modem, amplifies the modulated data and, via the AC coupling module 152, places the amplified modulated signals on the powerlines.

Each of the powerline gateways, 64, 66, 72, 74, 80, 82, 88 and 90 are operably coupled to the powerlines at the respective homes. Each of the powerline gateways includes an AC coupling module 162, a power amplifier 164, a splitter 166, a powerline gateway inbound section 168 and a powerline gateway outbound section 170. The modulated data that has been placed on the powerlines by the AC coupling module 152 of the powerline node is received via the AC coupling module 162 of the powerline gateways. The received modulated signals are provided to power amplifier 164, which also may be of a conventional modem construct, amplifies the signals and provides the amplified signals to splitter 166. The splitter 166, which may be of conventional construct, separates the outbound signals, (i.e., the modulated signals received from the powerline node) from the inbound signals (i.e., the received signals from the user that are to be modulated and provided to the powerline node).

As one of average skill in the art will appreciate, for full duplex operation, the inbound data will be modulated at a different frequency than the outbound data. As such, the transmit path (i.e., from the powerline node to the powerline gateways) and receive path (i.e., from the powerline gateways to the powerline node) within the local area network will operate at different frequencies. If half duplex conveyance of data is desired, the same frequency may be used for transmit and receive paths. As such, at certain times, or as indicated by the powerline node, the communication path will be used for data transmission, i.e., from the powerline node to the powerline gateways, or data reception, i.e., from the powerline gateways to the powerline node.

Once the modulated data has been amplified and separated by the splitter 164, the powerline gateway outbound section 170 demodulates the data in accordance with the modulation/demodulation protocol of the LAN. The outbound section 170 then processes the demodulated data in accordance with the LAN communication convention, (e.g., TDM, FDM, CSMA, CSMA with CA, CSMA with CD, decryption, buffering, frame relay packetizing, ATM packetizing, internet protocol (IP), and/or any convention for packetizing, framing, and/or encoding data for transmission via a communication network) to produce retrieved data. The outbound section 170 then provides the retrieved data to the home as user outbound data 146. Each powerline gateway will perform a similar function with respect to modulated inbound data on the powerlines.

The coupling of the powerline gateway to the home may be done through a modem, a direction connection, a connection into an in-home network, or any other means for provided data to a user. Once the data is in the home, it may be routed in accordance with whatever in-home networking, or direct connect, convention used therein to a desired end-user.

Each of the users within the homes 60, 62, 68, 70, 76, 78, 84 or 80 also produce user inbound data 144 or 148. The user inbound data 144 or 148 is data generated by a user who desires to transmit it to the communication network to another user via the powerline node. Note that if the user is communicating from home to home within the local area network, the powerline node may facilitate the switching of the data such that the data is not provided on the high-speed communication path 50 or 56. Similarly, if the initiating user and target user are supported by the same powerline termination module, the powerline termination module may provide the appropriate switching, and/or routing, to facilitate the communication.

Once a user has generated the user inbound data 144 or 148, it is processed by the powerline gateway inbound section 168. The powerline gateway inbound section 168 processes the data in accordance with the desired communication convention of the LAN and then modulates the process data in accordance with the modulation protocol of the LAN. The modulated data is provided to splitter 166 and then amplified by power amplifier 164. The amplified signal is placed on the powerlines via the AC coupling module 162, which includes a pair of high voltage capacitors.

The powerline node receives the user inbound modulated user data via the powerlines and the AC coupling module 152, which provides the received signals to the power amplifier 154. The power amplifier 154 amplifies the received inbound modulated user data and provides the amplified data signals to the splitter 156. The splitter 156 separates the user inbound modulated data 144 or 148 from the inbound local area network data 140. The powerline node outbound section 160 receives the modulated user data, demodulates it based on the modulation/demodulation protocol of the LAN to produce demodulated data. The outbound section then processes the demodulated data from the plurality of powerline gateways based on the communication convention (e.g., TDM, FDM, CSMA, CSMA with CA, CSMA with CD, decryption, buffering, frame relay packetizing, ATM packetizing, internet protocol (IP), and/or any convention for packetizing, framing, and/or encoding data for transmission via a communication network) of the high-speed communication path 50–56. Once the data has been processed, the outbound section 160 places the data on the high-speed communication path 50–56 such that the powerline termination module 16 subsequently receives it. Alternatively, the powerline node may be coupled via the high-speed communication path to the communication network, such that the processed data is directly routed to the communication network.

As one of average skill in the art will appreciate, the communication convention used to transceive data via the high-speed communication path 50–56 between the powerline nodes and the communication network and/or the powerline termination module 16, may be a different communication convention from the one used within each of the local area networks. For example, the transmission of user inbound data 144 may utilize a CSMA type process while the data on the high-speed communication path 50–56 may utilize a frame relay communication convention, ATM communication convention, other packetized communication convention, or a frame based communication convention. In addition, each local area network with the powerline based communication system may use a different communication convention, however, the communication convention between the powerline nodes and the powerline termination module will be the same. Further, the modulation/demodulation protocol, which may be amplitude modulation, frequency modulation, frequency shift keying, phase shift keying, quadrature amplitude modulation, discrete multi-tone, orthogonal frequency division multiplexing, and code division multiple access, used in each LAN may be the same or varying from LAN to LAN.

Figure 5:
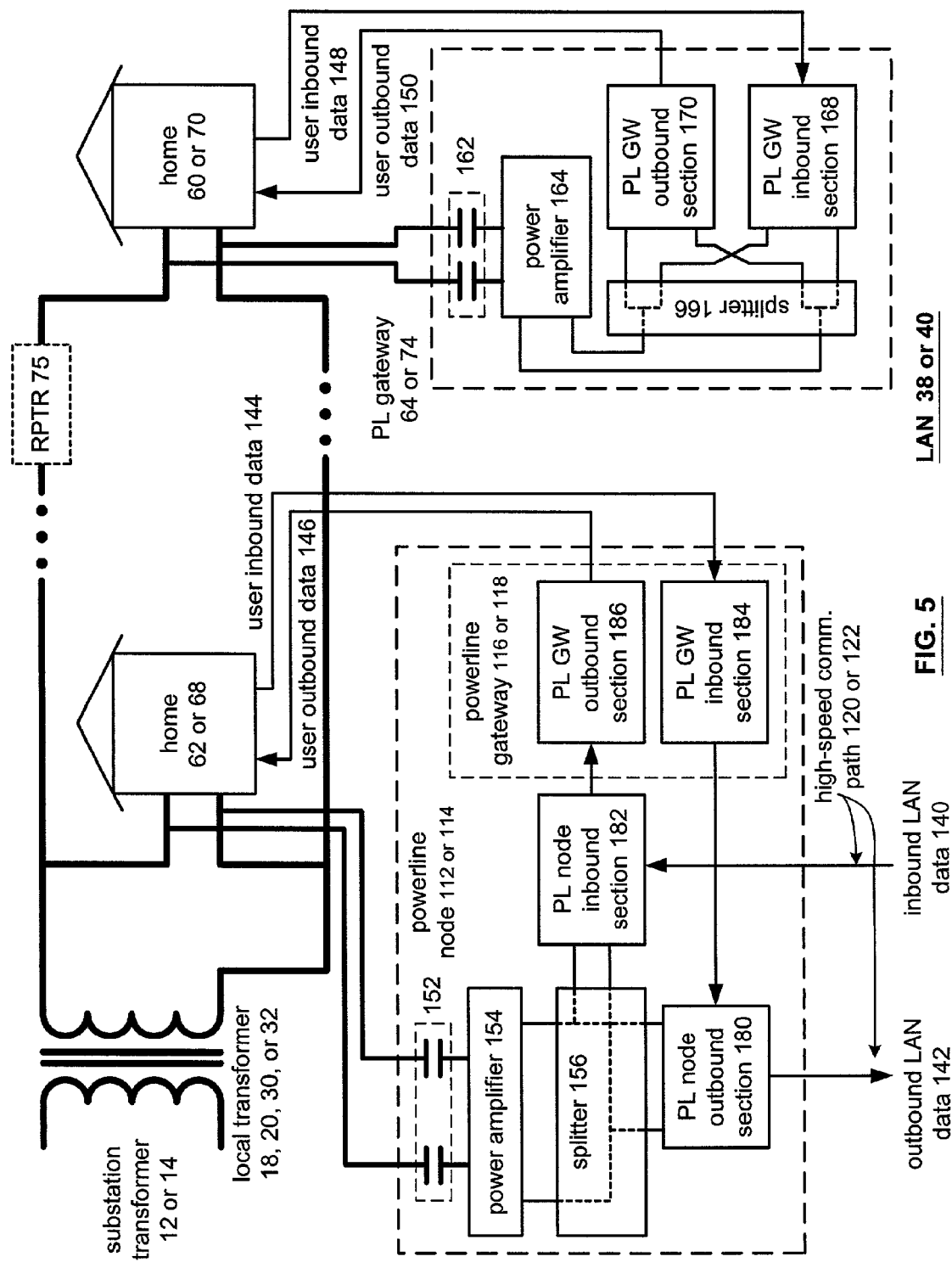
FIG. 5 illustrates a schematic block diagram of an alternate powerline node and powerline gateway in accordance with the present invention.

FIG. 5 illustrates a schematic block diagram of the local area network 38 or 40 of FIG. 3. In this illustration, powerline node 112 includes a powerline gateway 116 or 118 and is associated with home 62 or 68. In addition, the powerline node 112 includes the AC coupling module 152, the power amplifier 154, the splitter 156, a powerline node inbound section 182 and a powerline node outbound section 180. The powerline node inbound section 182 is operably coupled to the high-speed communication path 50–56 to receive inbound local area network data 140. The powerline node inbound section 182 interprets the inbound local area network data 140 to determine whether any of the data is destined for a user within home 62 or 68. If so, the home's data is separated from the remainder of the LAN data and provided to the powerline gateway 116. The powerline gateway outbound section 186 processes the local area data for the user within home 60 or 62 and provides the user outbound data 146 to the home. The remainder of the inbound local area network data 140 is processed by the powerline node inbound section 182 in a similar fashion as the inbound local area network data was processed by powerline node inbound section 158 of FIG. 4.

The user at home 62 or 68 generates user inbound data 144. The powerline gateway inbound section 184 of powerline gateway 116 or 118 receives the user inbound data 144, processes it in accordance with the communication convention and provides it to the powerline node outbound section 180. Alternatively, the powerline gateway inbound section 184 passes the user outbound data 146 directly to the powerline node outbound section 180. The powerline node outbound section 180 processes the received user outbound data 146 with the other data it receives via the powerlines, the AC coupling module 152, and the splitter 156. The functionality of the powerline node output section 180 is similar to the functionality of the powerline node output section 160 of FIG. 4.

The powerline gateway 64 or 74 as shown in FIG. 5 functions in a similar way as the powerline gateways discussed with reference to FIG. 4. As such, in this configuration, the powerline node 112 or 114 is mounted to an individual home wherein the high-speed communication path 120 or 122 is provided directly to the home. As such, power companies may provide a single fiber optic line, or other high-speed communication link, to one home within a neighborhood supporting a powerline node as opposed to running such high-speed communication links to each home in the neighborhood. The one high-speed communication link, via the powerline node, supports the data needs of the entire neighborhood. By having one home directly coupled to a high-speed communication path as opposed to many, there is substantial installation cost savings. The cost savings in each neighborhood is achieved by having the powerline node 112 or 114 and a plurality of powerline gateways providing the final 100 feet, or so, of a communication system. In addition, many homes that are physically inaccessible, or physically difficult to reach, can now receive broadband communication services.

Figure 6:
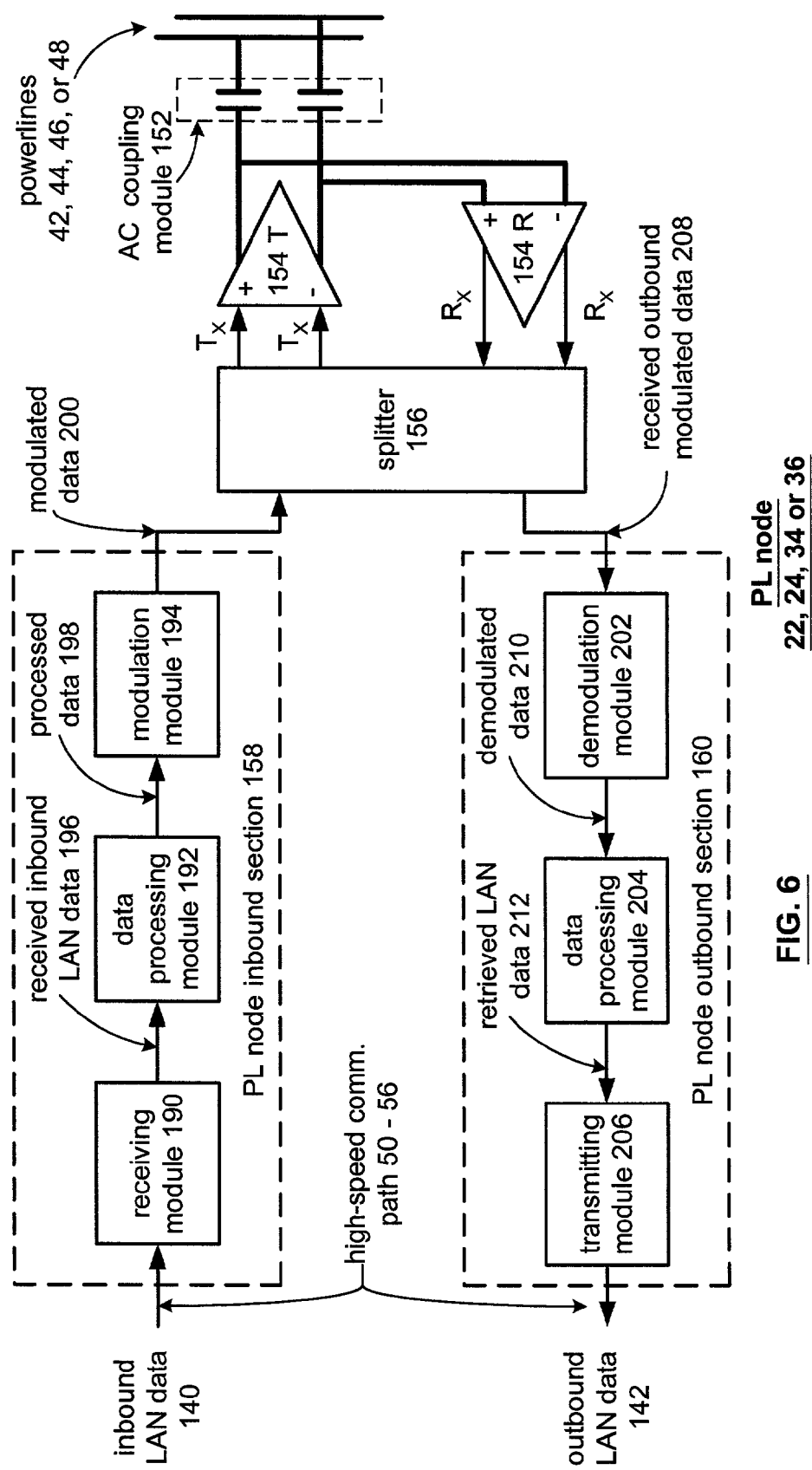
FIG. 6 illustrates a more detailed schematic block diagram of a powerline node in accordance with the present invention.

FIG. 6 illustrates a more detailed schematic block diagram of powerline nodes 22, 24, 34 or 36. As shown, the AC coupling module 152 includes a pair of high voltage capacitors, which have a capacitance value depending on the frequency of the modulated data. For example, frequencies in the kilohertz range may require a relatively large capacitor, in the range of 10 to 100 µF (micro Farads), whereas modulated data in the megahertz range would require capacitors in the nF (nano Farad) range. Each of the capacitors should have a sufficient voltage rating to withstand a voltage differential supported by the powerlines. For example, if the powerlines are supporting 240 volts, the voltage rating of the capacitor should be in excess of 240 volts.

As shown, the high voltage capacitors of the AC coupling module 152 directly couple the powerlines 42, 44, 46, and 48, to the differential output of a transmit power amplifier 154T and to the inputs of a receiving power amplifier 154R. The receiving power amplifier 154R provides a differential output to the splitter 156. The splitter 156 also provides a differential input to the transmit power amplifier 154T. The splitter 156 outputs the received differential signal as the received output modulated data 208 to the powerline node outbound section 160.

The powerline node output section 160 includes a demodulation module 202, a data processing module 204, and a transmitting module 206. The demodulation module 202 receives the outbound modulated data 208, demodulates it to produce demodulated data 210. The demodulation module 202 uses a demodulation scheme that is dependent on the modulation scheme used to produce the modulated data 208. For example, the modulation, and hence the corresponding demodulation scheme, may be amplitude modulation, frequency modulation, frequency shift keying, phase shift keying, quadrature amplitude modulation, discrete multi-tone encoding, orthogonal frequency division multiplexing, spread spectrum modulation, and/or any technique for transmitting and/or receiving data using a carrier frequency or plurality of carrier frequencies.

The data processing module 204 receives the demodulated data 210 and processes it in accordance with the desired communication convention to produce retrieved local area network data 212. The communication convention may be time division multiplexing, frequency division multiplexing, CSMA, CSMA with collision avoidance, CSMA with collision detection, decryption, buffering, frame processing, packetized information processing, and/or any other convention for conveying data through a switching fabric between users.

The transmitting module 206 receives the retrieved local area network data 212 and provides it as outbound local area network data 142 on the high-speed communication path. The transmit module 206 may include an electrical interface such as a connector, may include an electrical to an optical interface, may include buffering, and/or any means for transmitting optical and/or electrical signals.

The powerline node inbound section 158 includes a receiving module 190, a data processing module 192, and a modulation module 194. The receiving module 190 is operably coupled to receive inbound local area network data 140 via the high-speed communication path 50–56. The receiving module 190 may include an electrical interface, an optical to an electrical interface, buffering, and/or any means for receiving optical and/or electrical signals. The data processing module 192 receives the inbound local area network data 196 and processes it in accordance with the communication convention to produce process data 198. As mentioned, the communication convention may be in accordance with frame relay processing, time division multiplexing, ATM packetizing data, other packetizing conventions, label switched networks, multiple protocol label switching, CSMA, CSMA with collision avoidance, CSMA with collision detection, encryption, and/or buffering.

The modulation module 194 receives the processed data 198 and produces therefrom modulated data 200. The modulation module 194 modulates the processed data in accordance with the modulation protocol used within the LAN. Such a modulation protocol includes amplitude modulation, frequency modulation, frequency shift keying, phase shift keying, quadrature amplitude modulation, discrete multi-tone modulation, orthogonal frequency division multiplexing, spread spectrum encoding, and/or any other modulation technique for placing a data signal onto a carrier frequency or a plurality of carrier frequencies.

The splitter 156 receives the modulated data 200 and provides it to the transmit power amplifier 154T. The power amplifier 154T produces a differential output that is provided to the AC coupling module 152. The amplified modulated data 200 is then placed on powerlines 42, 44, 46 or 48, which may be received by one or more of the powerline gateways coupled to the respective powerlines.

Figure 7:
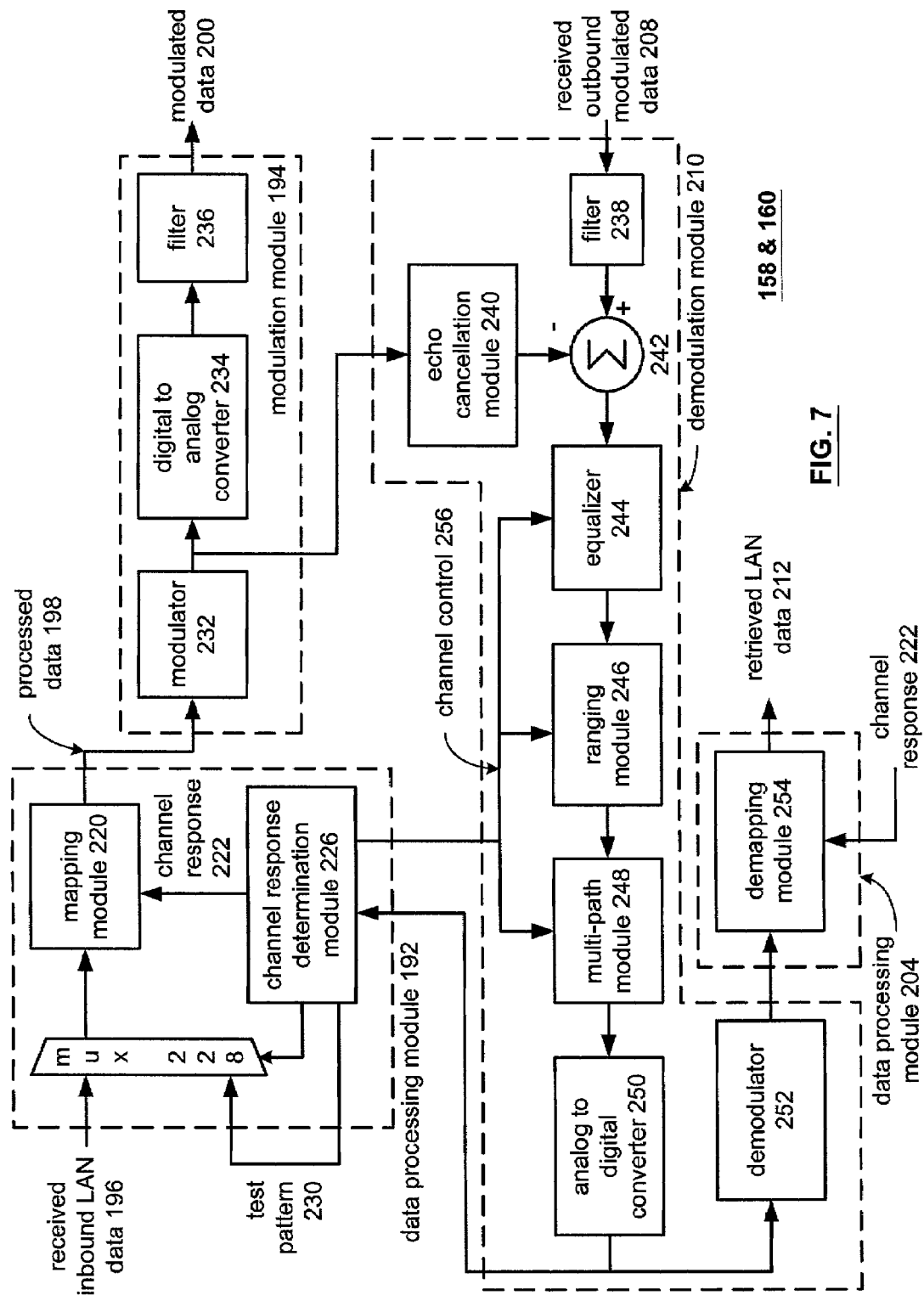
FIG. 7 illustrates a detailed schematic block diagram of a portion of the powerline node of FIG. 6.

FIG. 7 illustrates a more detailed schematic block diagram of an embodiment of the powerline node inbound section 158 and powerline node outbound section 160 of FIG. 6. As shown, the data processing module 192 of the inbound section 158 includes a multiplexor 228, a channel response determination module 226 and a mapping module 220. The multiplexor 228 is controlled by the channel response determination module 226 to output either received inbound local area network data 196 or test pattern data 230. In normal operation, the multiplexor 228 will output the received inbound local area network data 196. In test mode and/or set-up mode, the channel response determination module 226 produces test patterns 230 (i.e., known signals), which are outputted by multiplexor 228. The test patterns are generated to enable the channel response determination module 226 to determine the frequency characteristics of the powerlines within the local area network.

The mapping module 220 receives the inbound LAN data 196 or the test pattern 230 and maps the data into frequency bins based on the channel response 222 of the powerlines. The mapped, or processed, data 198 is then provided to the modulation module 194. The functionality of the data processing module 192 will be described in greater detail with reference to FIGS. 8 and 9.

The modulation module 194 includes a modulator 232, a digital to analog converter 234, and a filter 236. The modulator 232 modulates the processed data 198 in accordance with the modulation protocol incorporated by the local area network. The modulated data is then converted to an analog signal via the digital to analog converter 234. The analog signal is then filtered via filter 236 and provided as modulated data 220. The output of modulator 232 is also provided to an echo cancellation module 240 of the demodulation module 210.

The demodulation module 210 includes a filter 238, a summing module 242, the echo cancellation module 240, an equalizer 244, a ranging module 246, a multipath module 248, an analog to digital converter 250, and a demodulator 252. The data processing module 204 includes a demapping module 254. The demodulation module 210 may further include an error correction module that provides CRC verification, forward error correction, and/or any other type of conventional error correction to compensate for impulse noise, line variations, etc.

The filter 238 is operably coupled to filter the outbound modulated data 208. The summing module 242 subtracts the modulated data 200 via the echo cancellation module 240 from the filtered outbound modulated data 208. As one of average skill in the art will appreciate, the magnitude of the modulated data 200 will in many cases be substantially greater than the magnitude of the outbound modulated data 208. Thus, echo cancellation is required to accurately interpret the outbound modulated data 208.

The equalizer 244 is operably coupled to receive the output of summing module 242 and is programmed by the channel response determination module 226 via a channel control signal 256 to equalize the magnitude of the signals in the frequency bins across the frequency of interest. As one of average skill in the art will appreciate, carrier frequencies having lower frequencies typically have a greater magnitude when transmitted over a distance than carrier frequencies having higher frequencies. In addition, environmental conditions cause variations in the performance of the powerlines such that such frequency bins may have varying amplitudes. Accordingly, the equalizer 244 is programmed based on the channel response determination module to equalize the energies within the frequency bins across the frequencies of interest. The channel response determination module 226 determines the channel control signal 256 for the equalizer based on the processing of the test patterns 230 when received via the demodulation module 210.

The ranging module 246 is programmed via the channel response determination module 226 via the channel control signal 256 to account for impedance variations of the loading on the powerline.

The multipath module 248 is operably coupled to receive the output of the ranging module 246 to provide for compensation for multipath errors on the powerlines. The level of error correction is based on a channel control signal 256 as determined by the channel response determination module 226. As one of average skill in the art will appreciate, the demodulation module 210 may include one or more of the equalizer, ranging module 246 and multipath module 248. If the demodulation module 210 includes each of these elements, the control channel signal 256 will include separate signaling for each of these modules such that each module may be separately programmed. The correction for multipath error, ranging, and equalization of signals is known, thus no further discussion will be presented except to facilitate the understanding of the present invention. As one of average skill in the art will further appreciate, the powerlines may be pre-tested (i.e., prior to the installation of the powerline node and associated powerline gateways), using a device that includes the channel response module 226, the equalizer 244, the ranging module 246, and/or the multi-path module 248. By pre-testing the response of the powerlines, the elements of the powerline node and powerline gateways may be tuned to provide more reliable initial operation.

The analog to digital converter 250 receives the output of the multipath module 248 and produces a digital representation thereof. The digital representation is provided to the channel response determination module 226 and to demodulator 252. The demodulator 252 demodulates the digital signal based on a demodulation protocol, which corresponds to the modulation protocol utilized to produce the modulated data 200, to retrieve the data. The demodulated data is provided to the demapping module 254, which, based on the channel response 222, produces the retrieved local area network data 212.

Figure 8:
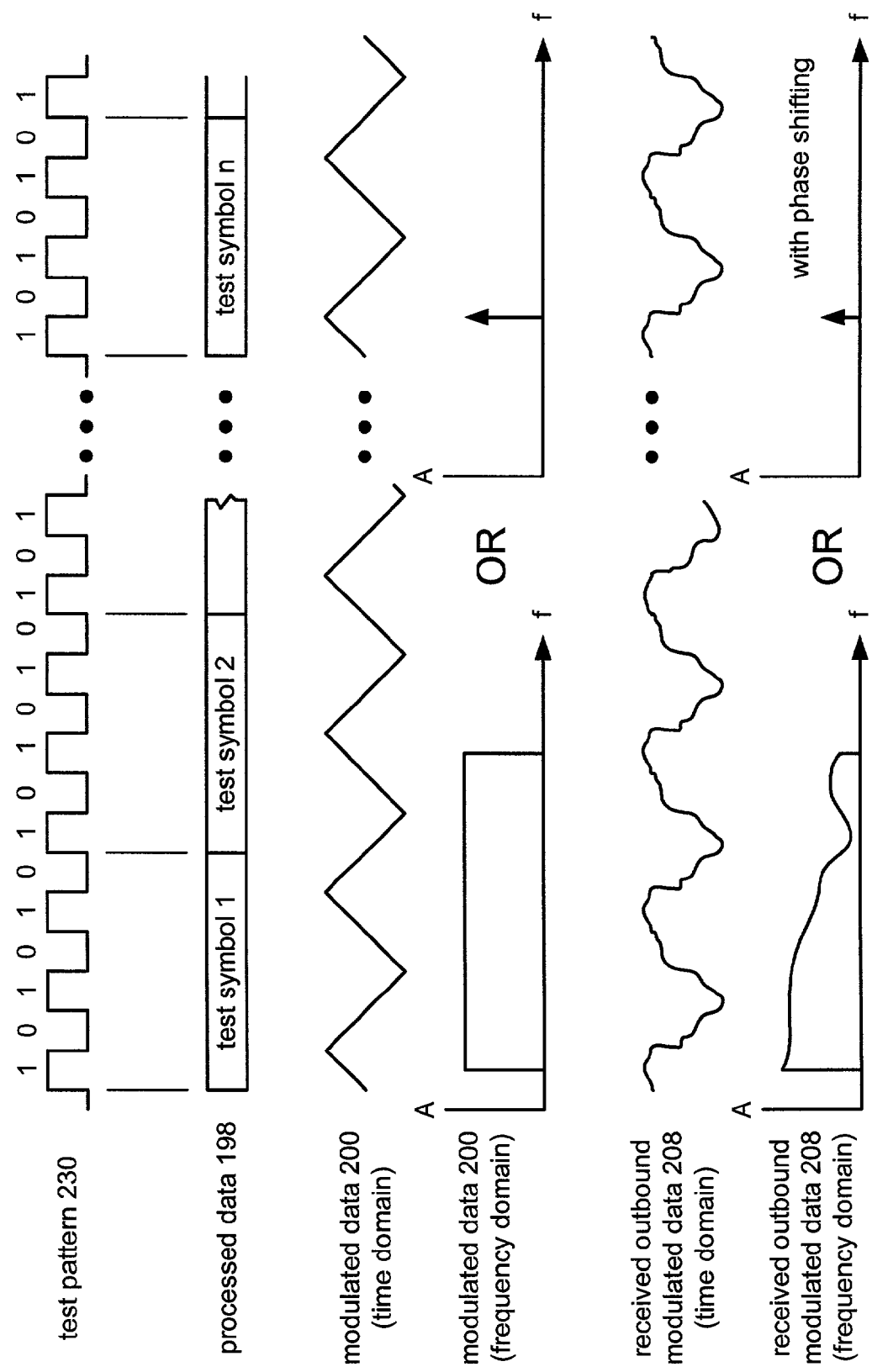
FIGS. 8 and 9 illustrate a graphical representation of the general operation of the powerline node in accordance with the present invention.
Figure 9:
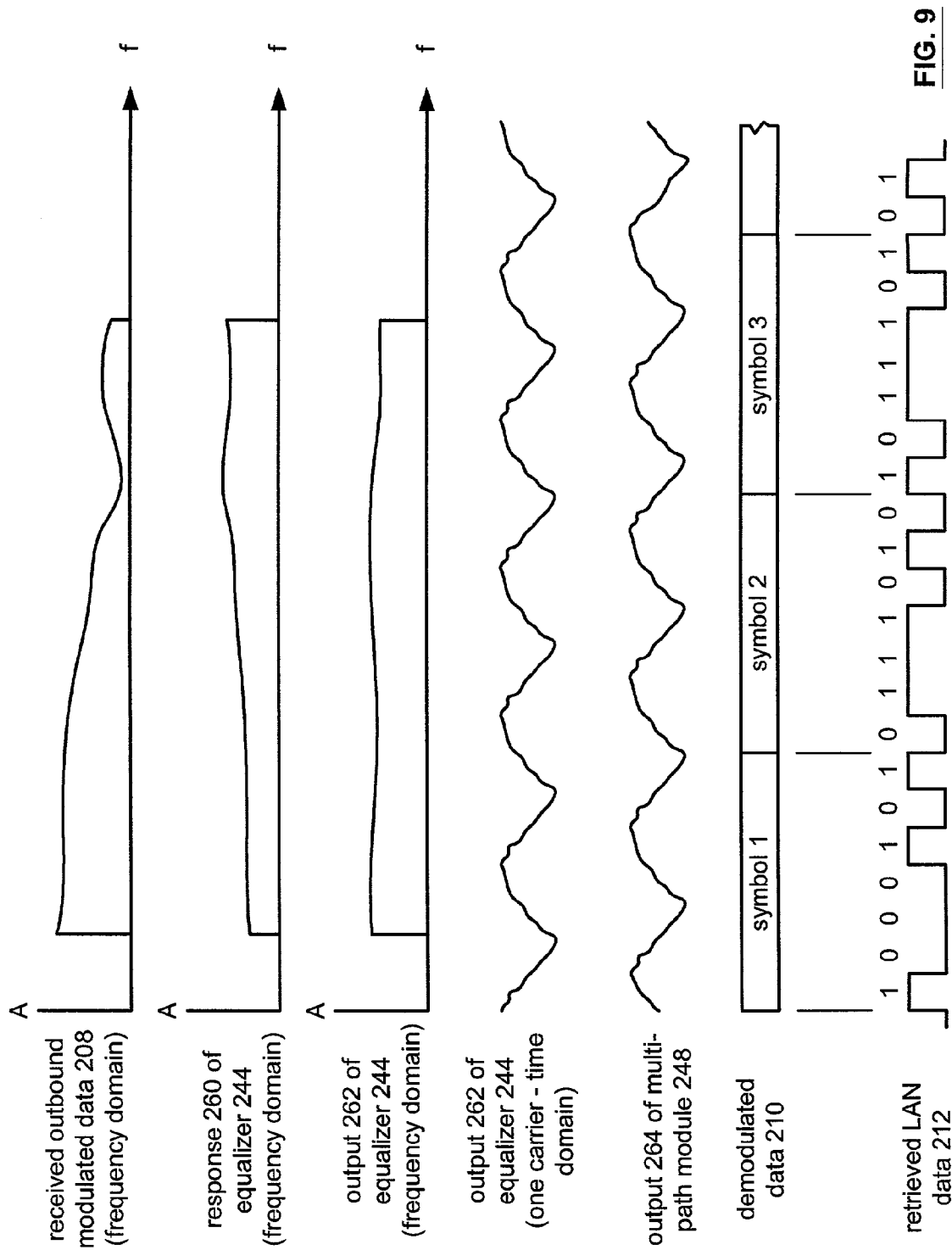

FIGS. 8 and 9 illustrate a graphical representation of the operation of the circuit of FIG. 7. As shown in FIG. 8, a test pattern 230 is generated to include a series of bits, which may be representative of a pulse tone similar to the training sequences used in DSL modem-central office interaction. The mapping module 220, based on the channel response 222, produces processed data 198. In essence, the mapping module 220 maps the data of the test pattern 230 into test symbols identified by test symbol 1, test symbol 2, through test symbol n. The test symbols may be formatted in accordance with frame relay transmissions, packetized transmissions, and/or label switching packets.

The processed data 198 is modulated into an analog signal via the modulation module 194. The modulated data 200 is shown in the time domain for a single carrier frequency. If the modulation scheme utilizes a plurality of frequency bins, each frequency bin would have its own analog signal having a unique frequency. This is shown as the time domain representation of the modulated data 200. The modulated data 200 is also shown in the frequency domain. The $1^{st}$ representation of the frequency domain illustrates the modulated data 200 spanning a multitude of frequencies (e.g., 1 MHz to 10 MHz). The range of frequencies includes a plurality of frequency bins for transporting the processed data 198 once modulated. Conversely, if the modulation scheme incorporates a single carrier frequency, the frequency domain representation of the modulated data 200 is shown in the right portion of the figure. As one of average skill in the art will appreciate, if the mapping module processes the received inbound local area network data 196, the processed data 198 will include symbols representing the inbound local area network data 196 as opposed to the test symbols representing the test pattern 230. The representation of the modulated data in the time and frequency domain will be similar.

In the test mode, the plurality of powerline gateways may echo back the test patterns received from the powerline node, or may generate their own test patterns to transmit to the powerline node. In either situation, the demodulation module 210 receives the outbound modulated data 208. The outbound modulated data 208 is shown in both the time and frequency domains. As shown in the time domain, the triangular waveform of the modulated data 200 has been distorted into a triangle-like shape signal due to distortion caused by the characteristics of the powerline. The frequency domain representation of the modulated data 208 has the amplitude, or available bits per carrier frequency, vary with respect to the frequency. If the modulation, and corresponding demodulation technique utilizes a single carrier frequency, the frequency domain representation of the output modulated data 208 would appear on the right and have some corresponding phase shifting.

The channel response determination module 226 receives the outbound modulated data 208 via the analog to digital converter. Based on the difference between the modulated data 200 and the received outbound modulated data 208 during the test condition, the channel response determination module 206 generates the channel control signal 256 for the equalizer 244, the ranging module 246 and/or the multipath module 248. In addition, the channel response determination module 226, based on the frequency domain of the output modulated data, generates the channel response information 222 that is used by the mapping module 220. For instance, as shown in FIG. 8 with respect to the frequency domain representation of the outbound modulated data 208, the amplitude of the signal drops dramatically as the frequency increases such that the bit capacity with bins in that frequency range may be unusable. As such, the channel response information provided to mapping module 220 would indicate that the bins in this frequency range would not carry data or would carry a minimal amount of data.

FIG. 9 illustrates a portion of the demodulation module 210 after the equalizer 244, ranging module 246, and multipath module 248 have been programmed via the channel response determination module 226. As shown at the top of FIG. 9, the received outbound modulated data in the frequency domain is represented. Based on this information, the channel response determination module 226 determines the response 260 of the equalizer 244. This is shown in the frequency domain. By applying the response 260 of equalizer 244 to the received outbound modulated data 208, the output 262 of equalizer 244, in the frequency domain, is more linear. This is represented as the output 262 of equalizer 244. If the modulation and corresponding demodulation scheme utilizes a single carrier frequency, the output 262 of equalizer 244 is shown in the time domain. In this example, the output of equalizer 262 is more representative of a triangular waveform, which corresponds to the modulated data 200. Note that the ranging module 246 adjusts the reflected impedance of the demodulation module 210 based on the impedance of the powerline.

The multipath module 248 corrects for multipath error, which distorts the signal. As such, the multipath modulator 248 corrects for phase shifting irregularities and distortion due to multipath error. The single carrier time domain representation of the output of multipath module 248 is shown as output 264. The analog signals, or signals of the modulated data 208, after being processed by the equalizer 244, the ranging module 246 and/or the multipath module 248, are converted into a digital signal via the analog to digital converter 250. The demodulator 252 demodulates the digital signals to produce the demodulated data 210. The demodulated data is represented by symbols 1, 2, 3, et cetera. The demapping module 254 receives the demodulated data 210 represented by symbols to produce the retrieved local area network data 212.

Figure 10:
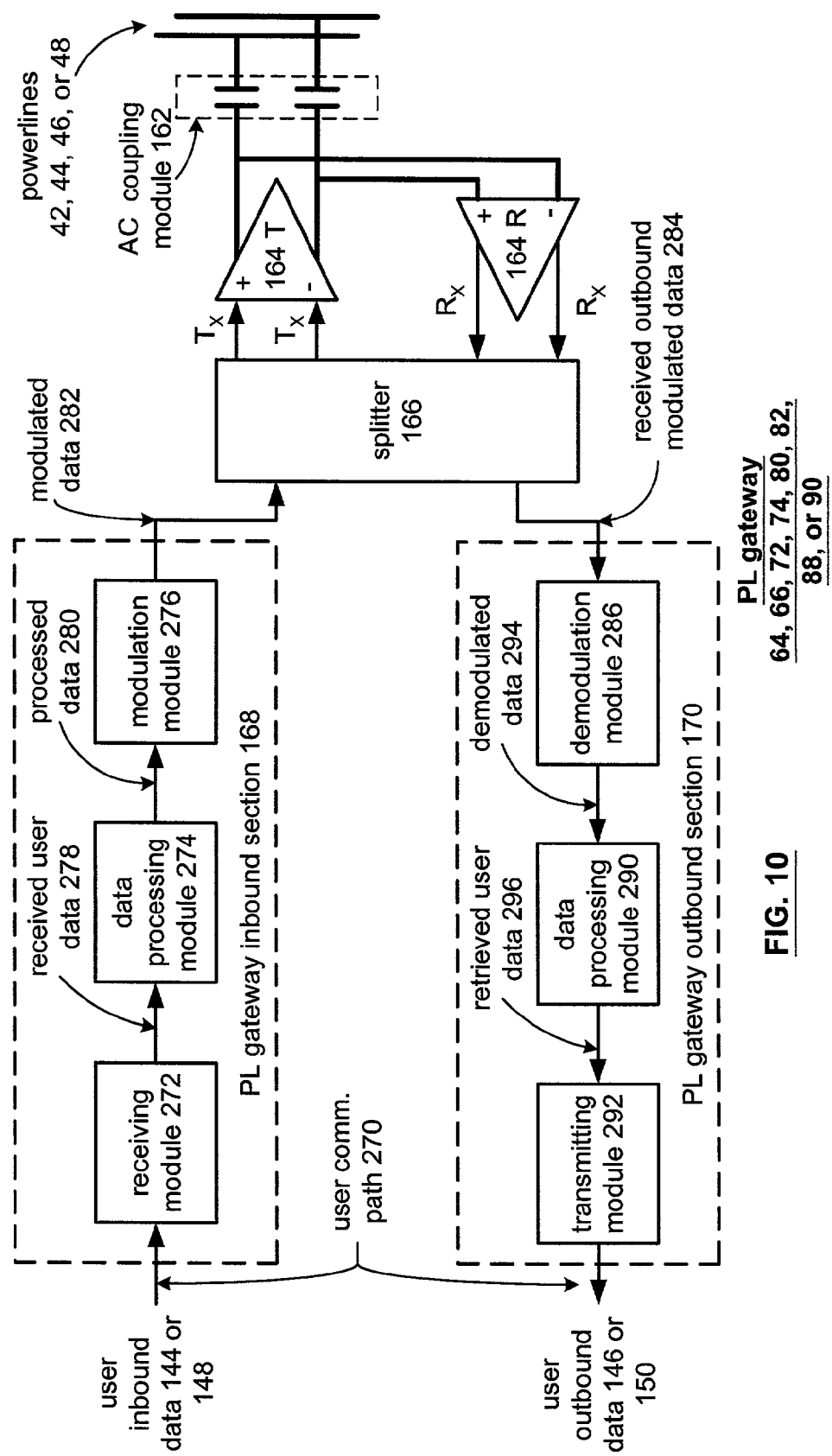
FIG. 10 illustrates a schematic block diagram of a powerline gateway in accordance with the present invention.

FIG. 10 illustrates a graphical representation of the powerline gateways 64, 66, 72, 74, 80, 82, 88 or 90. The gateway includes a powerline gateway inbound section 168, a powerline gateway outbound section 170, a splitter 166, Tx and Rx power amplifiers 164T and 164R, and an AC coupling module 162. The powerline gateway inbound section 168 includes a receiving module 272, a data processing module 274, and a modulation module 276. The receiving module 272, which may be an electrical interface, an optical to electrical interface, and/or a buffer, receives the user inbound data 144 or 148 via a user communication path 270. The user communication path may be an in-home system, phone lines, Ethernet connection, direct connect, wireless connection, and/or any mechanism within a home to couple data to a device outside of the home.

The data processing module 274 receives the inbound user data 278 and processes it in accordance with the desired communication convention to produce the processed data 280. The desired communication convention corresponds with the convention utilized within the local area network such as frame relay, ATM packets, packetizing data, time division multiplexing, frequency division multiplexing, CSMA, CSMA with collision avoidance, CSMA with collision detection, encryption, and/or buffering.

The modulation module 276 receives the processed data 280 and produces therefrom modulated data 282. The modulation module 276 utilizes a modulation protocol to produce the modulation data. The modulation protocol is as previously discussed which may be, but is not limited to, amplitude modulation, frequency modulation, frequency shift keying, phase shift keying, quadrature amplitude modulation, discrete multi-tone modulation, orthogonal frequency division multiplexing, spread spectrum encoding, and/or any other technique for modulating data on a carrier frequency or a plurality of carrier frequencies.

The splitter 166 receives the modulated data 282 and provides it to the transmit power amplifying 164T. The power amplifier 164T produces a differential output that is provided to the AC coupling module 162. The AC coupling module 162 includes a pair of high voltage capacitors that provide AC coupling of the output of the power amplifier 164T to powerlines 42, 44, 46 or 48.

In addition, the AC coupling module 162 provides AC coupling of modulated data on powerlines 42, 44, 46 and 48 to the inputs of the receive power amplifier 164R. The differential output of received power amplifier 164R is provided to splitter 166. The splitter 166 provides the received outbound modulated data 284 to the powerline gateway outbound section 170.

The powerline gateway outbound section 170 includes a demodulation module 286, a data processing module 290, and a transmitting module 292. The demodulation module 286 receives the received outbound modulated data 284 and demodulates it based on the modulation/demodulation protocol. The data processing module 290 receives the demodulated data 294 and processes it in accordance with the desired communication convention to produce retrieved user data 296. The transmitting module 292 provides the retrieved user data 296 as user outbound data 146 or 150 to the user via the user communication path 270.

Figure 11:
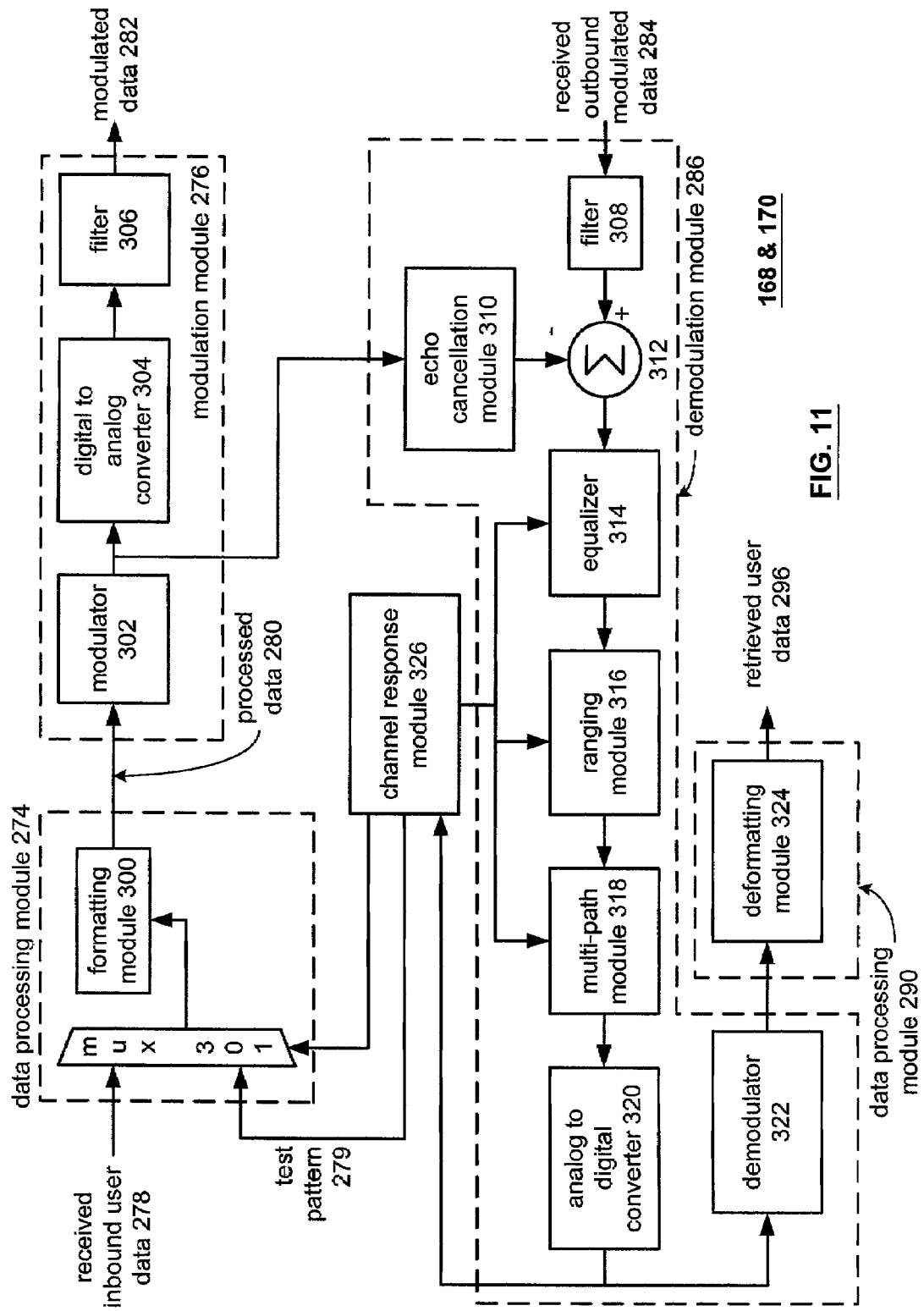
FIG. 11 illustrates a more detailed schematic block diagram of a portion of the powerline gateway of FIG. 10.

FIG. 11 illustrates a more detailed schematic block diagram of the powerline gateway inbound section 168 and powerline gateway outbound section 170 of FIG. 10. As shown, the data processing module 274 includes a multiplexor 301 and a formatting module 300. The multiplexor 301 is operably coupled to receive either received inbound user data 278 or test pattern data 279. The selection is based on an input received via the channel response module 326. The channel response module 326 functions in a similar manner as the channel determination module 226 of FIG. 7. In normal mode, the multiplexor 301 outputs the received inbound user data 278. In test mode, (i.e., in a mode to determine the characteristics of the powerlines) the multiplexor 301 outputs the test patterns 279.

The formatting module 300 is operably coupled to receive the output of multiplexor 301 and format the data to produce processed data 280. The formatting of the data is in accordance with the communication convention used within the local area network. For example, the formatting may be packetizing the data, placing the data in a corresponding time frame, and/or any other communication convention for relaying data via a switching fabric.

The modulation module 276 includes a modulator 302, a digital to analog converter 304 and a filter 306. The modulator 302 is operably coupled to receive the processed data 280 and produce therefrom modulated data. The digital to analog converter 304 converts the modulated data into an analog signal that is filtered and outputted as the modulated data 282.

The demodulation module 286 includes a filter 308, an echo cancellation module 310, a summing module 312, an equalizer 314, a ranging module 316, a multipath module 318, an analog to digital converter 320, and a demodulator 322. The functionality of these elements, as well as the functionality of the channel response module 326, is similar to the functionality of corresponding elements of the demodulation module 210 as shown in FIG. 7. While the functionalities are similar, each powerline gateway will determine its own channel response characteristics to provide the necessary equalization for equalizer 314 as well as separate multipath error correction and ranging functions.

The data processing module 290 includes a deformatting module 324 that deformats the data to produce the retrieved user data 296. The deformatting used by deformatting module 324 is the inverse of the protocol used by formatting module 300.

Figure 12:
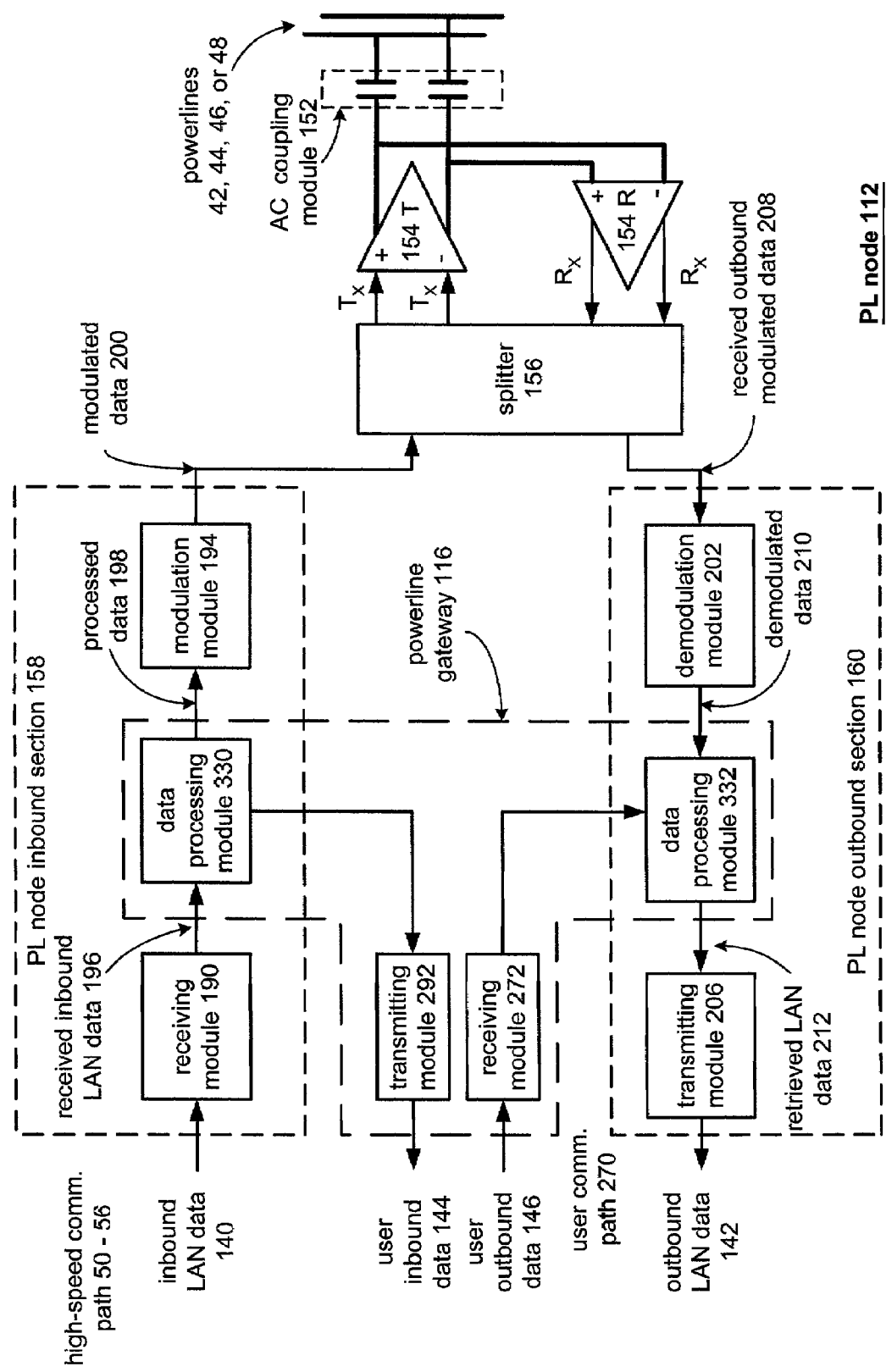
FIG. 12 illustrates a schematic block diagram of an alternate powerline node in accordance with the present invention.

FIG. 12 illustrates a schematic block diagram of the powerline node 112 of FIG. 5. The powerline node 112 includes a powerline node inbound section 158, a powerline gateway 116, a powerline node outbound section 160, splitter 156, transmit and receive power amplifiers 154T and 154R, and an AC coupling module 152. The functionality of splitter 156, power amplifiers 154 and AC coupling module 152 are as previously described.

The powerline node inbound section 158 includes a receiving module 190, data processing module 330, and modulation module 194. The receiving module 190 and the modulation module 194 functions in a similar manner as the same reference numbered modules of FIG. 6. The data processing module 330 is included within the powerline node inbound section 158 as well as within the powerline gateway 116. In operation, the data processing module 330 will identify the user inbound data 144 contained within the inbound local area network data 140. When the data processing module 330 recognizes the user inbound data 144, it provides the data to the transmitting module 292. As such, the user inbound data 144 is not modulated nor is it propagated onto the powerlines. The remainder of the inbound local area network data 140 is processed to produce the processed data 198 and propagated via the modulation module 194, splitter 156, power amplifier 154T and AC coupling module 152 onto the powerlines.

The powerline node outbound section 160 includes a demodulation module 202, a data processing module 332, and a transmitting module 206. The transmitting module 206 and demodulation module perform in a similar fashion as like referenced elements of FIG. 6. The data processing module 332 is operably coupled to receive demodulated data 210 via the demodulation module 202 and user outbound data 146 via the receiving module 272. The data processing module 332 processes the user outbound data 146 and the demodulated data 210 to produce retrieved local area network data 212. The retrieved local area network data 212 is outputted via transmitting module 206 as output local area network data 142.

The transmitting module 292 and receiving module 272 communicate via the user communication path 270 with the affiliated user of the powerline node 112. As one of average skill in the art will appreciate, by incorporating the powerline node 112 as shown in FIG. 12, the powerline node 112 may be mounted at the home of a user. As such, fiber, or other high-speed communication path, is routed to one individual home within a local area network, or neighborhood, where the powerline node 112 provides the conduit for high-speed communications for other homes within the neighborhood via the powerlines without the need for installation of high-speed communication paths to each of the homes in the local area network. Since a substantial portion of the cost of installing a communication system is the equipment of the last 100 feet, the powerline node and powerline gateways of the present invention substantially reduce the cost of bringing broadband communications to users that already have electricity.

Figure 13:
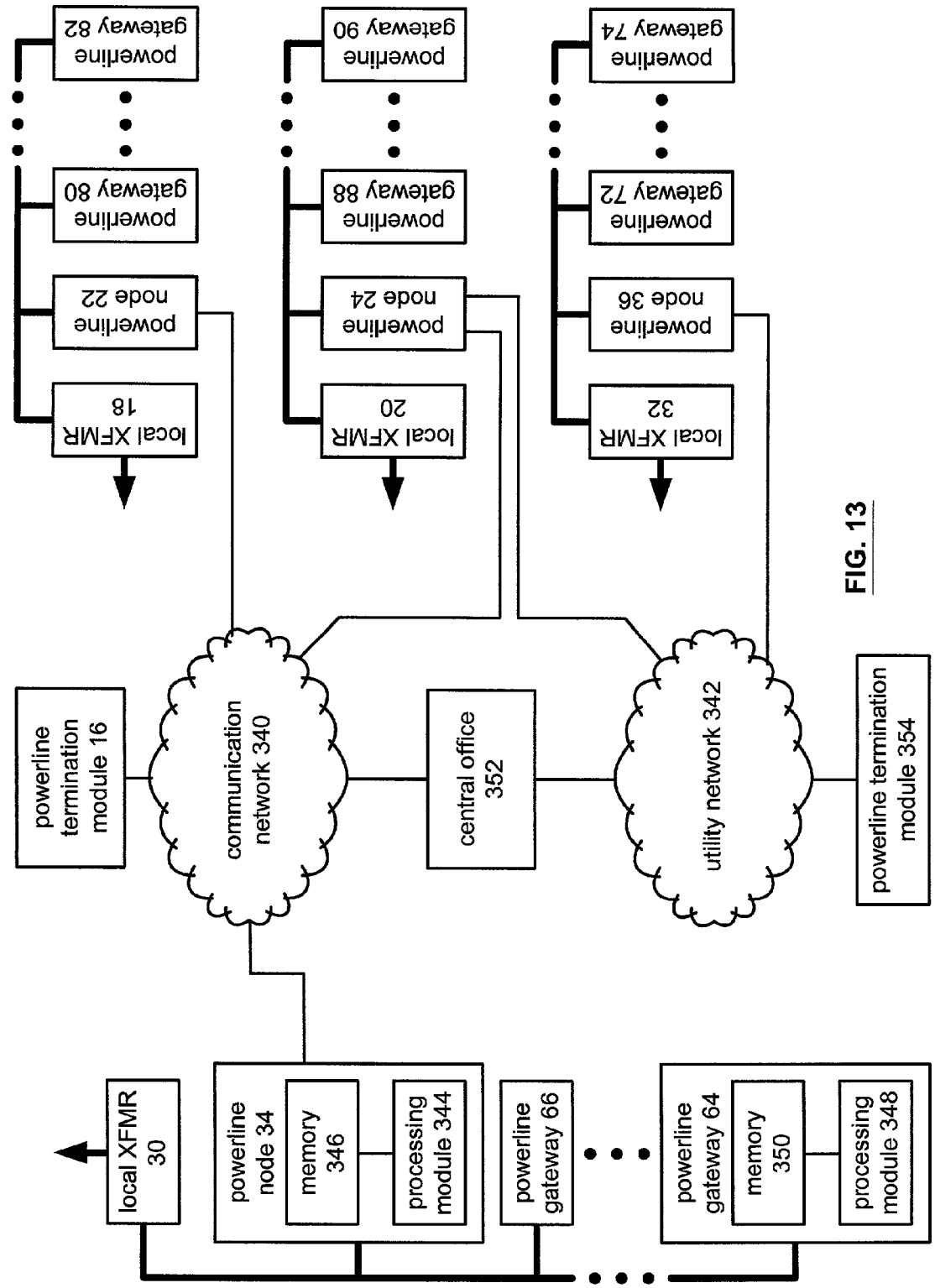
FIG. 13 illustrates a distributed powerline based communication system in accordance with the present invention.

FIG. 13 illustrates a schematic block diagram of a distributed powerline base communication system. The powerline base communication system includes a communication network 340, a utility network 342, a central office 352, a plurality of powerline termination modules 16 and 354, a plurality of powerline nodes 34, 22, 24 and 36, a plurality of local distribution transformers 18, 20, 30 and 32, and a plurality of powerline gateways 64, 66, 72, 74, 80, 82, 88 and 90. In this configuration, the powerline nodes 22, 24, 36, 34 and 36 are coupled via a high-speed communication path to the communication network 340 and/or the utility network 342. The communication network 340 may be the Internet, wide area network, wireless communication system, public switch telephone network, Ethernet network, and/or any other type of networking system.

The utility network 342 is a communication network private to a utility company or power company used to communicate with substations, local distribution transformers, and other nodes within a power system throughout a geographic region. The central office 352 coordinates the communication throughout the communication system of FIG. 13. Each of the powerline termination modules 16 and 354 supports a portion of the system of FIG. 13.

Each of the powerline nodes includes a processing module 344 and memory 346. The processing module 344 may be a single processing device or a plurality of processing devices. Such a processing device may be a microprocessor, micro controller, digital signal processor, state machine, logic circuitry, programmable gate array, analog circuitry, and/or any device that manipulates signals (analog or digital) based on operational instructions. The memory 346 may be a single memory device or a plurality of memory devices. Such a memory device may be a read only memory, random access memory, re-programmable memory, system memory, magnetic tape memory, and/or any device that stores digital information. Note that when the processing module implements one or more of its functions via a state machine, logic circuitry, and/or analog circuitry, the memory storing the corresponding instructions is embedded within the circuitry comprising the state machine, logic circuitry, and/or analog circuitry. The operational instructions stored in memory 346 and performed by processing module 344 are discussed in greater detail with reference to FIGS. 18 through 20.

Each of the powerline gateways includes a processing module 348 and memory 350. The processing module 348 may be a single processing device or a plurality of processing devices. Such a processing device may be a microprocessor, micro controller, digital signal processor, state machine, logic circuitry, programmable gate array, analog circuitry, and/or any device that manipulates signals (analog or digital) based on operational instructions. The memory 350 may be a single memory device or a plurality of memory devices. Such a memory device may be a read only memory, random access memory, re-programmable memory, system memory, magnetic tape memory, and/or any device that stores digital information. Note that when the processing module implements one or more of its functions via a state machine, logic circuitry, and/or analog circuitry, the memory storing the corresponding instructions is embedded within the circuitry comprising the state machine, logic circuitry, and/or analog circuitry. The operational instructions stored in memory 350 and performed by processing module 348 are discussed in greater detail with reference to FIGS. 18 through 20.

As configured, a powerline node may have a high-speed communication path to the communication network 340 and/or to the utility network 342. In this manner, the powerline termination module 16 and/or 354 coordinates the communication via local area networks utilizing networks 340 and/or 342.

FIG. 14 illustrates a graphical representation of processing of inbound local area network data 140 when the data is formatted in accordance with frame based data, such as FDMA, TDMA, et cetera. As shown, the inbound local area network data 140 includes frame sync information and data within a frame. The powerline node 34 receives the inbound local area network data 140 via the high-speed communication path 50. The powerline node 34 identifies the users, and/or addressees, within the frame of information based on time slot allocations within the frame. Having identified each user and its corresponding data, the powerline node 34 uniquely encodes the data based on the users individual encoding and/or encryption mechanism. The data is then time and/or frequency division multiplexed and transmitted as modulated data 200 via the powerlines 46 to the powerline gateways 66 and 64. The modulated data will have a varying bit per carrier ratio over the frequency range of interest. This is illustrated as the modulated data 200.

Each of the gateways 64 and 66 will demodulate the modulated data 200 and identify its corresponding timeslot for its respective user. Having done this, the data is decoded and/or decrypted based on the individual encoding and/or encryption of the individual user to retrieve the data contained within the user's timeslot or slots. Such data is then presented as user outbound data 146 or 150 to the respective user.

FIG. 15 illustrates a graphical representation of processing outbound local area network data 142 by powerline node 34. As shown, the outbound local area network data 142 is organized as frames of data. Each frame is separated by frame syncing information such that the alignment of frames can be readily obtained to ensure proper transmission of data. The outbound local area network data 142 is transmitted via the high-speed communication path 50. In this example, each of the powerline gateway 64 and 66 receive user inbound data 144 or 148. The user inbound data is encoded utilizing a unique encoding and/or encryption scheme for the individual users. The encrypted data is then placed in a corresponding timeslot or slots for the individual user and the data is modulated to produce the modulated data 200. In one embodiment, each powerline gateway 66 may have a corresponding frequency bin or plurality of frequency bins to provide its modulated data to the powerline node 34. Alternatively, each of the powerline gateways 64 will transmit its data in a particular time increment utilizing the entire frequency spectrum allocated for demodulated data 200.

The powerline node 34 identifies the users by the carrier frequencies, and/or the time of the data being received. The data is then decoded utilizing the unique decoding scheme and/or decryption scheme for the individual users. The user data is then placed into frames according to timeslot allocations and provided as the output local area network data 142.

FIG. 16 illustrates a graphical representation of the powerline node 34 processing inbound local area network data 140 when the data 140 is packetized data. In this example, the powerline node 34 receives the packets of data via the high-speed communication path 50 using orthogonal frequency division multiplexing (OFDM). The powerline node 34 separates the packets to identify the individual addressees of the data. Utilizing a unique encoding and/or encryption scheme for each user, the separated data is encoded. The encoded packet for each user is then tagged and modulated. The modulated data 200 is provided on powerlines 46 to powerline gateways 64 and 66.

Each of the powerline gateways 64 and 66 demodulates the received modulated data 200 to retrieve the packets of data. The packets of data are then identified to determine whether they are addressed for the individual user associated with the powerline gateway. If so, the corresponding data packets are decoded and/or decrypted to retrieve the user outbound data 146 or 150.

FIG. 17 illustrates a graphical representation of producing outbound local area network data 142 in a packetized format. In this illustration, each of the powerline gateways 64 and 66 receive user inbound data 144 or 148 via its corresponding user. Each powerline gateway 64 encodes the corresponding data, packetizes it and then modulates it onto powerlines 46. The transmission of the modulated data onto the powerlines 46 may be done in a CSMA manner, and/or time allocated manner.

The powerline node 34 receives the outbound modulated data 208 and identifies the particular users. Having identified the particular users, the data is decoded and/or decrypted based on the individual encoding and/or encryption scheme for the corresponding user. The data for the local area network is then packetized and placed on the high-speed communication path 50 as the outbound local area network data 142.

Figure 18:
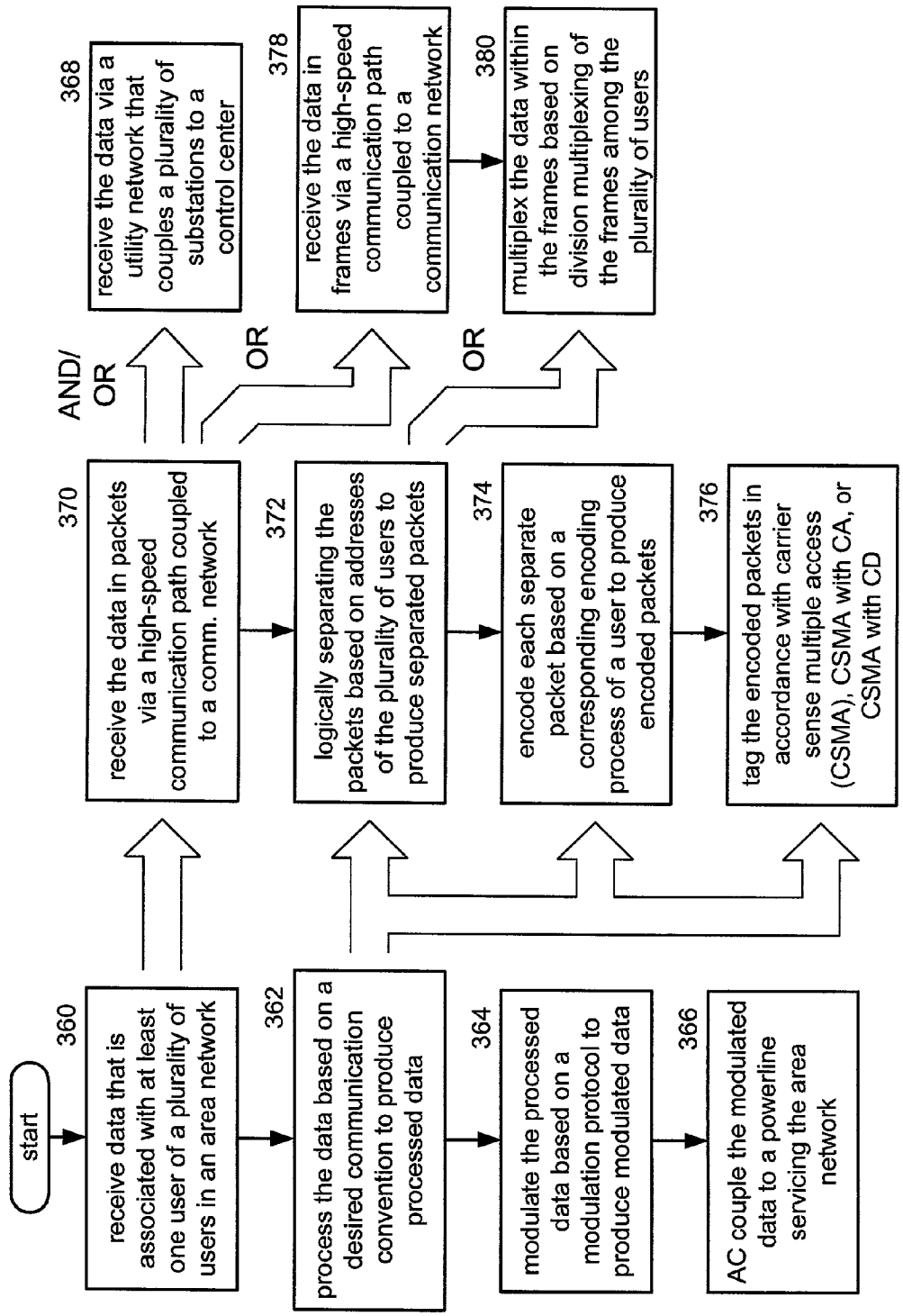
FIG. 18 illustrates a logic diagram of a method for providing broadband communication over powerlines in accordance with the present invention.

FIG. 18 illustrates a logic diagram of a method for providing broadband communication over powerlines. The process begins at Step 360 where data that is associated with at least one user of a plurality of users in an area network (e.g., wide area network or local area network) is received. The data may be received in a variety of manners, which will be subsequently described. The process then proceeds to Step 362 where the data is processed based on a desired communication convention to produce process data. The desired communication convention may be time division multiplexing, frequency division multiplexing, carrier sense multiple access, CSMA with collision avoidance, CSMA with collision detection, encryption, buffering, frame relay processing, ATM packetizing, and/or any other type of framing of data and/or packetizing of data. A more detailed discussion of the processing of the data in accordance with the desired communication convention will be subsequently described.

The process then proceeds to Step 364 where the processed data is modulated based on a modulation protocol. The modulation protocol may be amplitude modulation, frequency modulation, frequency shift keying, phase shift keying, quadrature amplitude modulation, discrete multi-tone modulation, orthogonal frequency division multiplexing, and/or spread spectrum modulation. The process then proceeds to Step 366 where the modulated data is AC coupled to the powerlines servicing the area network. This was graphically illustrated with reference to FIGS. 1 through 7.

The receiving of data may be done in a variety of ways. For instance, at Step 370, the data may be received in packets via a high-speed communication path that is coupled to a communication network. When the data is received in this manner, the processing of the data corresponds to Steps 372 through Step 376. At Step 372, the data is logically separated based on addresses of the plurality of users to produce separated packets of data. The process then proceeds to Step 374 where the separate packets of data are encoded based on a corresponding encoding process of the user. Note that each user of the local area network has an individual encoding scheme and/or encryption scheme. As such, even though the data is placed on a shared communication path, only the addressed user may receive it since only the addressed user has the corresponding encryption/decryption and/or encoding/decoding scheme. The process then proceeds to Step 376 where the encoded packets are tagged in accordance with CSMA, CSMA with collision avoidance, and/or CSMA with collision detection.

As an alternate mechanism for receiving the data, the data may be received as shown at Step 368 where it is received via a utility network. The utility network couples a plurality of substations to a control center. In this coupling, and reception of data, the data is relatively low speed to provide the control central office with remote metering, enabling/disabling of electronic devices within a home, and/or other functions to control the transient use of power within a given area supported by a local distribution transformer and/or substation.

As a further alternate mechanism for receiving the data, the data may be received as shown at Step 378 where it is received in frames via a high-speed communication path coupled to a communication network. If the data is received in this manner, the processing is done as shown in Step 380. At Step 380, the data is multiplexed within the frames based on division multiplexing (e.g., time division multiplexing and/or frequency division multiplexing) of the frames among the plurality of users. This was graphically illustrated in FIGS. 14 and 15.

Figure 19:
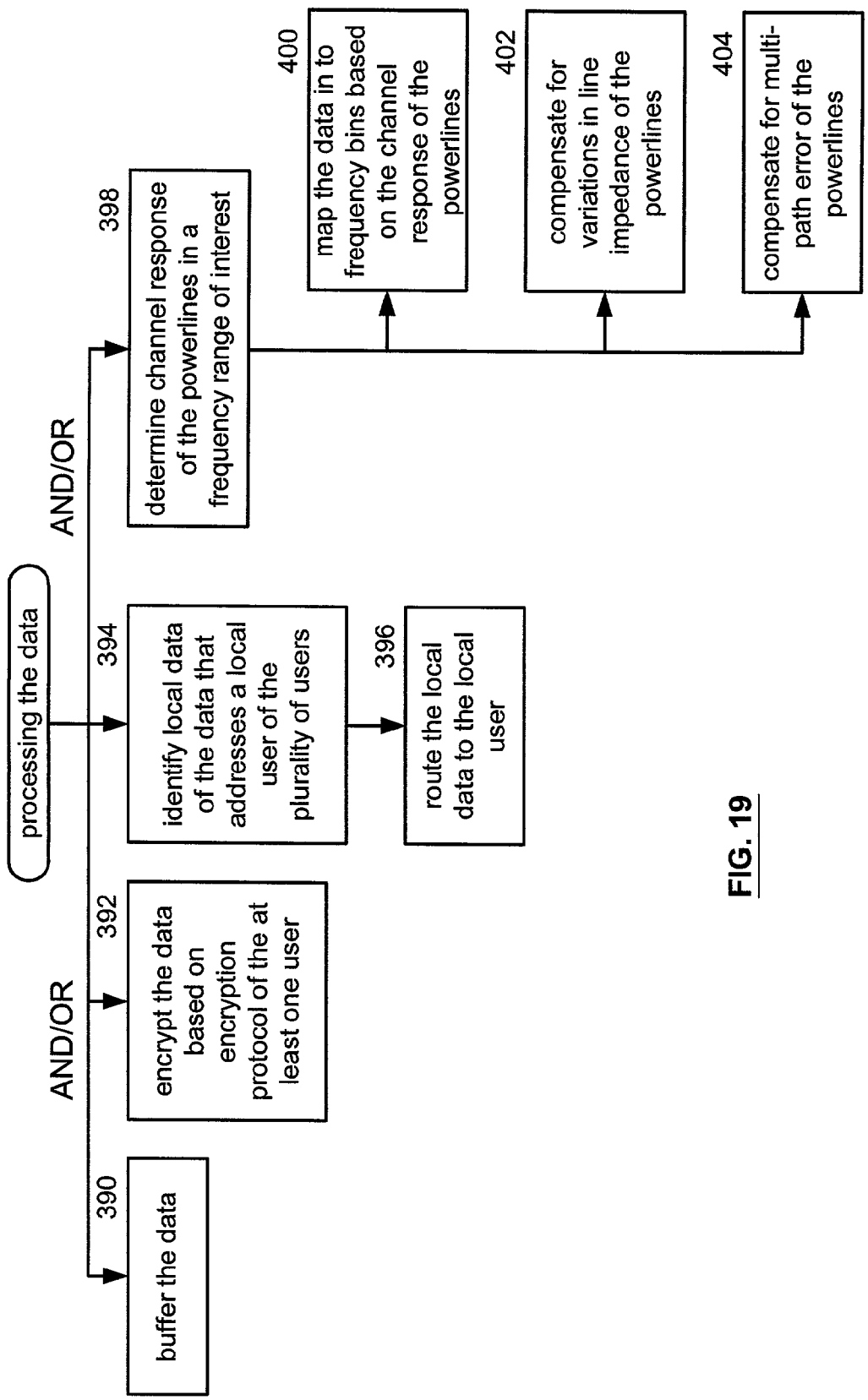
FIG. 19 illustrates a logic diagram of further processing of the data of Step 362 of FIG. 18.

FIG. 19 illustrates a logic diagram of further processing options of the data of Step 362 of FIG. 18. Each of these paths provides alternate and/or cumulative processing of the data. At Step 390, the data may be buffered. At Step 392, the data may be encrypted based on an encryption protocol that is unique to each user within the system. At Step 394, local data may be identified wherein the local data addresses a user affiliated with the powerline node. The process then proceeds to Step 396 where the local data is routed to the local user without further processing.

At Step 398, the processing may include determining the channel response of the powerlines over a frequency range of interest. For example, if the data is being transmitted via a plurality of carrier frequencies in the range of 100 kilohertz to 5 megahertz, the channel response in this frequency range is of interest. The process then proceeds to one or more of Steps 400 through 404. At Step 400, the data is mapped into frequency bins based on the channel response of the powerlines. At Step 402, variations in the line impedance of the powerlines are compensated for based on the response of the powerlines. At Step 404, multipath errors are compensated for of the powerline in response to determining the powerline frequency performance response.

Figure 20:
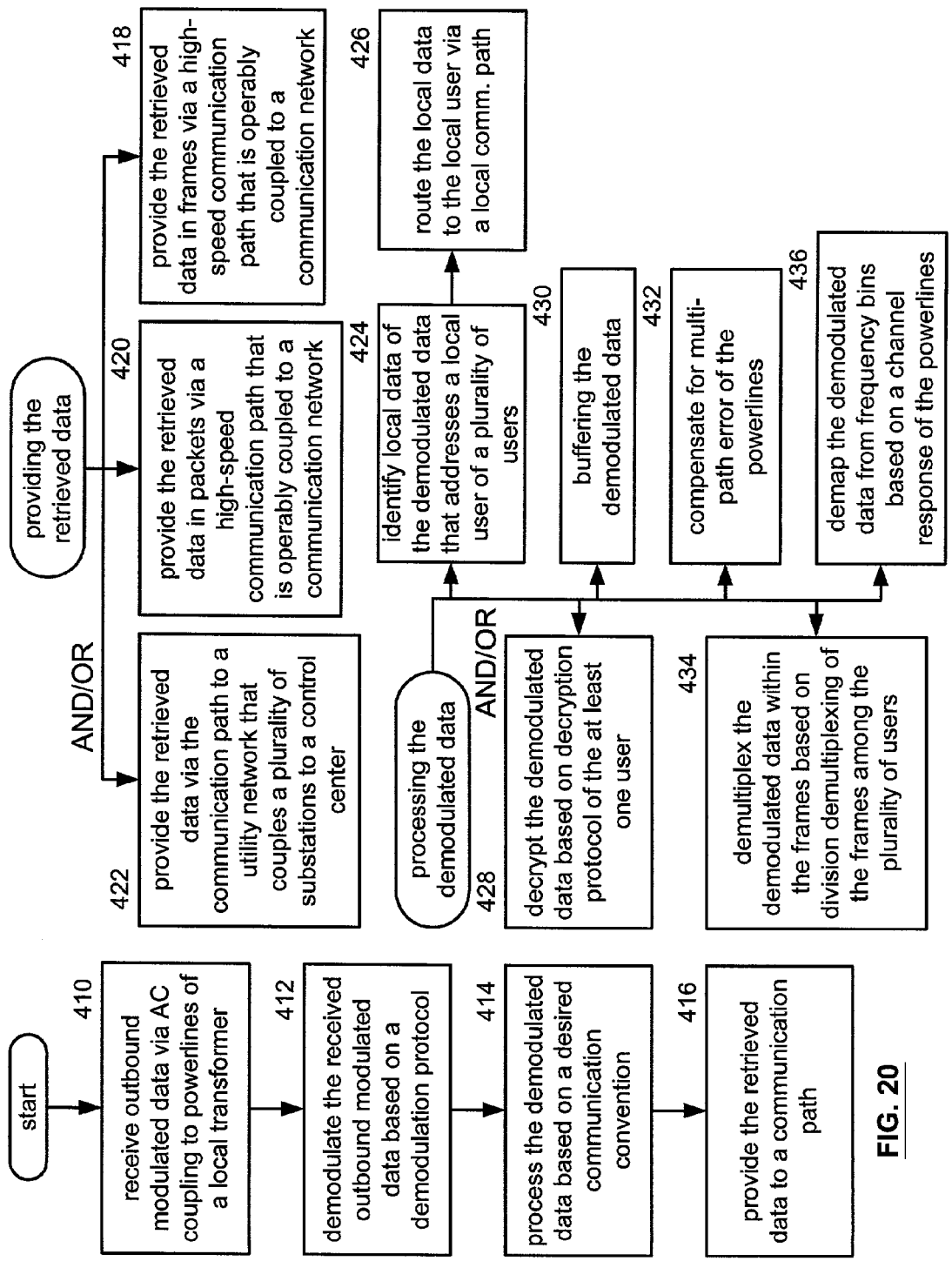
FIG. 20 illustrates a logic diagram of a method for providing broadband communication over powerlines in accordance with the present invention.

FIG. 20 illustrates a logic diagram of a method for providing broadband communications over powerlines. The process begins at Step 410 where outbound modulated data is received via AC coupling to powerlines of a local transformer. The process then proceeds to Step 412 where the received outbound modulated data is demodulated based on a demodulation protocol. The particular demodulation protocol will be the inverse of the modulation protocol used to modulate the data. The process then proceeds to Step 414 where the demodulated data is processed based on the desired communication convention. The processing of the data will be further discussed with reference to Steps 424 through 436. The process then proceeds to Step 416 where the retrieved data is provided to a communication path. The providing of the retrieved data will be further discussed with reference to Steps 418 through 422.

The providing of the retrieved data may include one or more of the processing steps shown in Steps 418 through 422. At Step 418, the retrieved data is provided in frames via a high-speed communication path to a communication network. At Step 420, the retrieved data is provided in packets via a high-speed communication path to a communication network. At Step 422, the retrieved data is provided via a communication path to a utility network that couples a plurality of substations to a control center. Alternately, the retrieved data may be user data and is provided to a user via a user communication path.

The processing of the demodulated data may be done utilizing one or more of the steps represented by Steps 424 through 436. At Step 424, local data of the demodulated data is identified based on the address of a local user of the plurality of users. Once the local data is identified, the process proceeds to Step 426 where the local data is routed to the local user via a local communication path.

At Step 428, the demodulated data may be decrypted based on a decryption protocol of the at least one user wherein the decryption protocol corresponds to the modulation protocol. At Step 430, the demodulated data may be buffered for controlling the timing of processing the data. At Step 432, the demodulated data may be processed to compensate for multipath errors of the powerlines.

At Step 434, the demodulated data may be demultiplexed within the frames based on division demultiplexing (time and/or frequency) of the frames amongst the plurality of users. At Step 436, the demodulated data may be demapped from the frequency bins based on a channel response of the powerlines.

Figure 21:
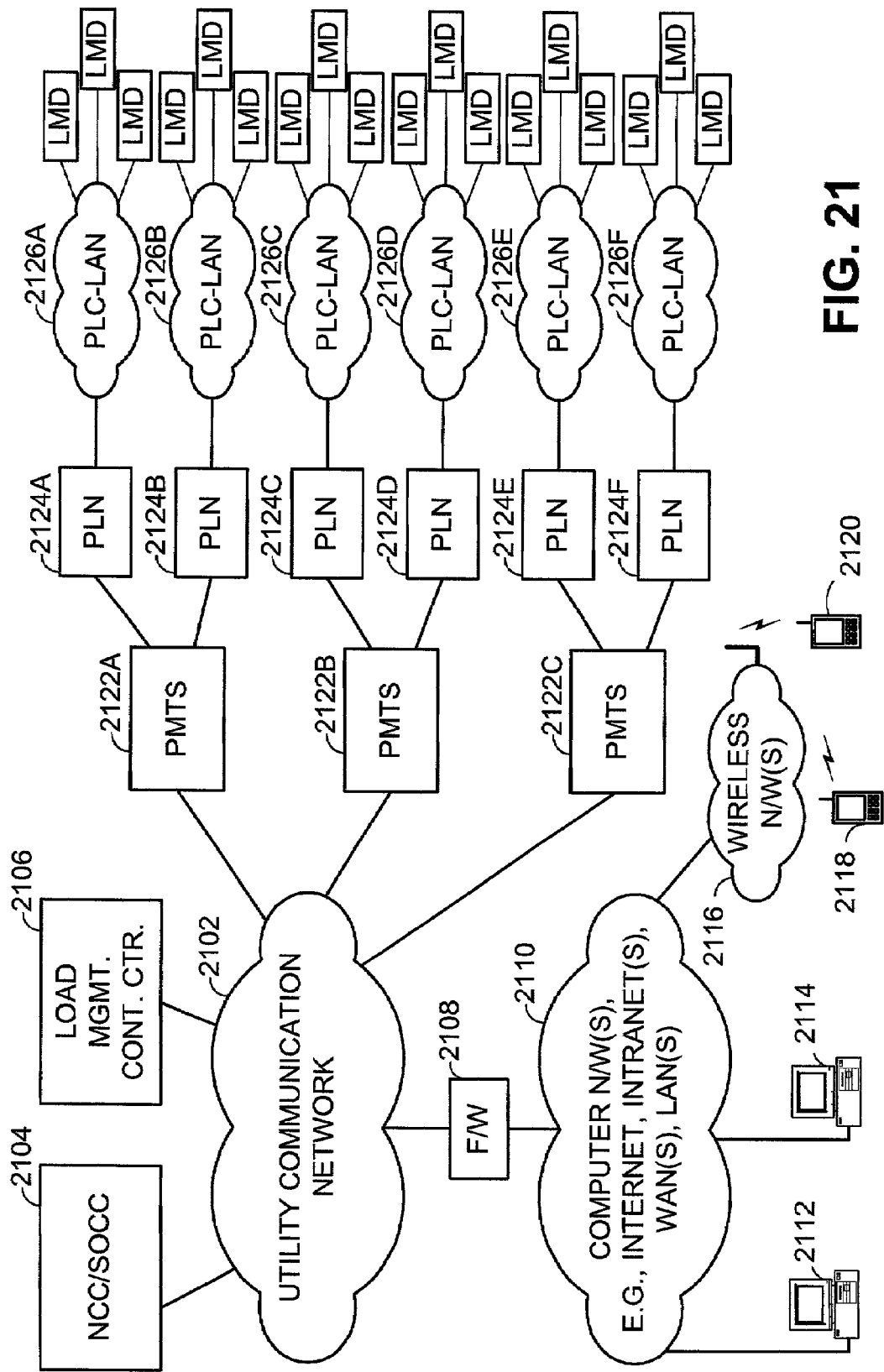
FIG. 21 is a system diagram illustrating a load management system constructed according to the present invention.

FIG. 21 is a system diagram illustrating a load management system constructed according to the present invention. The structure of the load management system shares to great extent the structure of the high speed communication network in such operation as was previously described with reference to FIGS. 1 through 20. Thus, any differences in terminology used with reference to FIG. 21 or FIGS. 22 through 38 is made to distinguish the overall functions provided by the load management system and should not limit the scope of the load management system.

The load management system includes a utility communication network 2102, a load management control center 2106, a plurality of power management termination systems 2122A through 2122C, a plurality of power line nodes 2124A through 2124,F and a plurality of load management devices (each referred to as a LMD). The power management system may also include a network control center/system operation control center 2104 and a firewall 2108. The firewall 2108 provides access to the utility communication network 2102 via the Internet or any of a number of other computer networks 2110. These other computer networks 2110 may couple to wireless networks 2116 or other computer networks. In such case, these computer networks 2110 and wireless networks 2116 allow access to the load management system by subscriber computers 2112, 2114, 2118, and 2120.

The LMDs are controlled by the load management control center 2106 via the PMTSs 2122A through 2122C, the PLNs 2124A through 2124F, and coupling power line carrier local area networks 2126A through 2126F. The PMTSs 2122A through 2122C are similar in structure to the power line termination modules, e.g., power line termination module 16 describes with reference to FIG. 1.

The PMTSs 2122A through 2122C provide an immediate interface to the utility communication network 2102. The power line nodes 2124A through 2124F couple to power lines of the utility network. The power lines therefore provide the physical medium for the power line carrier local area networks 2126A through 2126F. The manner in which the power lines serve as physical media for the communications between the power line nodes 2124A through 2124F and LMDs is similar to the manner described with reference to FIGS. 1 through 20 for providing communication services. However, the bandwidth required by the power management system is typically less than that required by the high speed communication usage described with reference to FIGS. 1 through 20. Therefore, different modulation schemes, coding schemes, addressing schemes, etc. may be used with the power management system as contrasted to those used with the communication network.

According to a first aspect of the load management system of the present invention, each of the LMDs controls one or more electrical loads of the utility network. Each of these LMDs may be individually addressed by the load management control center and/or the PMTSs 2122A through 2122C. Further, these LMDs may be addressed in groups. Group addressing of LMDs allows the utility company to direct a plurality of LMDs to disconnect loads from the utility network using a broadcast command. Such operations are particularly useful for load shedding that is performed in response to the loss of generating capacity. However, such load control may also be performed to reduce load in other operating situations.

The individual addressability of the LMDs may be further employed for other important utility system operations. Subscribers to utility system load management system may desire to individually control loads within their particular businesses or homes. The load management system of the present invention allows a subscriber to access the load management system via a customer computer, e.g., customer computer 2114. Using the computer 2114 to access the load management control center 2106, the subscriber may control a LMD in his or her home. In such case, the subscriber may enable or disable loads controlled by such LMDs.

According to another aspect of the present invention, the load management system may be employed to disconnect a home from the utility grid. This operation may be desirable when a customer fails to pay his or her utility bill. Alternatively, this operation may be desirable when a subscriber requests a temporary disconnection of service, for example, when the subscriber goes on a vacation or has an extended absence from his or her home. These and other operations are supported by the load management system of the present invention.

Figure 22:
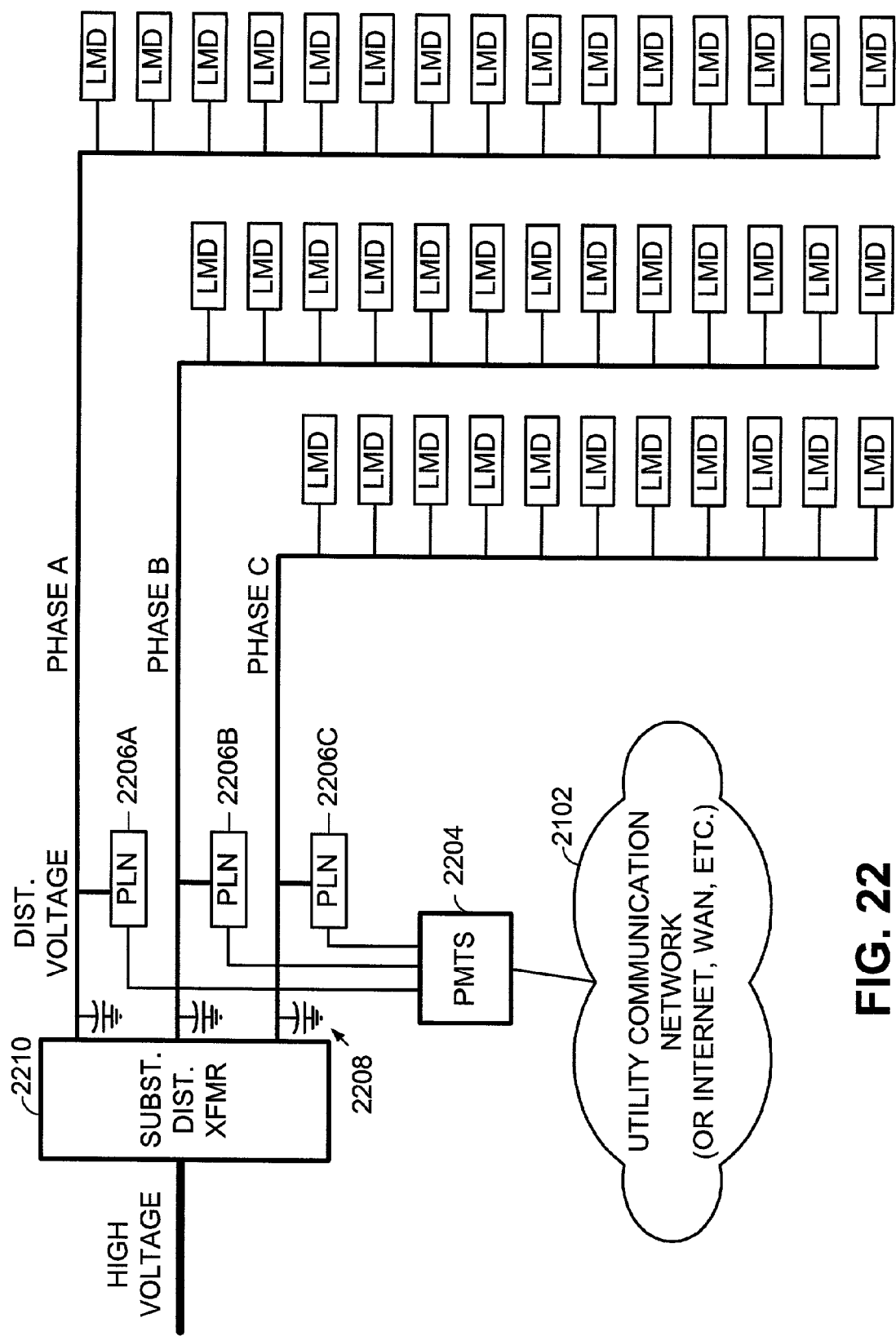
FIG. 22 is a partial system diagram illustrating the manner in which a plurality of load management devices is accessed.

FIG. 22 is a partial system diagram illustrating the manner in which a plurality of LMDs is accessed. As is shown in FIG. 22, utility communication network 2102 couples to a PMTS 2204. The PMTS 2204 couples to three PLNs 2206A, 2206B, and 2206C. These PLNs 2206A, 2206B, and 2206C couple to the A, B, and C phases serviced on a distribution side of a substation distribution transformer 2210. Each phase of the substation distribution transformer 2210 services a plurality of subscriber loads. For example, in one embodiment, each of the phases, phase A, phase B, and phase C services a plurality of homes, a plurality of businesses, a plurality of stores, etc. Some of the loads serviced by each of the phases of the substation distribution transformer 2210 are managed by corresponding LMDs.

The load management system of the present invention controls each of these LMDs via one of three communication paths, each of the communication paths serviced by a particular PLN 2206A, 2206B, and 2206C. Each of the PLNs 2206A, 2206B, and 2206C uniquely addresses each of the LMDs coupled to the corresponding phase. Thus, in the example, each of the phases corresponds to a particular PLC-LAN. In order to prevent backfeeding of the signals corresponding to the PLC-LAN via the distribution transformer 2210, a plurality of signal shunts 2208 are coupled to the phases of the substation distribution transformer 2210. These signal shunts 2208 prevent backfeed of signals from the PLNs 2206A, 2206B, and 2206C onto other phases of the substation distribution transformer 2210.

In this particular architecture, the PMTS 2204 works to distribute signals to the PLNs 2206A through 2206C and to aggregate returning signals. Based upon one particular embodiment of this architecture, different addressing schemes may be employed by the PLNs 2206A, 2206B, and 2206C to minimize the complexity and addressing the LMDs. While a complex addressing scheme may be required to uniquely identify each LMD of the load management center 2106, e.g., IP addressing, a reduction in addressing overhead may be initiated and controlled by the PMTS 2204 and the PLNs 2206A, 2206B, and 2206C using a less complicated addressing scheme. In such case, the PMTS 2204 may include address translation tables that allow for the load management center 2106 to address each LMDs in a more complex scheme than that is employed by the PLNs 2206A through 2206C.

In controlling the LMDs, a fairly simplistic set of commands and signals is used to query the status of the particular LMDS, receive responses from LMDS, and to issue controls to the LMDs. Because these particular commands and responses are reasonably simple, they require comparably lesser bandwidth than that which would be provided by the communication systems described with reference to FIGS. 1 through 20. Thus, the devices of FIG. 22 may employ lesser bandwidth communication operations. For example, while the high speed data networking application of FIGS. 1 through 20 may require complex modulation schemes and less noise tolerant solutions, the load management system may employ less complex modulation schemes and may be more noise tolerant.

Figure 23:
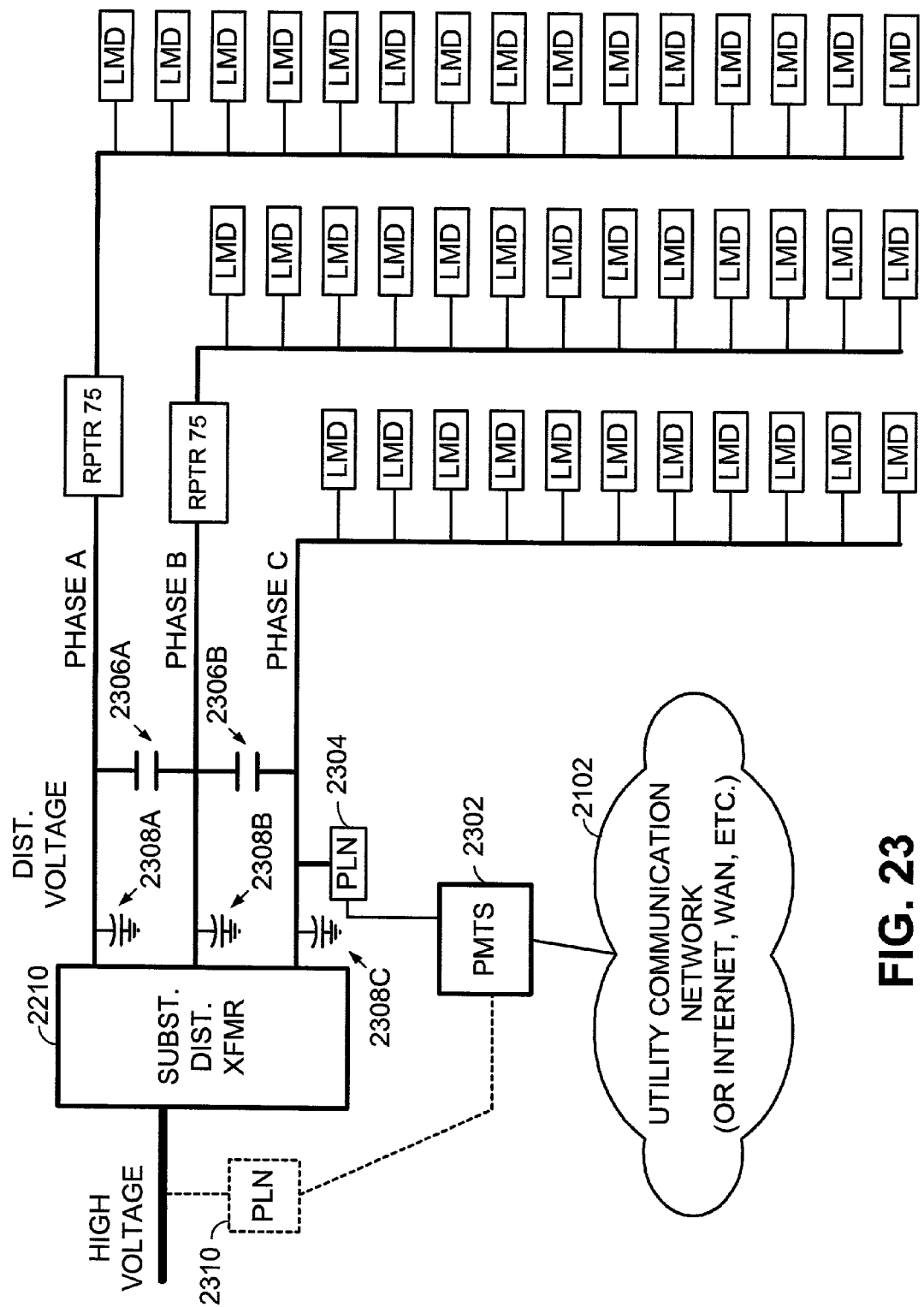
FIG. 23 is a system diagram illustrating an alternate construction of a load management system according to the present invention.

FIG. 23 is a system diagram illustrating an alternate construction of a load management system according to the present invention. As contrasted to the structure of FIG. 22, the structure of FIG. 23 couples signals to phases A, B and C serviced by distribution transformer 2210. In such case, PLN 2304 and PMTS 2302 couple signals to phase C of the distribution transformer 2210 and coupling capacitors 2306A and 2306B couple the signals to phases B and C. While the sharing of signals among the three phases reduces the number of LMDs that are controllable in the particular installation, only a signal PLN 2304 is required to couple signals that control all of the LMDs. With the PLN 2304 coupling the signal of interest to phase C on the low side of the distribution transformer 2210, shunt capacitors 2308A, 2308B, and 2308C may be required to prevent back feeding of the load management systems signals to the high side of the substation distribution transformer.

In an alternate embodiment of this particular structure, the PLN 2310 (indicated with dotted lines) couples signals to the high voltage side of the substation distribution transformer 2210. In such case, the impedance of substation distribution transformer 2210 to the signals produced by the PLN 2310 and the LMDs is relatively small. Thus, such communication signals will pass through the substation distribution transformer 2210 substantially unattenuated by the substation distribution transformer 2210 and will be coupled to each of the three phases.

Figure 24:
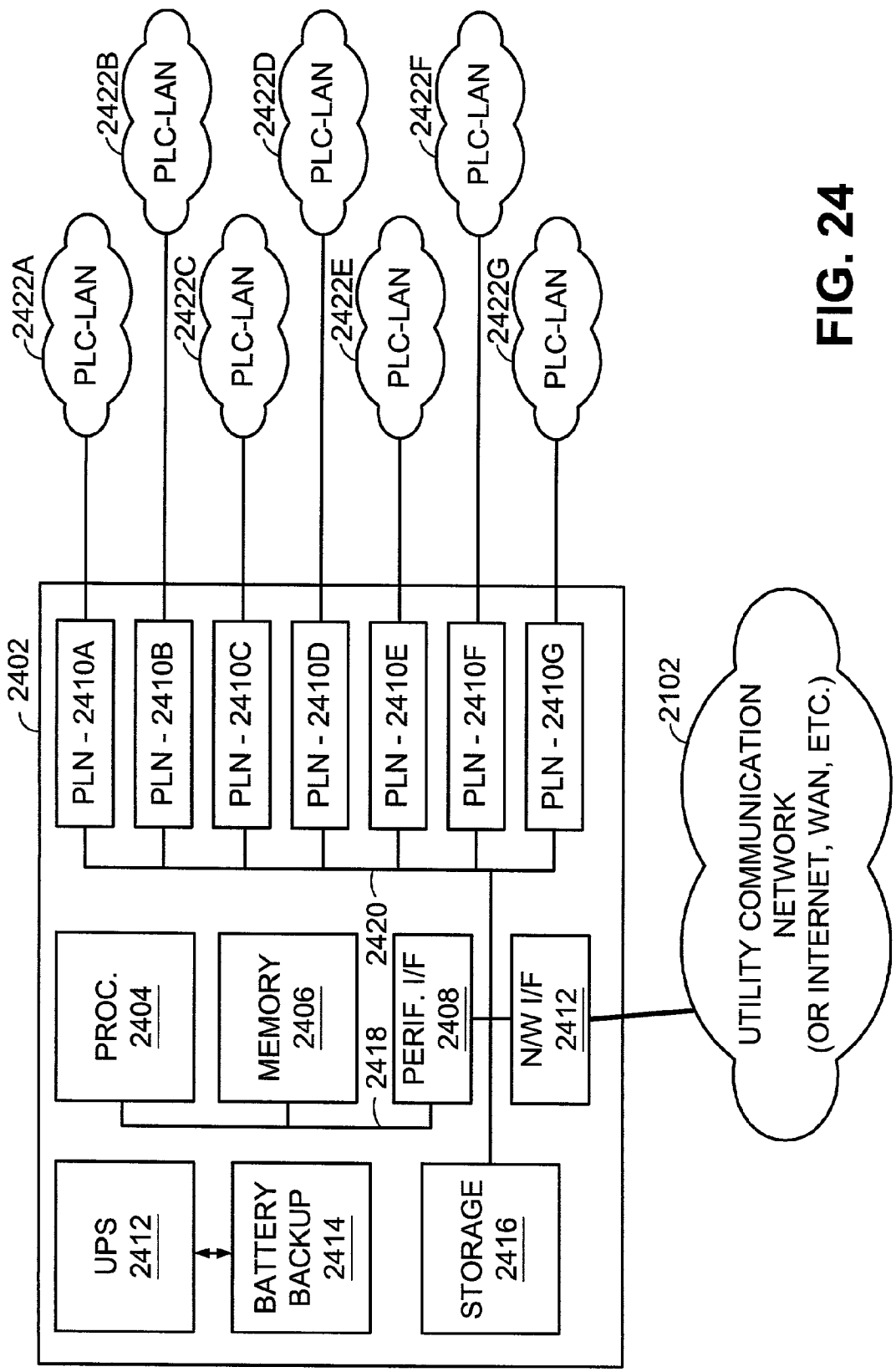
FIG. 24 is a block diagram illustrating a carrier class power management system device providing the functionality of a power management termination system and a plurality of power line nodes.

FIG. 24 is a block diagram illustrating a carrier class power management system device providing the functionality of a PMTS and a plurality of PLNs. The carrier class device 2402 includes a processor 2404, memory 2406, and a peripheral interface 2408, each of which couples via a processor bus 2418. The peripheral interface 2408 couples to storage device 2416, a network interface 2412, and a plurality of PLNs 2410A through 2410G. Each PLN 2410A through 2410G supports a corresponding power line carrier local area network 2422A through 2422G. Coupled to each of these power line carrier local area networks 2422A through 2422G is a plurality of LMDs.

The utility communication network 2102 couples to the carrier class device 2402 via the network interface 2412. The carrier class device 2402 also includes an uninterruptible power supply 2412 and a battery backup 2414. The uninterruptible power supply 2412 and the battery backup 2414 may be housed in a single unit and, in combination, provide the carrier class device 2402 with power during power supply interruption.

Figure 25:
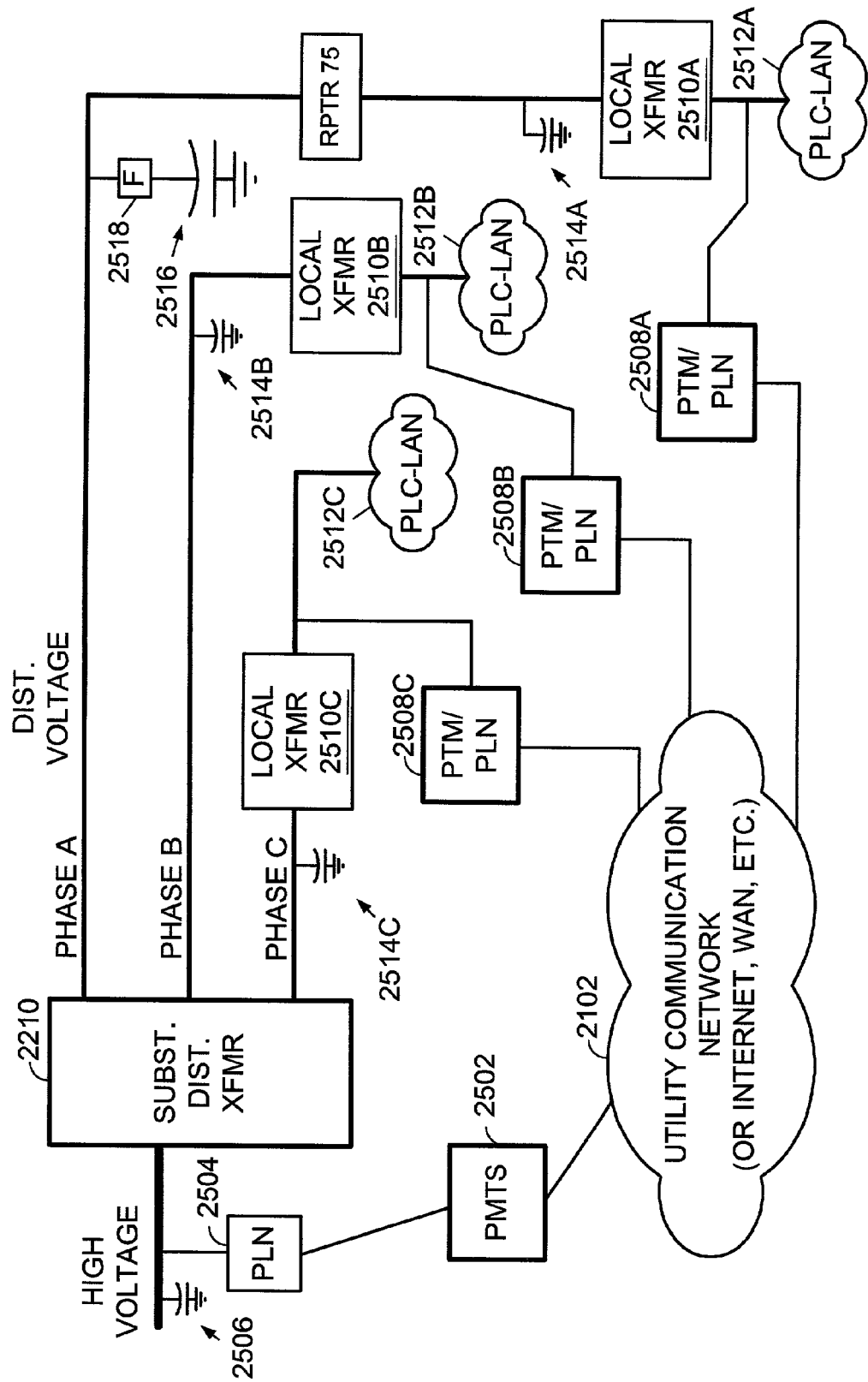
FIG. 25 is a partial system diagram illustrating the combination of a power load management system and a high speed communication system servicing a plurality of subscribers coupled to a utility network via a power line carrier local area network.

FIG. 25 is a partial system diagram illustrating the combination of a power load management system and a high speed communication system servicing a plurality of subscribers coupled to a utility network. As is shown in FIG. 25, utility communication network 2102 couples to a PMTS 2502 and a plurality of combined power line termination modules (PTMs)/power line nodes (PLNs) 2508A, 2508B, 2508C. The PMTS 2502 couples to PLN 2504, which couples to a high side of a substation distribution transformer 2210. The PMTS 2502 and PLN 2504 couple power load management communication signals to the high voltage side of the substation distribution transformer 2210. Shunt capacitance 2506 may be employed to prevent back feed of the power load management signals onto other substation distribution transformers. The power load management signals coupled to the high side of distribution transformer 2210 are coupled to the low side by the transformed 2210 and carried by the distribution lines to LMDs (not shown).

Substation distribution transformer 2210 serves phases A, B, and C. Coupled to phase A is a local transformer 2510A, which reduces the distribution voltage from a higher level such as 25 kilovolts to a lower level such as 480 volts. The low side of local transformer 2510A services a power line carrier local area network 2512A, which is serviced by PTM/PLN 2508A. High speed communication signals are coupled to the low side of local transformer 2510A by the PTM/PLN 2508A. Thus, subscribers coupled to PLC-LAN 2512A receive high speed communications via the PTM/PLN 2508A in a manner described with reference to FIGS. 1–20. Similarly, local transformers 2510B and 2510C are serviced by PTM/PLN 2508B and 2508C. In such case, PLC-LANs 2512B and 2512C service high speed communications and power load management operations for a plurality of subscribers coupled thereto.

Signal blocking shunts 2514A, 2514B, and 2514C may be required to prevent the backfeed of high speed communication signals to the high side of local transformers 2510A, 2510B, and 2510C, respectively. As is generally known, local transformers 2510A, 2510B, and 2510C may provide high impedance, medium impedance, or low impedance to communication signals in the bands of interest for the high speed communication network. When such local transformers 2510A, 2510B, and 2510C provide good band-pass in these signals of interest, the shunts 2514A, 2514B, and 2514C are required to prevent the back feed of high speed communication signals amongst the phases, phase A, phase B, and phase C.

Power factor correction capacitors 2516 may be coupled to the distribution phases, phase A, phase B, and/or phase C to assist in keeping voltages at desired levels on the distribution lines. Because in some cases these power factor correction transformers 2516 may provide a low impedance path to ground for communication and/or power load management signals within bands of interest, a series filter 2518 may be employed to preclude the shunting of such signals of interest to ground via the power factor correction transformers 2516. However, as is appreciated, some power factor correction transformers may have high impedance characteristics for the signal bands of interest employed with the power load management in high speed communication networking signals of the present invention, the 1 kilohertz through 30 kilohertz frequency bands. In such case, the series filter 2518 would not be required.

Figure 26:
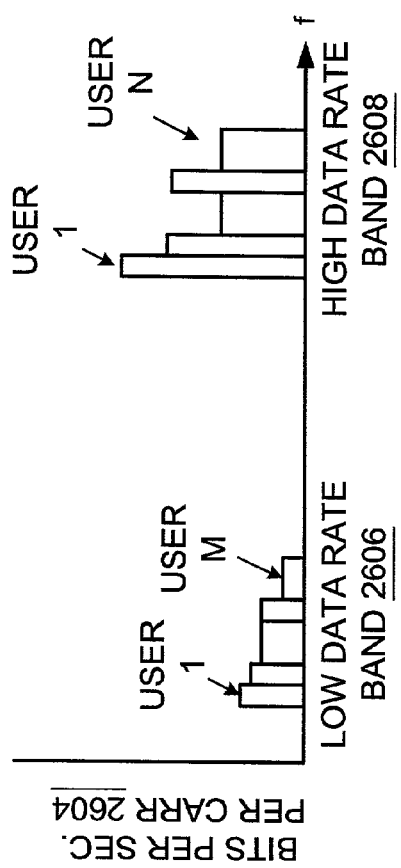
FIG. 26 is a graph illustrating the various bands that may be employed to service power load management communications and high data rate communications.

FIG. 26 is a graph illustrating the various bands that may be employed to service power load management communications and high data rate communications. In the illustrated embodiment, the vertical axis corresponds to bit rate per carrier 2604. Further, the horizontal axis corresponds to frequency. In such case, a low bit rate band 2606 is shown to carry a particular number of bit rate per carrier for users 1 through M. The low bit rate band is used for servicing power load management operations according to the present invention.

The high bit rate band 2608 is employed to service high data rate communication services as was described with reference to FIGS. 1 through 20. As is shown, the bit rate for communication users 1 through N is greater for the high data rate band 2608. Such is the case because of the relatively higher throughput requirements for the high data rate band 2608. As was previously described, power load management operations require less bandwidth than do the high data rate communication requirements, both of which are serviced via the power line carriers.

Figure 27:
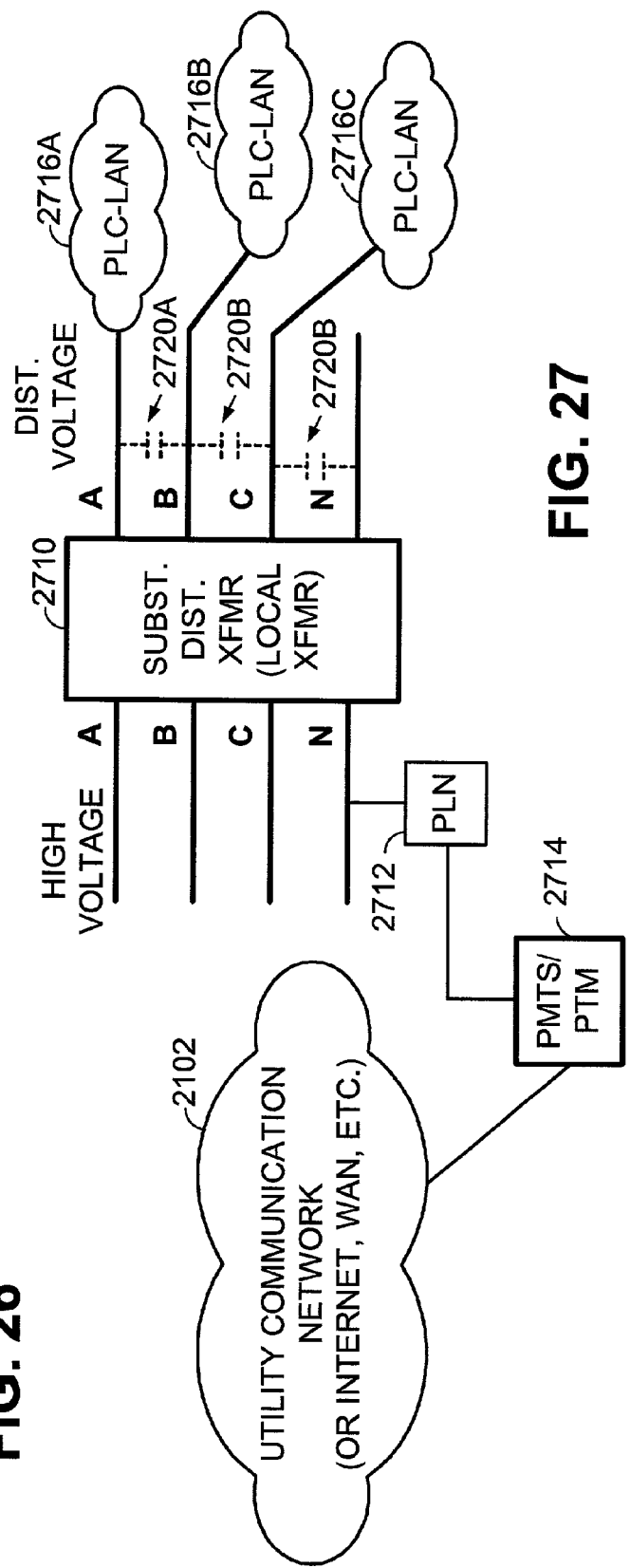
FIG. 27 is a partial system diagram illustrating the manner in which power load management signals are coupled to a substation distribution transformer.

FIG. 27 is a partial system diagram illustrating the manner in which power load management signals are coupled to a substation distribution transformer via its neutral conductor. As is shown, the utility communication network 2102 couples to a PMTS/PTN 2714. PLN 2712 couples to PMTS/PTN 2714 and also couples to the neutral lead of the high voltage side of the substation distribution transformer 2710. Because sufficient coupling in the bands of interest exists between the neutral conductor and the A, B, and C phases on the high voltage side of the substation distribution transformer 2710, the load management communication signals and high data rate communication signals may be simply coupled to the neutral conductor on the high voltage side of the substation distribution transformer 2710. Because of the coupling between the neutral and the phases in the communication bands of interest, the signals are effectively coupled to each of the three phases A, B, and C of the transformer.

As is shown, on the distribution voltage side of the substation distribution transformer 2710, a three power line carrier local area networks 2716A, 2716B, and 2716C are formed by these signals coupled by PLN 2712 to the neutral conductor on the high side of the substation distribution transformer 2710.

In another embodiment, sufficient coupling may not exist between the neutral conductor of the substation distribution transformer 2710 and the three phases of the distribution voltage side, phase A, phase B, and phase C. In such case, capacitive coupling between the neutral conductor and the three phase conductors may be required to couple the communication and power load management signals to the A, B, and C phases. Such capacitive coupling is shown as optional capacitors 2720A, 2720B, and 2720C.

Figure 28:
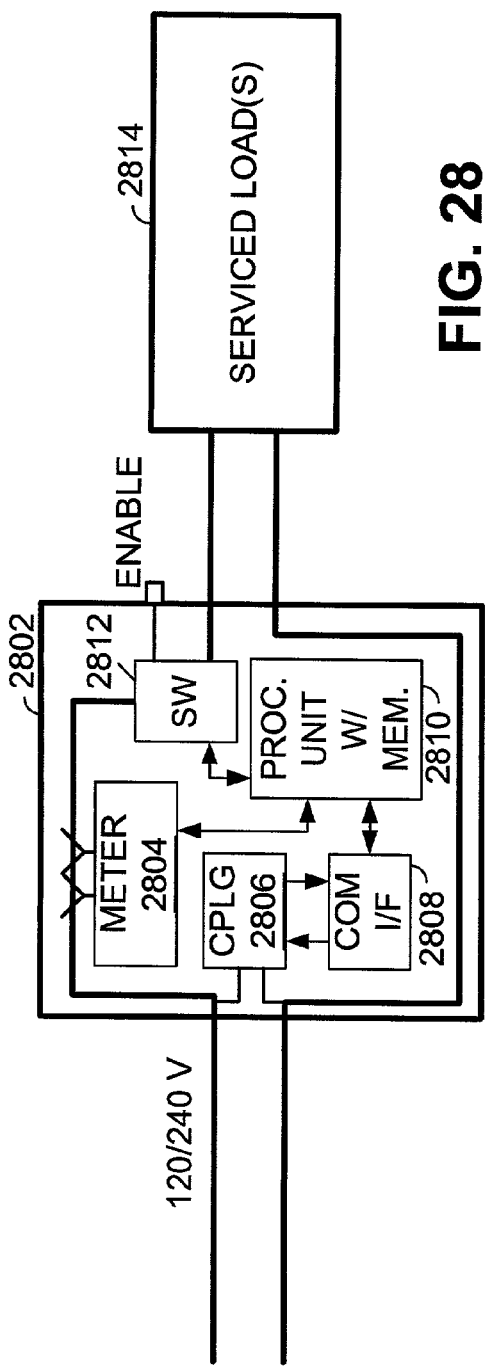
FIG. 28 is a block diagram illustrating the structure of a load management device constructed according to the present invention.

FIG. 28 is a block diagram illustrating the structure of a load management device constructed according to the present invention. The LMD 2802 is coupled to a 120/240-volt distribution feed and services at least one load 2814. The LMD 2802 includes a meter 2804, which meters the flow of energy from the distribution feed side to the serviced load(s) 2814. The LMD 2802 also includes coupling 2806 that couples a communication interface 2808 to the distribution feed side of the LMD 2802. The communication interface 2808 and meter 2804 couple to a processing unit with memory 2810. The processing unit with memory 2810 is typically an integrated circuit that has sufficient static and/or dynamic memory to service the processing requirements of the LMD 2802. The processing unit with memory 2810 controls the operation of a switch 2812 that is employed to either service or disconnect the serviced loads 2814.

The communication interface 2808 and the processing unit with memory 2810 support the communication requirements of the LMD 2802. The LMD 2802 is individually addressable by a load management control center of the utility network. As was previously described, the load management control center may be controlled by a utility company or by another service provider that has access to utility company's network. Thus, the load management control center may individually control the operation of the LMD 2802.

Coupled to the switch 2812 is an enable button that provides a subscriber with the ability to preclude reconnection of service loads 2814 without consent. For example, the LMD 2802 of FIG. 28 may be employed to disconnect the serviced load(s) 2814 upon the request of subscriber. Such operation may be performed when a subscriber is leaving the home for a particular season or for an extended vacation period. In such case, the subscriber requests the utility company to disconnect the serviced load(s) 2814. However, instead of dispatching a service person to physically disconnect the service loads 2814 from the utility grid, the utility company initiates a disconnection via the load management control center. In response thereto, the load management control center issues a disconnect request via its utility communication network, a PMTS, and a PLN. The PLN issues its command via the power lines coupled to the LMD 2802, which causes the LMD 2802 to open switch 2812.

When the subscriber requests that the serviced load(s) 2814 be reconnected, the enable switch 2812 provides a safety mechanism that will preclude powering of service loads 2814 until the subscriber actually presses the enable switch. This feature adds safety to the operation of the LMD. With this safety feature, the customer is required to depress an enabling switch before the serviced load(s) 2814 are again serviced.

The LMD 2802 of FIG. 28 can may also be used as a meter for the house. In such case, the meter 2804 interacts with the processing unit and memory 2810 to periodically respond to a metering query. During this operation, the processing unit with memory 2810 determines the amount of energy that has been used since the last metering read. The processing unit with memory 2810 then responds via the communication interface 2808 and coupling 2806 to report the energy usage for the metering period by the serviced loads 2814. The processing unit with memory 2810 may store metering information for any length of time. Further, the processing unit with memory 2810 may perform time of day metering for the serviced load(s) 2814 during a period of interest.

Figure 29:
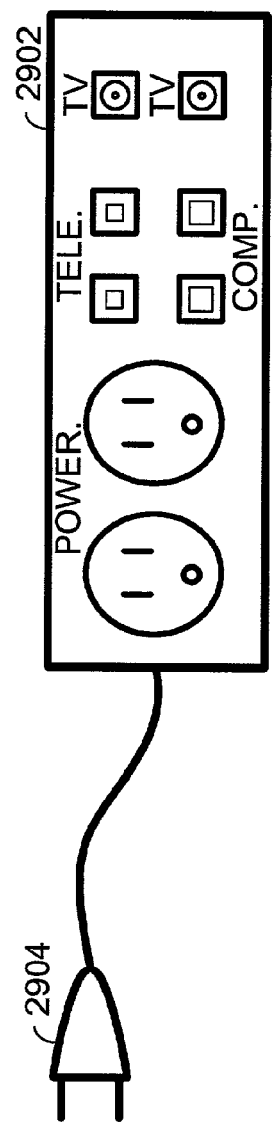
FIG. 29 is a block diagram illustrating an embodiment of a device that provides high speed data communication functions and load management functions.

FIG. 29 is a block diagram illustrating an embodiment of a device that provides high speed data communication functions and load management functions. The load device 2902 includes a plug 2904, which plugs into a wall outlet within a serviced building. The device 2902 includes power line gateway components and also LMD components. In one embodiment, the device 2902 does not include load management components but simply includes power plugs and power line gateway components. In another embodiment, the device includes power line gateway components to service telephone communications, computer network communications, and TV communications to be accessible via the device 2902. In still another embodiment, the device 2902 includes all of these components.

Figure 30:
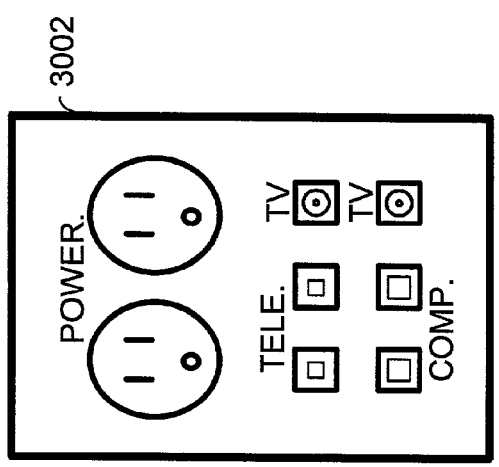
FIG. 30 is a block diagram illustrating another device that provides high speed communication functions and load management functions.

FIG. 30 is a block diagram illustrating another device that provides high speed communication functions and load management functions. The device 3002 plugs into a wall outlet and includes power line gateway components, such as those that were previously described with reference to FIGS. 5 through 7. These power line gateway components will provide telephone connections, high speed computer connections, and TV connections. This device 3002 may also provide LMD functions.

Figure 31:
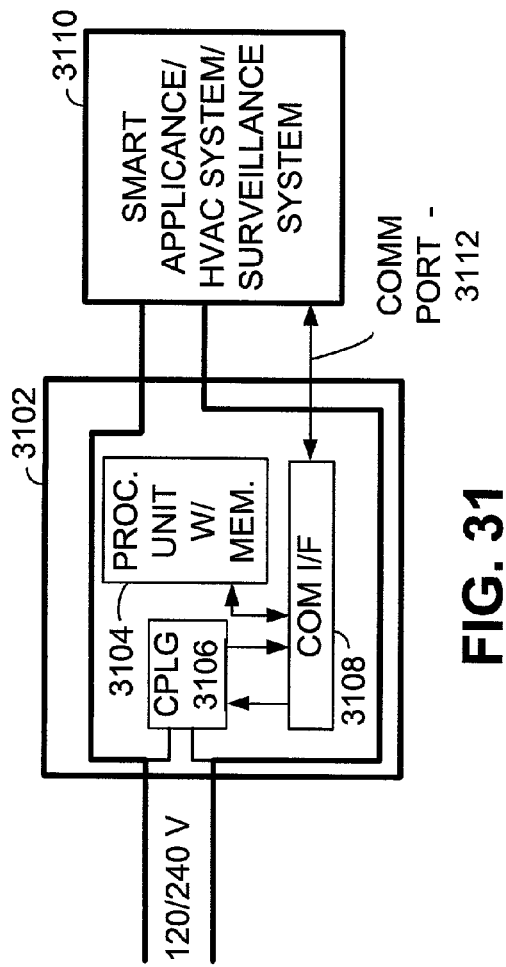
FIG. 31 is a block diagram illustrating a load management device constructed according to the present invention that interfaces with one or more smart appliances.

FIG. 31 is a block diagram illustrating a LMD constructed according with the present invention that interfaces with one or more smart appliances. The LMD 3102 couples to a 120/240 volt outlet and services at least one smart appliance 3110. The LMD 3102 includes a processing unit with memory 3104, coupling to the supply side 120/240 volt power lines 3106, a communication interface 3108 that couples to coupling 3106, and a processing unit with memory 3104. The communication interface 3108 couples to the smart appliance 3110 via communication port 3112.

As is illustrated in FIG. 31, LMD 3102 does not include a switch that could be used to disconnect the smart appliance(s) 3110. In lieu of such switch, the communication port 3112 direct the smart appliances 3110 to adjust its power consumption level. As is generally known, smart appliances 3110 require Internet connections. Thus, according to the present invention, the LMD 3102 provides an Internet connection via a power line network. The communication port 3112 provides such Internet connection for the smart appliances 3110. This Internet connection may be a high speed interconnection or a relatively low speed interconnection depending upon the particular requirements of the smart appliances 3110 and the corresponding subscriber.

The LMD 3102 of FIG. 31 may be employed to control the operation of home appliances, e.g., water heaters, dishwashers, clothes washers, etc. In such case, the LMD 3102 would cause the home appliances to reduce their consumed power during peak loading periods by reducing the temperature of water produced, reducing the amount of heating used, reducing the duration of cycles, by delaying their operation, etc. Thus, peak load will be reduced from the utility perspective, and from the customer perspective, usage during high loading periods (when electricity is more expensive) will be reduced.

The LMD 3102 of FIG. 31 may also be employed to control the operation of HVAC systems, e.g., air conditioners, heat pumps, electrical heaters, etc. In such case, during higher loading periods, the LMD 3102 may override the temperature settings, e.g., reduce the temperature setting during winter peak loading periods, and increase the temperate setting during summer peak loading periods. The LMD 3102 could also simply cycle out of service the HVAC system during peak loading periods when the HVAC system is not required, e.g., when occupants are not present.

In these applications, the LMD 3102 may include a database that it accesses for particular operating directions in response to particular loading constraints. Information contained in these databases could be employed to override the default operation of the smart appliances, home appliances, and HVAC system.

In another embodiment, the LMD 3102 services a surveillance system. In such case, the LMD 3102 provides a communication path across the coupled powerline via a servicing PLC-LAN. With communications provided via this communication path, cutting of telephone lines by an intruder would not affect the viability of the surveillance system. Such operation would provide a significant advantage over telephone line based surveillance systems.

Figure 32B:
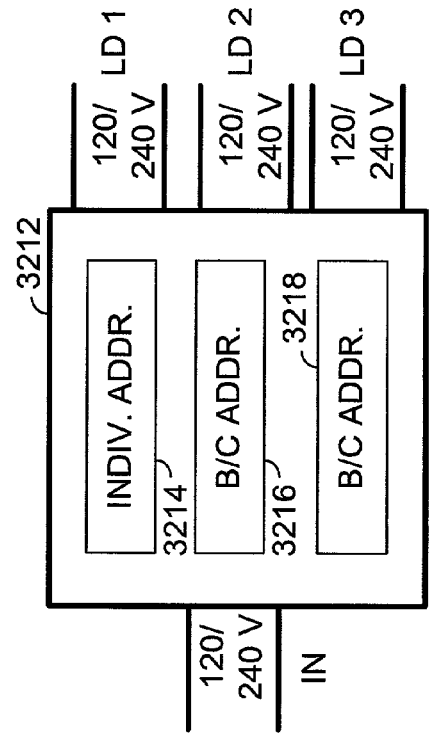
FIG. 32B is a block diagram illustrating the manner in which a load management device constructed according to the present invention may be responsive to both individual addressing and broadcast addressing.
Figure 32A:
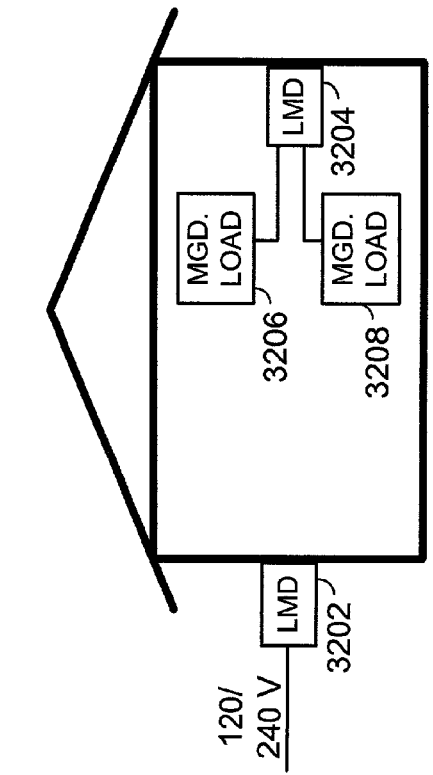
FIG. 32A is a block diagram illustrating the manner in which power load management devices according to the present invention may be deployed.

FIG. 32A is a block diagram illustrating the manner in which LMDs according to the present invention may be deployed. As is shown, a metering device 3202 may be placed on an outside panel of a home. This metering device 3202 will receive 120/240 volt service and will provide the functions previously described with reference to FIG. 28. Alternately, a LMD 3204 may be located within the home and may service manage loads 3206 and 3208. Such a LMD may be similar to the ones illustrated in FIGS. 29, 30 or 31. In any case, the structure and operations of the present invention regarding control of the LMD 3202 or 3204 are employed.

FIG. 32B is a block diagram illustrating the manner in which a LMD according to the present invention may be responsive to both individual addressing and broadcast addressing. The LMD 3212 of FIG. 32B is powered by 120/240 volt input and serves load 1, load 2, and load 3. According to the present invention, the LMD 3212 may be individually addressed using individual address 3214. However, the LMD 3212 may also be addressed via broadcast address 3216 or broadcast address 3218. The load shedding operations initiated by the load management system of the utility company may require that the LMD 3212 drop load 1, load 2, and/or load 3. If the first operation, in which the load management system desires to know the level of load 1, load 2, and load 3, the LMD 3212 is individually addressed using individual address 3214. However, in load shedding operations, when the load management system desires to load shed load 1, it may address the LMD 3212 using broadcast address 3216.

In another operation when the load management system requests the LMD 3212 to drop all serviced loads, the load management system addresses the LMD 3212 via broadcast address 3218. When such addressing occurs, the LMD 3212 drops load 1, load 2, and load 3. Thus, FIG. 32B is illustrative of an embodiment in which different addressing techniques are used for different load management operations.

Figure 33:
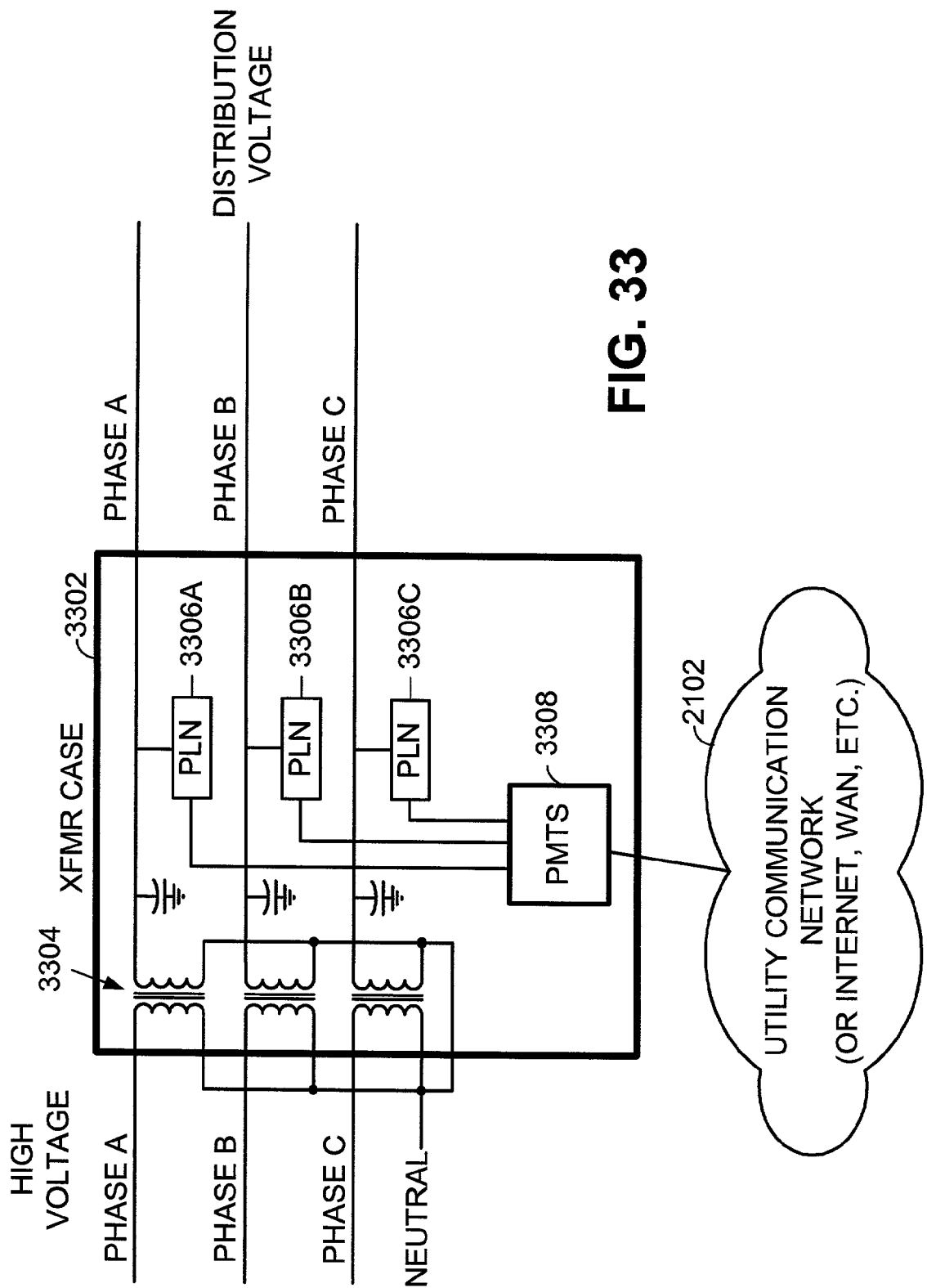
FIG. 33 is a block diagram illustrating the construction of a transformer within which high speed data networking and/or power load management circuitry is contained.

FIG. 33 is a block diagram illustrating the construction of a transformer within which high speed data networking and/or power load management circuitry is contained. In such structure, a transformer case 3302 houses transformer windings 3304 which transform a high voltage 60 hertz signal into a distribution voltage 60 hertz signal. The transformer case 3302 also includes a PMTS/PTM 3308. The PMTS/PTM 3308 couples to PLNs 3306, 3306B, and 3306C.

The PMTS/PTM 3308 also couples to a utility network or another high speed network such as the Internet, a WAN, etc. 2102. In such case, a termination panel on the side of the transformer case 3302 may include a fiber optic plug, a high speed networking plug, or another receptacle that would receive a high speed network connection. Alternatively, the panel on the side of the transformer case 3302 could include a high speed networking wireless link including an antenna. In such case, the transformer case 3302 (which is a utility class device) provides protection from the elements that also protect the power load management/high speed networking element components as well as the windings 3304.

Figure 34:
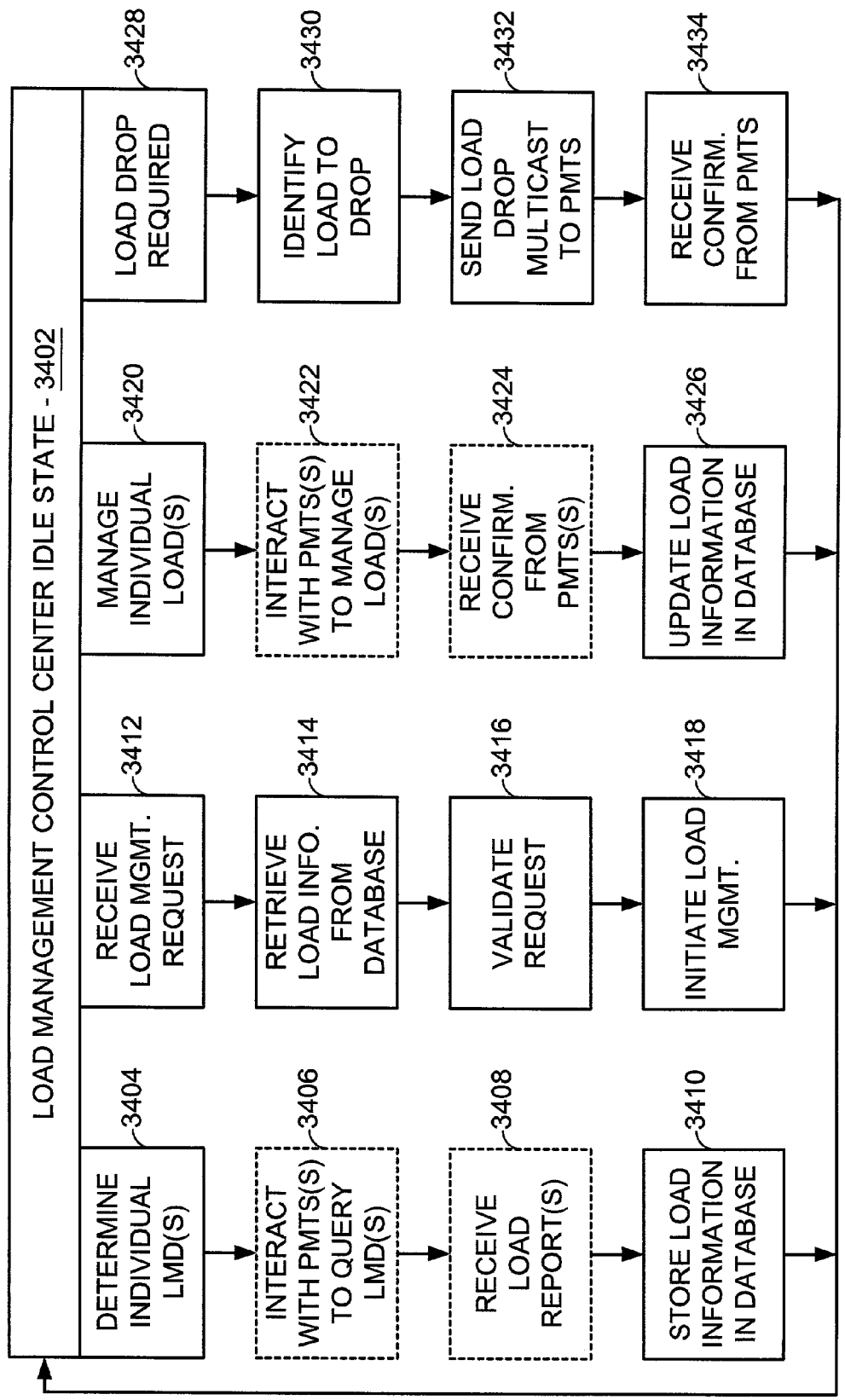
FIG. 34 is a logic diagram illustrating load management system operations according to the present invention.

FIG. 34 is a logic diagram illustrating load management control center operations according to the present invention. The load management control center is embodied as one or more digital computers coupled to the utility communication network. These computers may include a separate database for data storage or may include one or more high capacity drives that store load management information for a plurality of LMDs. The structure of digital computers is generally known and will not be described further herein. FIG. 34 illustrates a plurality of operations that may be embodied in software instructions executed by a digital computer such as load management control center computer illustrated generally in FIG. 21. The load management control center remains in an idle state (step 3402) until particular operations are required.

A first particular operation occurs when individual loads are to be determined (step 3404). In such case, there is optionally interaction between the load management control center and one or more PMTSs that service LMDs that are to be queried (step 3406). In such case, the load management control center computer receives one or more load reports from PMTSs corresponding to the queried LMDs (step 3408). This information is stored by the load management control center in its data base for future reference (step 3410). From step 3410, operation returns to step 3402.

After completion of step 3404 through 3410, the load management control center identifies, for a particular point in time, the level of load that is serviced via each queried LMD and in total by the queried LMDs. The load management system computer uses this information for subsequent load shedding/management operations. In such case, the load management control center determines how much load may be shed via directing the particular responding LMDs.

Operation from step 3402 may also occur when a request to manage a load is received (step 3412). Such a request may be received from a subscriber or from the load management control center. For example, a subscriber may desire to control a particular load within his or her work or home. In such case, the load management control center retrieves load information from its database (step 3414). Then, the load management control system validates the request (step 3416) and if the request is valid will initiate load management (step 3418). Initiation of step 3418 will enact operation of step 3420. From step 3418, operation proceeds to step 3402.

From step 3402, the load management control center may manage individual loads (step 3420). Such individual load management may be performed in response to step 3418 as was previously described. In such case, the load management control center interacts with a PMTS servicing the particular LMD in order to manage load (step 3422). After such interaction, the load management control center may receive confirmation from the PMTS (step 3424). Based on this interaction, the load management control center updates its load information database (step 3426).

In another operation, load management control center receives a load drop request (step 3412). A load drop request may be received as an emergency load reduction request produced in response to a generating plant dropping unexpectedly off line. In such case, the system frequency of the utility grid decreases because of a mismatch between the generation and load, or when the generation loss is otherwise detected. In this case, the load management control center receives a load drop request. In response to this load drop request, the total level of load to be dropped should correspond (partially or fully) the amount of generation that has been lost. Alternatively, load may be dropped periodically to compensate for a higher than expected peak that may not be met by the currently available generation.

Based upon the amount of load to be dropped, the load management control center identifies particular loads to drop (step 3430). The load management control center then sends load drop multicast(s) to one or more PMTSs serving the load to be dropped (step 3432). Based upon this request, the load management control center then receives confirmation from the PMTSs (step 3434). From step 3434 operation returns to step 3402.

Figure 35:
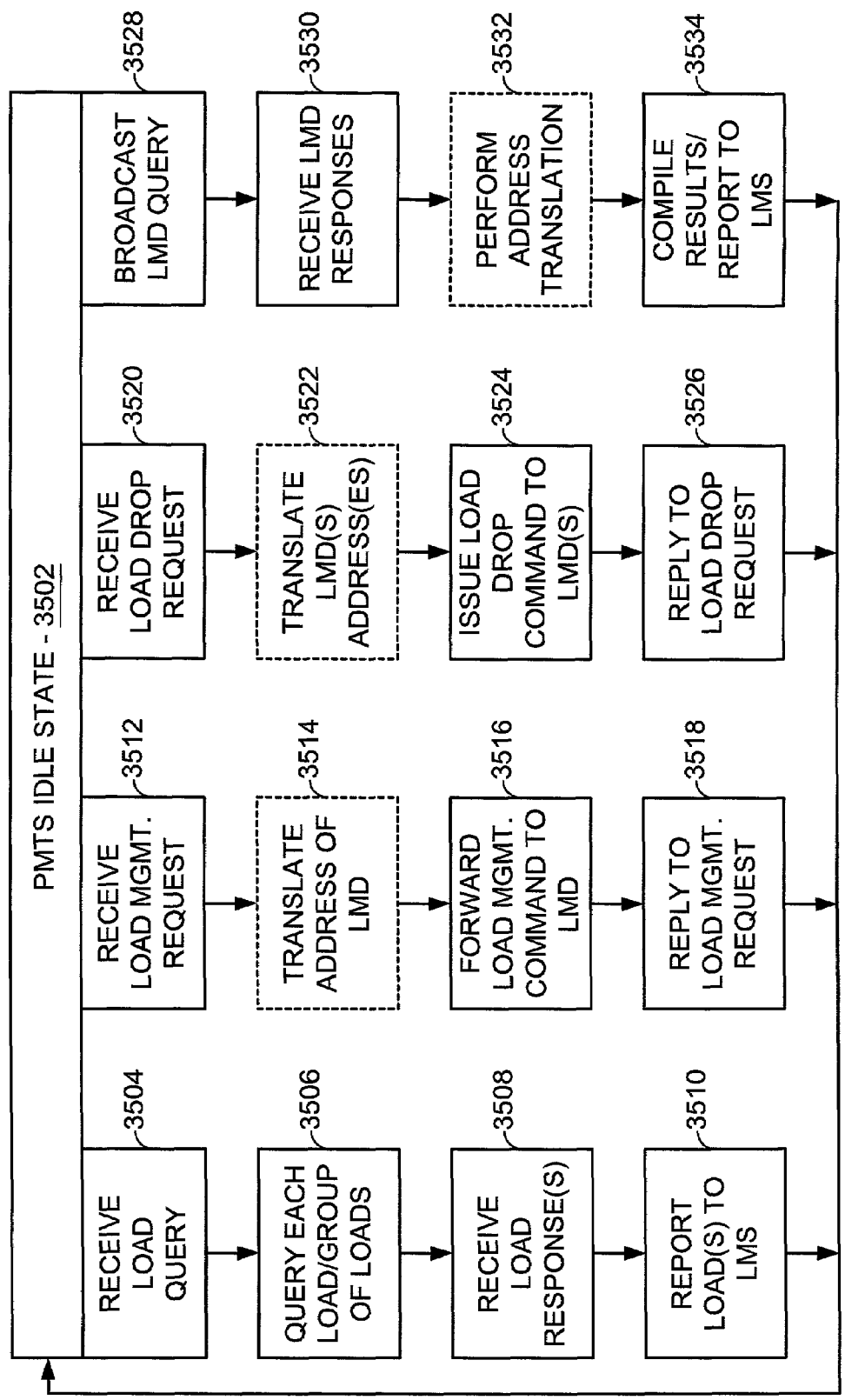
FIG. 35 is a logic diagram illustrating operation of a power management termination system of a load management system according to the present invention.

FIG. 35 is a logic diagram illustrating operation of a PMTS of a load management system according to the present invention. The PMTS remains in idle state (step 3502) until particular operations are requested. As was described with reference to FIG. 21, the PMTS resides in a signal path between the utility communication network 2102 and a plurality of PLNs serviced by the PMTS.

A first operation performed by the PMTS occurs when the PMTS receives a load query from the load management control center via the utility communication network (step 3504). In response to the query, the PMTS queries each load or group of loads that it manages via corresponding LMDs (step 3506). In such case, the PMTS interacts with each PLN to which it couples. Such operation may require address translation to reconcile particular addresses in a format required by the load management control center in a manner in which the PMTS identifies each LMD coupled to its serviced power line carrier local area networks.

In response to the queries made to the group of LMDs, the PMTS receives load responses (step 3508). Upon receipt of these load responses, the PMTS reports these loads to the load management control center (step 3510). From step 3510, operation returns to step 3502.

During its normal operations the PMTS may also receive a load management request (step 3512). In such case, the PMTS may be required to translate the address received to properly address an LMD (step 3514). The PMTS then sends a load management command to a selected LMD (step 3516). After the load management command has been sent, a reply may be received from the LMD. In any case, the PMTS, may sends a reply to the (step 3518).

Further, from the PMTS idle state of step 3502, the PMTS may receive a load drop request (step 3520). This load drop request may affect one or more LMDs. Because of the different addressing that may be employed by the PMTS to address each LMD under its control, the PMTS may be required to translate the addresses used to perform low dropping (step 3522). Further, in the case of load drop request servicing, the PMTS may issue a single command to all serviced LMDs. The PMTS then issues a load drop command to one or more LMDs (step 3524). Based on this command, the PMTS may receive a reply from one or more LMDs. In any case, the PMTS responds to the load management control center (step 3526). Such request may confirm that the load drop command has been acted upon.

During its operation the PMTS will initially and periodically send a query via each of the power line carrier local area networks that it services to discover each and every load management device coupled thereto. In such case, the PMTS broadcasts an LMD query (step 3528). In response to this query, the PMTS will receive responses from the LMDs coupled to serviced PLC-LANs (step 3530). Based upon the responses, the PMTS may perform address translation to convert a complete address of an LMD to a simpler address than it will use to address the LMD (step 3532). After the PMTS has received all of the response from the LMDs coupled to its PLC-LANs, it compiles its results and reports the results to the load management control center (step 3534). From step 3534, operation proceeds to step 3502.

Figure 36:
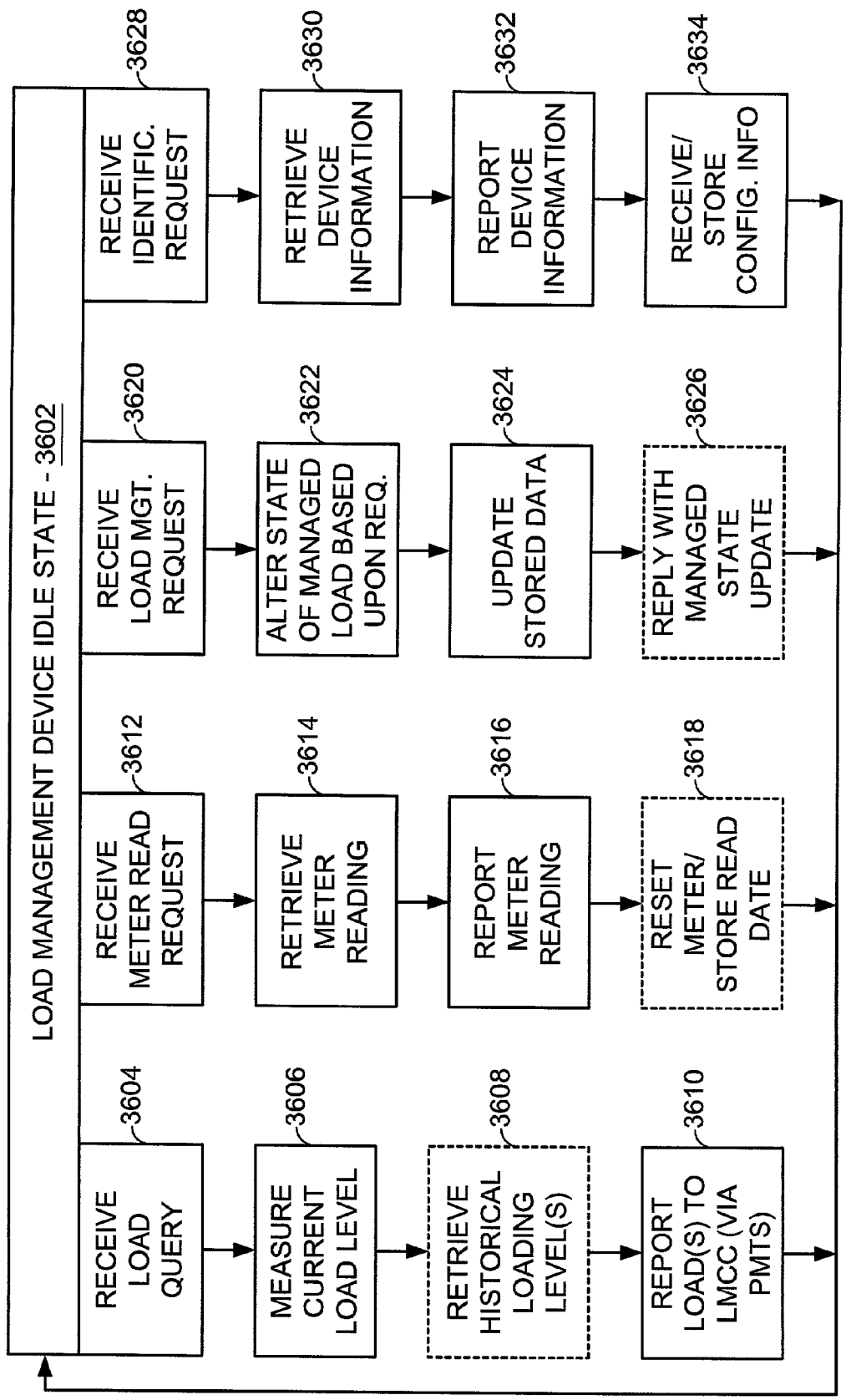
FIG. 36 is a logic diagram illustrating operation of a load management device according to the present invention.

FIG. 36 is a logic diagram illustrating operation of a load management device according to the present invention. Operation of the LMD remains at an idle state (step 3602) until one or a particular number of operations is performed. One particular set of operations is performed when the LMD receives a load query (step 3604). In such case, if the LMD includes metering, the LMD measures its current loading level (step 3606). The LMD may also retrieve historical loading levels for the device (step 3608). Subsequently thereto, the LMD will report its loading level(s) to the load management system via its PLN and PMTS.

The LMD may also receive a meter read request (step 3612). In such case, the LMD includes metering and retrieves a meter reading from its meter (step 3614). Alternately, the LMD may include memory in which is stored various meter readings over various time periods, e.g., peak demand during peak demand hours, total Kwh used, etc. The LMD will reports its meter reading to the load management system (step 3616). Subsequently, the LMD may reset its meter or store the date that the meter was read (step 3618). From step 3618, operation returns to step 3602.

In another operation, the LMD receives a load management request (step 3620). This load management request may be a request to drop a service load, drop a portion of the service load, re-establish service for a serviced load, etc. In such case, the LMD alters the state of its managed load based upon the request (step 3622). Then, the LMD updates its stored data to indicate the load management operation it has just performed (step 3624). Next, the LMD optionally replies to the load management control center with its managed state update (step 3626). From step 3626, operation returns to step 3602.

In another set of operations, the LMD receives an identification request from its servicing PMTS (step 3628). In response to the identification request, the LMD retrieves its device information (step 3630). The LMD then reports its device information to the querying device (step 3632). The LMD will then store configuration information that it subsequently receives (step 3634).

FIG. 37 illustrates operations performed by a subscriber in placing in service a load management device. As a first step in this operation, the subscriber purchases a LMD (step 3702). The purchase of the LMD may be incentivised by a servicing utility company. An example of such incentivisation would be when the utility company offers to reduce the rates charged to the subscriber if the LMD is placed in service, e.g., when the utility company is able to disrupt a serviced load.

After the subscriber purchases the LMD he may either install the LMD personally or may secure the utility company or contractor to install the LMD (step 3704). The subscriber then logs into the load management control center of the utility company to register (step 3706). Subscriber information provided by the subscriber is then used by the utility company to initiate operation of the LMD and to properly credit the subscriber's bill for having the LMD servicing his or her load.

After the LMD is placed in service, the LMD interacts with the load management system of the utility company (step 3708). Then, the LMD enters the idle state of step 3602 of FIG. 36 (step 3710).

FIG. 38 is a logic diagram illustrating operation in which a subscriber initiates load management of load via a LMD. Operation commences with the subscriber logging into the load management system of the utility company (step 3802). As was previously described, the load management system may be implemented by the utility company or by a service provider performing the service for the utility company. After logging in, the subscriber requests load management device operation (step 3804). In response thereto, the load management system validates the subscriber's request (step 3806). If the request is valid, the load management system issues the request of load management request (step 3808). The load management system then responds to the subscriber indicating whether or not the load management request was successfully performed (step 3812). From step 3812, operation ends.

The preceding discussion has presented a method and apparatus for providing broadband communication over powerlines. By having a powerline node in a neighborhood, only a single high-speed data path needs to be routed into the neighborhood to provide high-speed communications to a plurality of homes in the neighborhood. As such, the cost of the last 100 feet of a communication system is dramatically reduced. By utilizing the powerline node in combination with the powerline gateways, an entire neighborhood may be serviced by a single high-speed communication path. As one of average skill in the art will appreciate, other embodiments may be derived from the teaching of the present invention without deviating from the scope of the claims.

What is claimed is:

1. A powerline based communication system comprises:
   powerline termination module operably coupled to manage data for at least a portion of the powerline based communication system, wherein the at least a portion of the powerline based communication system includes a plurality of local area networks;
   a plurality of powerline gateways that is arranged in sets of powerline gateways, wherein each set of powerline gateways constitutes a corresponding one of the plurality of local area networks; and
   a plurality of powerline nodes operably coupled to the powerline termination module via a high-speed communication path and operably coupled to the plurality of powerline gateways via powerlines, wherein a first powerline node of the plurality of powerline nodes is operably coupled, via powerlines of a first local transformer, to a first set of the powerline gateways constituting a first corresponding local area network of the plurality of local area networks, wherein the first powerline node receives first local area network data of the data from the first set of powerline gateways via the powerlines of the first local transformer and provides the first local area network data to the powerline termination module via the high-speed communication path; and
   wherein said first power line node includes a local routine module configured to route data of the first set of power line gateways.

2. The powerline based communication system of claim 1, wherein each of the powerline gateways in the first set of powerline gateways comprises:
   AC coupling module operably coupled to receive outbound modulated data from the powerlines of the first local transformer;
   demodulation module operably coupled to demodulate the received outbound modulated data based on a demodulation protocol to produce demodulated data;
   data processing module operably coupled to process the demodulated data based on a desired communication convention to produce retrieved user data; and
   transmitting module operably coupled to provide the retrieved user data to a user of the first corresponding local area network.

3. The powerline based communication system of claim 2, wherein each of the powerline gateways in the first set of powerline gateways comprises:

a splitter operably coupled to separate the outbound modulated data from inbound modulated data on the powerlines of the first local transformer.

4. The powerline based communication system of claim 2, wherein the desired communication convention comprises at least one of: carrier sense multiple access (CSMA), CSMA with collision avoidance, CSMA with collision detection, encryption, and buffering.

5. The powerline based communication system of claim 2, wherein the demodulate protocol comprises at least one of: orthogonal frequency division multiplexing, and code division multiple access.

6. The powerline based communication system of claim 1, wherein the first powerline node comprises:
AC coupling module operably coupled to receive the local area network data as outbound modulated data from at least one of the first set of powerline gateways via the powerlines of the first local transformer;
demodulation module operably coupled to demodulate the received outbound modulated data based on a demodulation protocol to produce demodulated data;
data processing module operably coupled to process the demodulated data based on a desired communication convention to produce retrieved local area network data; and
transmitting module operably coupled to transmit the retrieved local area network data to the powerline termination module via the high-speed communication path.

7. The powerline based communication system of claim 6, wherein the first powerline node comprises:
a splitter operably coupled to separate inbound modulated data from the outbound modulated data on the powerlines of the first local transformer.

8. The powerline based communication system of claim 6, wherein the data processing module of the first powerline node comprises:
demapping module operably coupled to demap the local area network data from frequency bins within a frequency range of interest based on channel response of the powerlines to produce the processed data.

9. The powerline based communication system of claim 6, wherein the data processing module of the first powerline node comprises:
local data processing module operably coupled to receive local data of the local area network data from a local user affiliated with the first powerline node, wherein the at least a portion of the processed data is exclusive of the local data; and
wherein said local routing module is operably coupled to route the local data to the high-speed communication path.

10. The powerline based communication system of claim 6, wherein the first powerline node comprises:
a local powerline gateway of the first set of the powerline gateways of the first local area network to support a local user affiliated with the first powerline node.

11. The powerline based communication system of claim 6, wherein the demodulation module of the first powerline node comprises:
ranging module operably coupled to compensate for variations in line impedance of the powerlines of the local transformer.

12. The powerline based communication system of claim 6, wherein the demodulation module of the first powerline node comprises:

multi-path module operably coupled to compensate for multi-path error of the powerlines of the local transformer.

13. The powerline based communication system of claim 1 further comprises:
AC coupling capacitor operably coupled to a second local transformer, wherein the second local transformer is operably coupled to a second set of the powerline gateways constituting a second local area network of the plurality of local area networks via powerlines of the second local transformer, and wherein the first powerline node receives second local area network data of the data from the second set of powerline gateways via the powerlines of the second local transformer and provides the second local area network data to the powerline termination module via the high-speed communication path.

14. The powerline based communication system of claim 1, wherein the plurality of powerline nodes further comprises:
a second powerline node operably coupled, via powerlines of a second local transformer, to a second set of the powerline gateways constituting a second corresponding local area network of the plurality of local area networks, wherein the second powerline node receives second local area network data of the data from the second set of powerline gateways via the powerlines of the second local transformer and provides the second local area network data to the powerline termination module via a second high-speed communication path.

15. The powerline based communication system of claim 1, wherein the powerline termination module further comprises:
communication network interface operably coupled to transmit the data to a communication network; and
user database operable to maintain a listing of users of the powerline based communication system.

16. A powerline based local area communication network system comprises:
a plurality of powerline gateways that is arranged as a local area network; and
a powerline node operably coupled to the plurality of powerline gateways via powerlines of a local transformer, wherein the powerline node receives local area network data from the plurality of powerline gateways via the powerlines of the local transformer and provides the local area network data to a non-powerline high-speed communication path; and
wherein said power line node comprises a local routing module configured to route data to the power line gateways.

17. The powerline based local area communication network system of claim 16, wherein each of the plurality of powerline gateways comprises:
AC coupling module operably coupled to receive outbound modulated data from the powerlines of the local transformer;
demodulation module operably coupled to demodulate the received outbound modulated data based on a demodulation protocol to produce demodulated data;
data processing module operably coupled to process the demodulated data based on a desired communication convention to produce retrieved user data; and
transmitting module operably coupled to provide the retrieved user data to a user of the local area network.

18. The powerline based local area communication system of claim 17, wherein each of the plurality of powerline gateways comprises:
a splitter operably coupled to separate the outbound modulated data from inbound modulated data on the powerlines of the local transformer.

19. The powerline based local area communication system of claim 16, wherein the powerline node comprises:
AC coupling module operably coupled to receive the local area network data as outbound modulated data from at least one of the first set of powerline gateways via the powerlines of the first local transformer;
demodulation module operably coupled to demodulate the received outbound modulated data based on a demodulation protocol to produce demodulated data;
data processing module operably coupled to process the demodulated data based on a desired communication convention to produce retrieved local area network data; and
transmitting module operably coupled to transmit the retrieved local area network data to the powerline termination module via the high-speed communication path.

20. The powerline based local area communication system of claim 19, wherein the powerline node comprises:
a splitter operably coupled to separate inbound modulated data from the outbound modulated data on the powerlines of the local transformer.

21. The powerline based local area communication system of claim 19, wherein the data processing module of the powerline node comprises:
demapping module operably coupled to demap the local area network data from frequency bins within a frequency range of interest based on channel response of the powerlines to produce the processed data.

22. The powerline based local area communication system of claim 19, wherein the data processing module of the powerline node comprises:
local data processing module operably coupled to receive local data of the local area network data from a local user affiliated with the first powerline node, wherein the at least a portion of the processed data is exclusive of the local data; and
wherein said local routing module is operably coupled to route the local data to the high-speed communication path.

23. The powerline based local area communication system of claim 19, wherein the powerline node comprises:
a local powerline gateway of the plurality of the powerline gateways to support a local user affiliated with the powerline node.

24. The powerline based local area communication system of claim 19, wherein the demodulation module of the first powerline node comprises:
ranging module operably coupled to compensate for variations in line impedance of the powerlines of the local transformer.

25. The powerline based local area communication system of claim 19, wherein the demodulation module of the first powerline node comprises:
multi-path module operably coupled to compensate for multi-path error of the powerlines of the local transformer.

26. A method for providing broadband communication over powerlines, the method comprises:
receiving outbound modulated data via AC coupling to powerlines of a local transformer, wherein the outbound modulated data is associated with at least one user of a plurality of users in a local area network, wherein the plurality of users is operably coupled together via the powerlines of the local transformer;
demodulating the received outbound modulated data based on a demodulation protocol to produce demodulated data;
processing the demodulated data based on a desired communication convention to produce retrieved data;
providing the retrieved data to a communication path;
receiving inbound data;
identifying local data of the inbound data that addresses a local user of a plurality of users; and
routing the identified local data to the local user via the powerlines of the local transformer.

27. The method of claim 26, wherein the demodulating the received outbound modulated data further comprises at least one of:
orthogonal frequency division demultiplexing of the received outbound modulated data; and
spread spectrum demodulation the received outbound modulated data.

28. The method of claim 26, wherein the processing of the demodulated data further comprises:
demultiplexing the demodulated data within the frames based on division demultiplexing of the frames among the plurality of users.

29. The method of claim 26, wherein the processing the demodulated data further comprises at least one of:
decrypting the demodulated data based on decryption protocol of the at least one user to produce the retrieved data; and
buffering the demodulated data to produce the retrieved data.

30. The method of claim 26, wherein the processing the demodulated data further comprises:
identifying local data of the demodulated data that addresses a local user of a plurality of users; and
routing the local data to the local user via a local communication path.

31. The method of claim 26, wherein the processing the demodulated data further comprises:
demapping the demodulated data from frequency bins within the frequency range of interest based on a channel response of the powerlines to produce the retrieved data.

32. The method of claim 26, wherein the providing of the retrieved data further comprises:
providing the retrieved data via the communication path to a utility network that couples a plurality of substations to a control center.

33. The method of claim 26, wherein the providing the retrieved data further comprises:
providing the retrieved data in packets via a high-speed communication path that is operably coupled to a communication network.

34. The method of claim 26, wherein the providing the retrieved data further comprises:
providing the retrieved data in frames via a high-speed communication path that is operably coupled to a communication network.

35. The method of claim 26, wherein the processing the demodulated data further comprises:
compensating for variations in line impedance of the powerlines.

36. The method of claim 26, wherein the processing the demodulated data further comprises:

compensating for multi-path error of the powerlines.

37. An apparatus for providing broadband communication over a powerline, the apparatus comprises:

processing module; and memory operably coupled to the processing module, wherein the memory further comprises operational instructions that cause the processing module to:

receive outbound modulated data via AC coupling to powerlines of a local transformer, wherein the outbound modulated data is associated with at least one user of a plurality of users in a local area network, wherein the plurality of users is operably coupled together via the powerlines of the local transformer;

demodulate the received outbound modulated data based on a demodulation protocol to produce demodulated data;

process the demodulated data based on a desired communication convention to produce retrieved data;

provide the retrieved data to a communication path;

receive inbound data;

identify local data of the inbound data that addresses a local user of a plurality of users; and route the identified local data to the local user via the powerlines of the local transformer.

38. The apparatus of claim 37, wherein memory further comprises operational instructions that cause the processing module to demodulate the received outbound modulated data by at least one of:

orthogonal frequency division demultiplexing of the received outbound modulated data; and spread spectrum demodulation the received outbound modulated data.

39. The apparatus of claim 37, wherein memory further comprises operational instructions that cause the processing module to process the demodulated data by:

demultiplexing the demodulated data within the frames based on division demultiplexing of the frames among the plurality of users.

40. The apparatus of claim 37, wherein memory further comprises operational instructions that cause the processing module to process the data by at least one of:

decrypting the demodulated data based on decryption protocol of the at least one user to produce the retrieved data; and buffering the demodulated data to produce the retrieved data.

41. The apparatus of claim 37, wherein memory further comprises operational instructions that cause the processing module to process the data by:

identifying local data of the demodulated data that addresses a local user of a plurality of users; and routing the local data to the local user via a local communication path.

42. The apparatus of claim 37, wherein memory further comprises operational instructions that cause the processing module to process the data by:

demapping the demodulated data from frequency bins within the frequency range of interest based on a channel response of the powerlines to produce the retrieved data.

43. The apparatus of claim 37, wherein memory further comprises operational instructions that cause the processing module to provide the retrieved data by:

providing the retrieved data via the communication path to a utility network that couples a plurality of substations to a control center.

44. The apparatus of claim 37, wherein memory further comprises operational instructions that cause the processing module to provide the retrieved data by:

providing the retrieved data in packets via a high-speed communication path that is operably coupled to a communication network.

45. The apparatus of claim 37, wherein memory further comprises operational instructions that cause the processing module to provide the retrieved data by:

providing the retrieved data in frames via a high-speed communication path that is operably coupled to a communication network.

46. The apparatus of claim 37, wherein memory further comprises operational instructions that cause the processing module to compensate for variations in line impedance of the powerlines.

47. The apparatus of claim 37, wherein memory further comprises operational instructions that cause the processing module to compensate for multi-path error of the powerlines.

* * * * *

UNITED STATES PATENT AND TRADEMARK OFFICE
CERTIFICATE OF CORRECTION

| | |
|---|---|
| PATENT NO. | : 7,173,938 B1 |
| APPLICATION NO. | : 09/860262 |
| DATED | : February 6, 2007 |
| INVENTOR(S) | : Davidow |

It is certified that error appears in the above-identified patent and that said Letters Patent is hereby corrected as shown below:

On page 2, in field (56), under "Other Publications", in column 2, line 19, delete "Sysyems" and insert -- Systems --, therefor.

On Sheet 24 of 31 (Beside 2716C), in FIG. 27, line 1, delete "2720B" and insert -- 2720C --, therefor.

On Sheet 26 of 31 (Box 3110), in FIG. 31, line 2, delete "APPLICANCE" and insert -- APPLIANCE --, therefor.

On Sheet 26 of 31 (Above 3112), in FIG. 31, line 1, delete "PORT" and insert -- PORT. --, therefor.

In column 25, line 32, delete "2124,F" and insert -- 2124F, --, therefor.

In column 27, line 14, delete "LMDS" and insert -- LMDs --, therefor.

In column 29, line 27, delete "PTN" and insert -- PTM --, therefor.

In column 29, line 28, delete "PTN" and insert -- PTM --, therefor.

In column 32, line 46, delete "3306" and insert -- 3306A --, therefor.

In column 36, line 46, in Claim 1, delete "routine" and insert -- routing --, therefor.

UNITED STATES PATENT AND TRADEMARK OFFICE
CERTIFICATE OF CORRECTION

PATENT NO. : 7,173,938 B1
APPLICATION NO. : 09/860262
DATED : February 6, 2007
INVENTOR(S) : Davidow It is certified that error appears in the above-identified patent and that said Letters Patent is hereby corrected as shown below:

In column 39, lines 48-49, in Claim 23, after "comprises:" delete "a".

Signed and Sealed this

Eighth Day of January, 2008

JON W. DUDAS
*Director of the United States Patent and Trademark Office*